Aug. 2, 1960     J. J. LENTZ ET AL     2,947,478
ELECTRONIC CALCULATOR

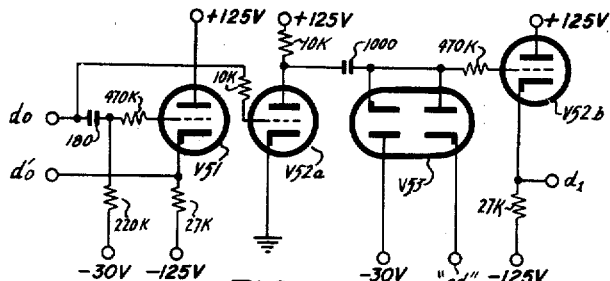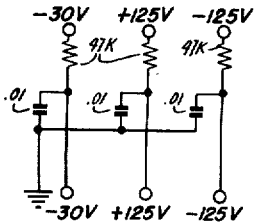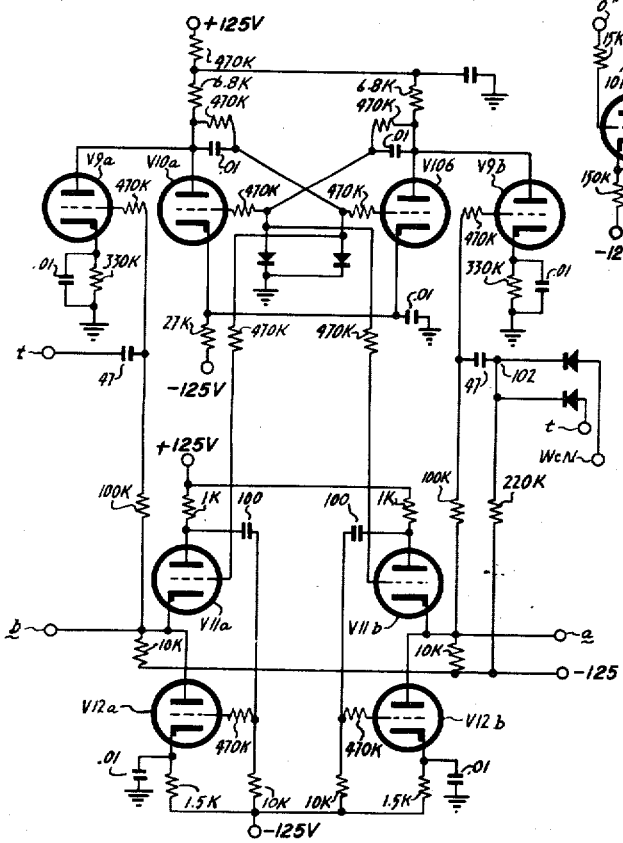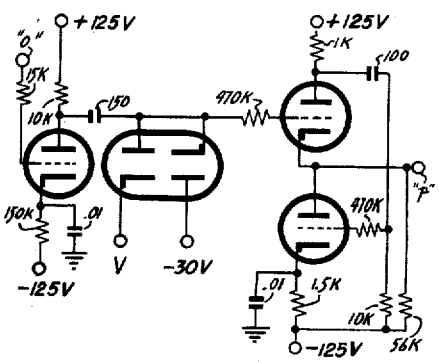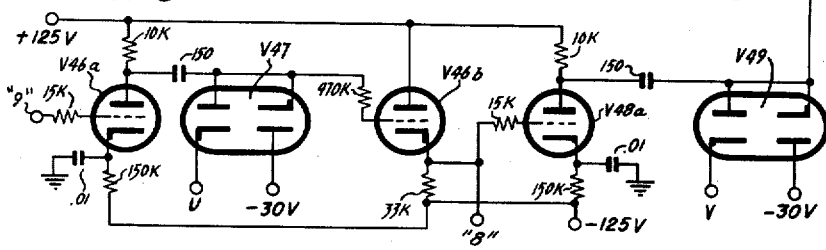

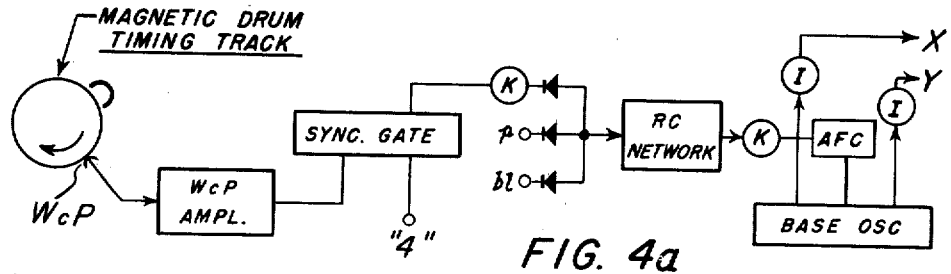
FIG. 4a
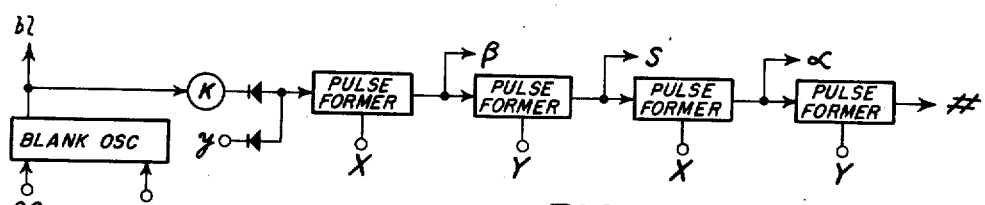
FIG. 9a
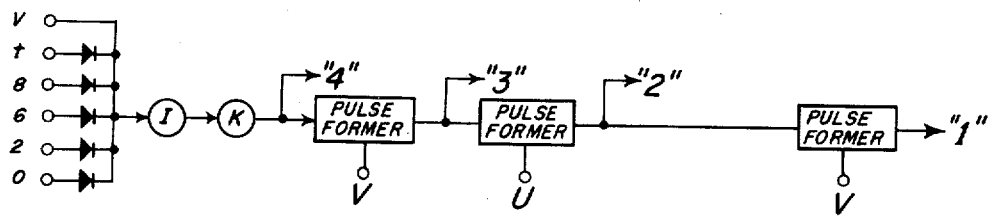
FIG. 11a
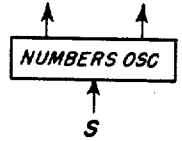
FIG. 10a
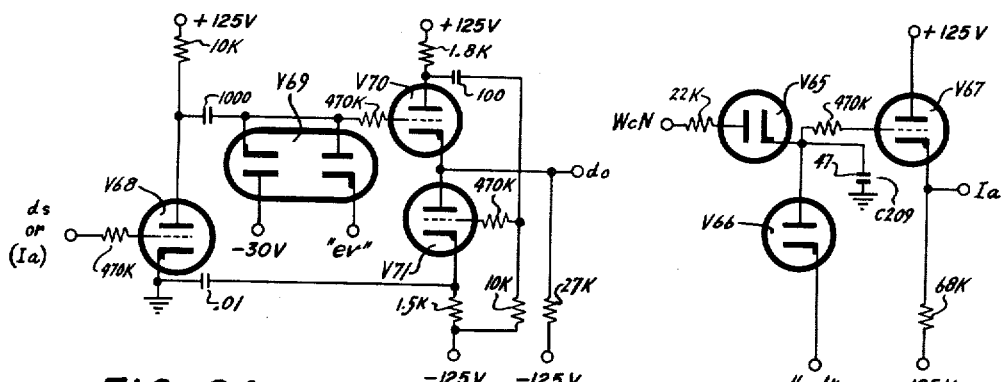
FIG. 24
FIG. 23

Filed May 16, 1955     22 Sheets-Sheet 7

BLANK OSC

NUMBERS OSC

Aug. 2, 1960    J. J. LENTZ ET AL    2,947,478
ELECTRONIC CALCULATOR
Filed May 16, 1955    22 Sheets-Sheet 10

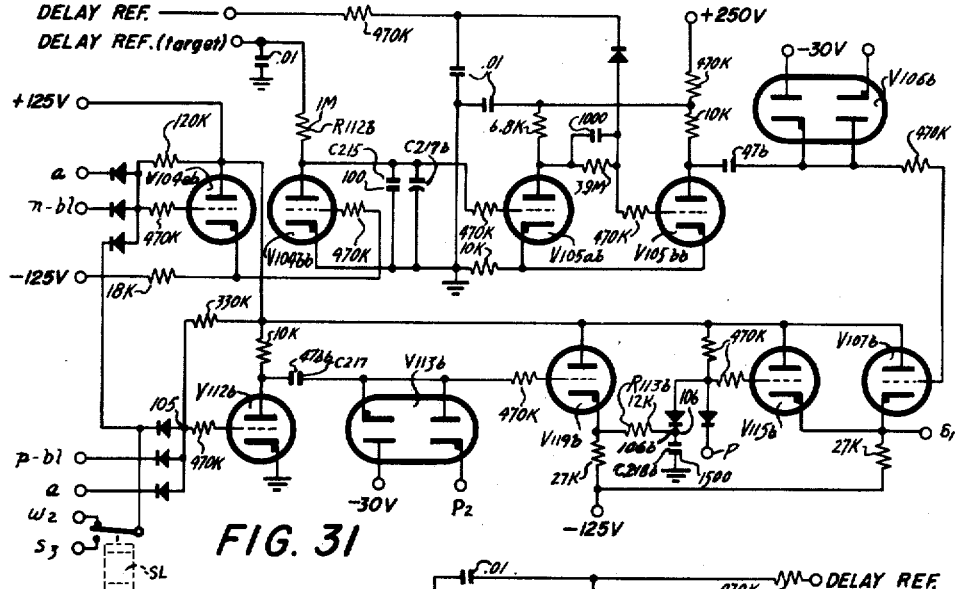
FIG. 31
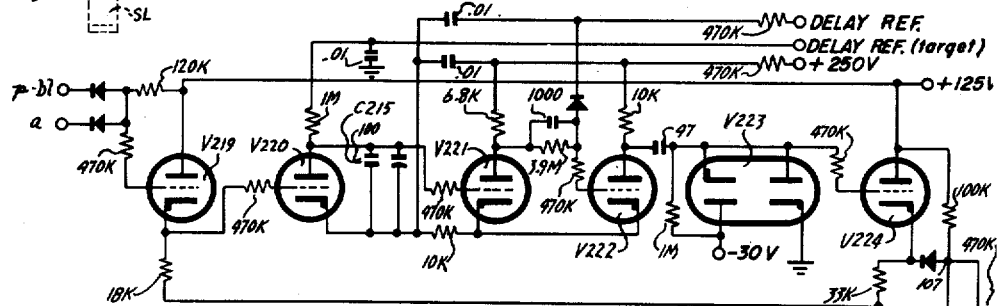
FIG. 32
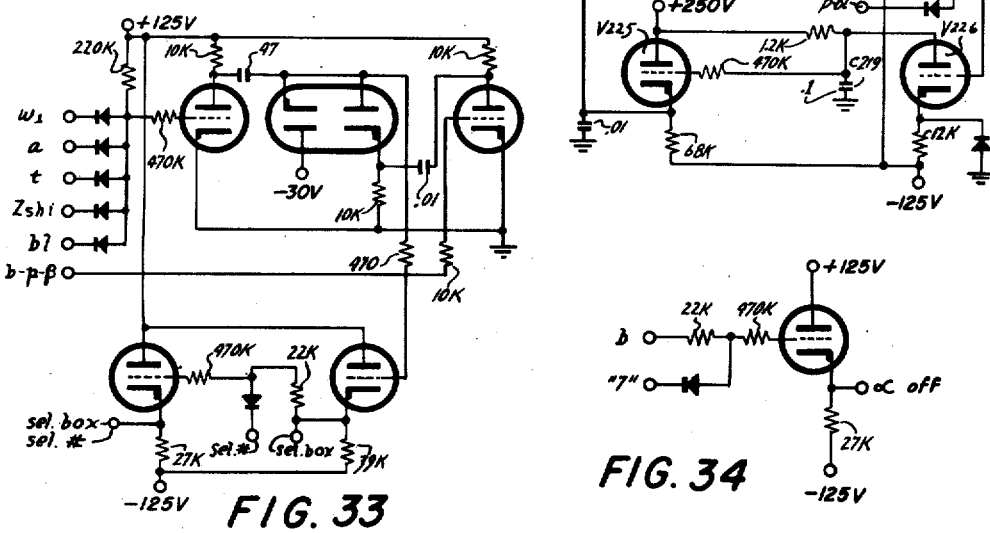
FIG. 33
FIG. 34

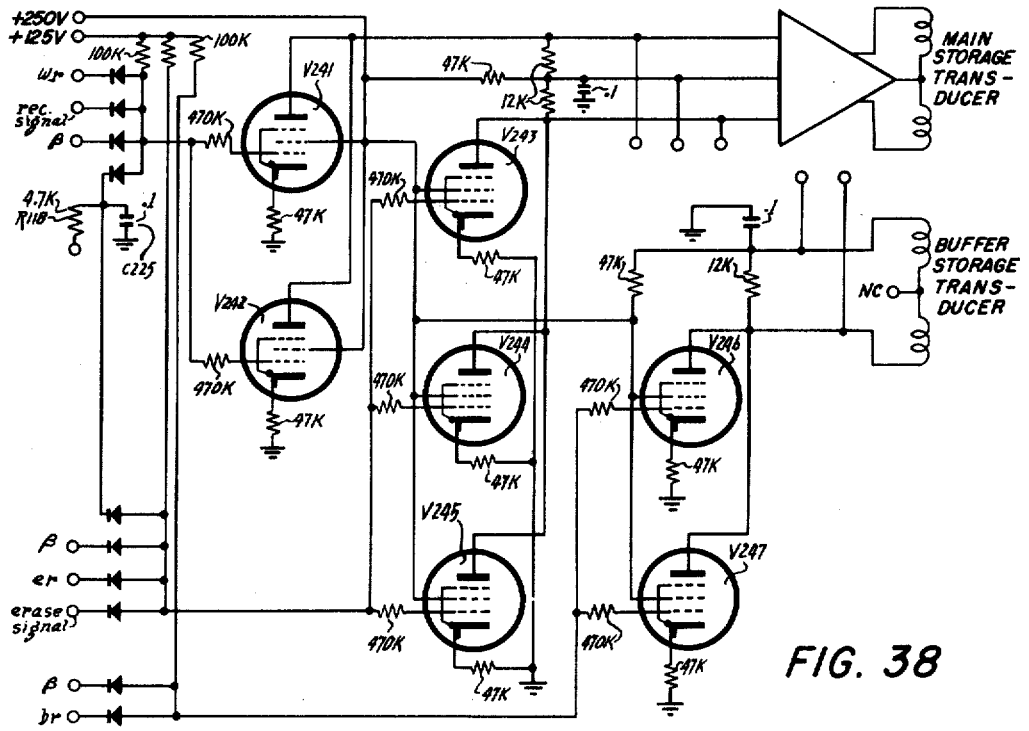
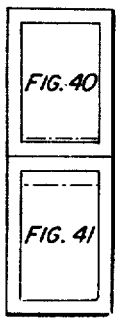
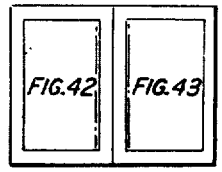
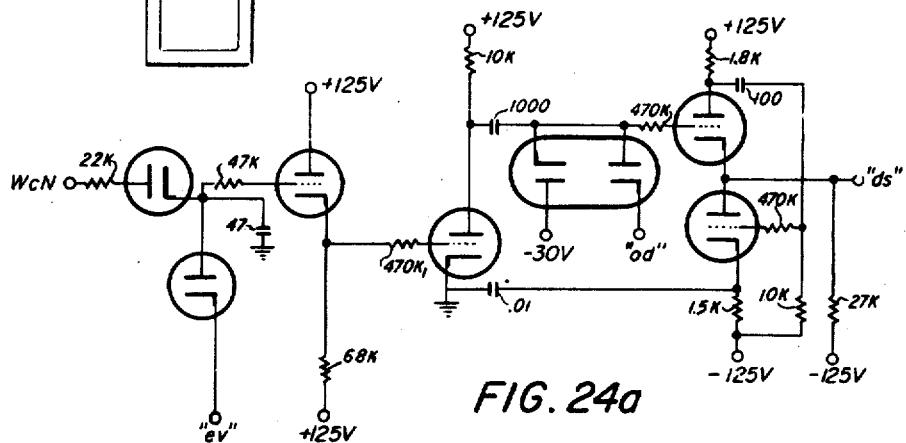

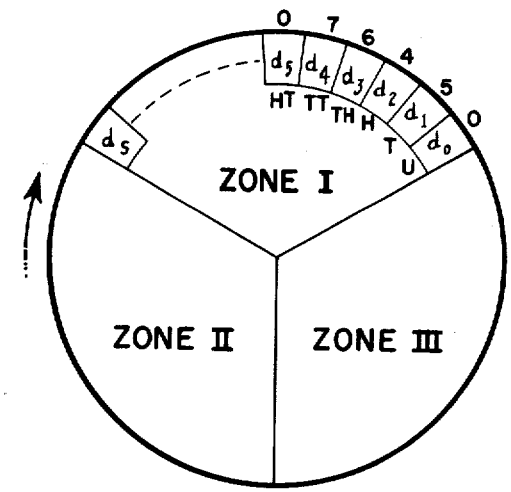
QUANTITY 7645
*SHIFTED LEFT (AGAINST DIRECTION OF DRUM ROTATION)*
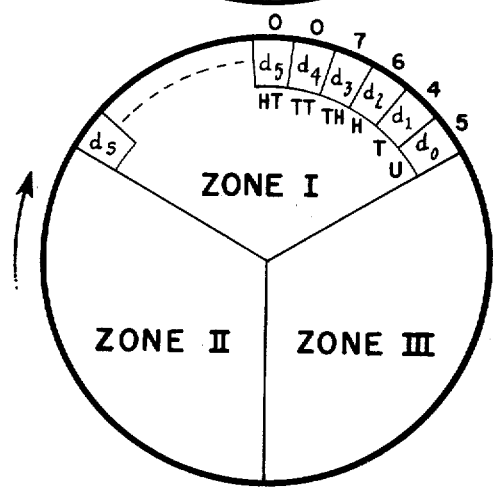
QUANTITY 7645
*NORMAL POSITION*
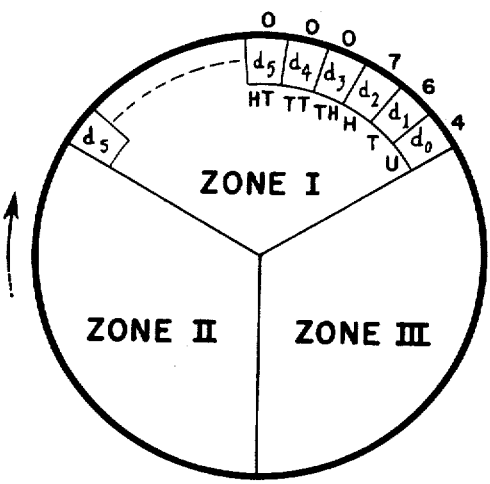
QUANTITY 7645
*SHIFTED RIGHT (WITH DIRECTION OF DRUM ROTATION)*
FIG. 51

United States Patent Office 2,947,478
Patented Aug. 2, 1960

2,947,478

ELECTRONIC CALCULATOR

John J. Lentz, Chappaqua, and John H. Palmer, Scarsdale, N.Y., and Daniel Robbins, Pasadena, Calif., assignors to International Business Machines Corporation, New York, N.Y., a corporation of New York Filed May 16, 1955, Ser. No. 508,382

22 Claims. (Cl. 235—160)

This invention relates to electronic computing devices, and more particularly to improvements in flexibility of control in such apparatus with respect to decimal point operation wherein automatic designation of the proper decimal punctuation is derived. More specifically, this invention is directed to improvements in a digital computer of the type shown in copending application Serial No. 388,160, filed October 26, 1953. Unlike conventional decimal point control in electronic computers wherein complicated arithmetical operations are carried out, the present invention makes use of so-called "machine logic" utilizing decimal point operation directed to an actually indicated result rather than the "floating point" system in which accurate reference must be maintained throughout all computations by the operator or by some parallel reference operation.

In the present invention logical facilities are provided which are normally found only in very large electronic computing devices. Furthermore, the circuits of the invention are adapted to extremely great flexibility of control, particularly with respect to programming, so that instructions can be supplied from a keyboard, a perforated tape, or other similar means, with very little interchange difficulty.

Essentially the invention comprises a magnetic storage drum, upon which are included tracks for the storage of data both for register functions and for the logical functioning of the device, an arithmetic unit similar to that of the copending application referred to above, and an electronic access unit for controlling the reciprocal flow of information between the drum storage and arithmetic unit and accepting information and delivering information to the external input and output devices. The output device may be an electric typewriter, as in the application previously referred to.

The magnetic storage drum is provided with a plurality of storage tracks, each track normally divided into three zones of two interleaved registers, each, thus providing a total of six data registers per track, the two registers per zone having the recorded digital information interleaved therein in two different, separately identifiable time phases. Each register is capable of storing a number of fifteen-decimal digits in length plus an associated algebraic sign. One of the tracks, however, is provided to accommodate 2 fifteen-decimal digits and sign in Zone I and 2 thirty-one-decimal digits and sign in Zones II and III taken together, rather than the normal distribution just mentioned. Another track is provided to accept information from any of the previously referred to storage tracks without regard to register length. Still another track is provided for timing and synchronization.

Numerical information enters the registers through an adding unit in such a manner that the number standing in a selected register which is also passed through the adder is replaced by the algebraic sum of the standing number and the separate incoming number. The number standing in a selected register may be replaced by zeros in a somewhat similar manner by subtracting the standing number from itself and substituting the result of the subtraction for the original number. The last mentioned operation provides a means for determining that the arithmetic circuits are operating correctly. It is, therefore, an object of this invention to provide a means for determining automatically the condition of the arithmetic circuits via a normal machine operation.

In a manner similar to that described above for clearing a register (replacing its value by zeros), a number standing in a register may be replaced by its own negative or complement.

Another feature of the invention, particularly necessary in performing multiplication, division, and square root operation, is the shifting of a number standing in a register to the right or left. For example, a number shifted left has its "tens" order value shifted to the "hundreds" order position in the register, and a number shifted right has its "tens" order value shifted to the "units" order position. It is another object of this invention, therefore, to provide a novel method for shifting numbers standing in a register.

It is still another object of this invention to provide a novel means for shifting digits standing in a register to higher or lower orders automatically by more than one order at a time.

Another feature of the invention is the ability to transfer into a first selected register a number standing in a second selected register without altering the number in the second selected register. Transfer operations of this kind are additive with respect to the first selected register if there is already a number standing therein. It is, accordingly, another object of the invention to provide a transfer means wherein an emitting register retains its recorded value while transferring that value into another register.

The last mentioned feature combined with the shifting feature of the invention, previously mentioned, is particularly useful where it becomes necessary to multiply a common multiplicand by several different multipliers.

Another feature of the invention is the flexibility of the arithmetic unit whereby computations can be automatically carried out with different arithmetical radices; for example, from a radix of ten i.e. a decimal system to a radix of eight i.e. an octal system.

The basis of multiplication and division of the invention is somewhat similar to that of copending application Serial No. 388,160, and is best set forth in the expression "y/z times x," where y is the multiplier, z is the divisor, and x is the multiplicand. As later explained herein, the result of this operation is automatically recorded in a specific register designated as the accumulating register. Simple multiplication can be performed by entering a value of unity in the register corresponding to z, and simple division can be performed by entering a value of unity in the register corresponding to x. This operation is performed using fixed decimal control or by making use of a novel automatic decimal control provided by the invention. A novel means is also used to provide automatic sign control in this operation.

It is, therefore, another object of this invention to provide a decimal control feature wherein during multiplying and dividing operations decimal points are automatically correctly actually placed in the respective products and quotients.

In the application referred to above, a system of electronic delay circuits is incorporated to provide delay paths when reading and recording data from and in the main storage tracks. In this invention an additional track upon the magnetic drum, acting as a buffer storage delay, is used to obtain delayed and advanced control of a recording on the main storage tracks of the magnetic drum. Consequently, it is another object of this invention to provide a cyclical device operating in time phase with the main storage of a magnetic drum for delaying or advancing the recording of data.

Other objects of the invention will be pointed out in the following description and claims and illustrated in the accompanying drawings which disclose, by way of example, the principle of the invention and the best mode which has been contemplated of applying that principle.

In the the drawings:

Fig. 4a is a line diagram of the circuit of Fig. 4.

Fig. 5 is an oscillator developing $a$ and $b$ phase gates utilized in timing certain special control pulses.

Fig. 9a is a line diagram of Figs. 7, 8 and 9.

Fig. 10a is a block diagram of the numbers oscillator of Fig. 10.

Fig. 11a is a line diagram of Figs. 11 and 12 connected together.

Fig. 13a is a circuit similar to Fig. 13.

Fig. 15 is a series of pulse forming circuits showing the coupling between a standard pulse former as in Fig. 11 and the special pulse former of Fig. 13 for producing the "7" and "8" numbers gate.

Fig. 16 is a differentiating circuit for producing the $d_0'$ and $d_1$ gates.

Fig. 17 is a filter circuit for the various voltages used in operating the circuits in Figs. 11 to 16.

Fig. 23 is a pulse stretching circuit for producing an $I_a$ gate.

Fig. 24 is a pulse forming circuit having a combined "or" circuit input for working out of a circuit as in Fig. 23 for producing the $d_0$ gate.

Fig. 24a is a combination of the circuits of Figs. 23 and 24 as utilized to produce the $d_s$ gate.

Fig. 31 is a pulse delay circuit similar to Fig. 30, showing a variation in input controls.

Fig. 32 is a voltage control circuit for the delay circuits of Figs. 30 and 31.

Fig. 33 is a pulse forming circuit of a type similar to Fig. 13.

Fig. 34 is a cathode follower circuit for producing the "$\delta$ OFF" gate.

Fig. 38 is a circuit diagram of a record and erase amplifier for the magnetic drum recording channels.

Fig. 38a is a diagram illustrating the orientation of the sheets of drawings comprising Figs. 40 and 41, respectively.

Fig. 38b is a diagram illustrating the orientation of the sheets of drawings comprising Figs. 42 and 43, respectively.

Figure 40:
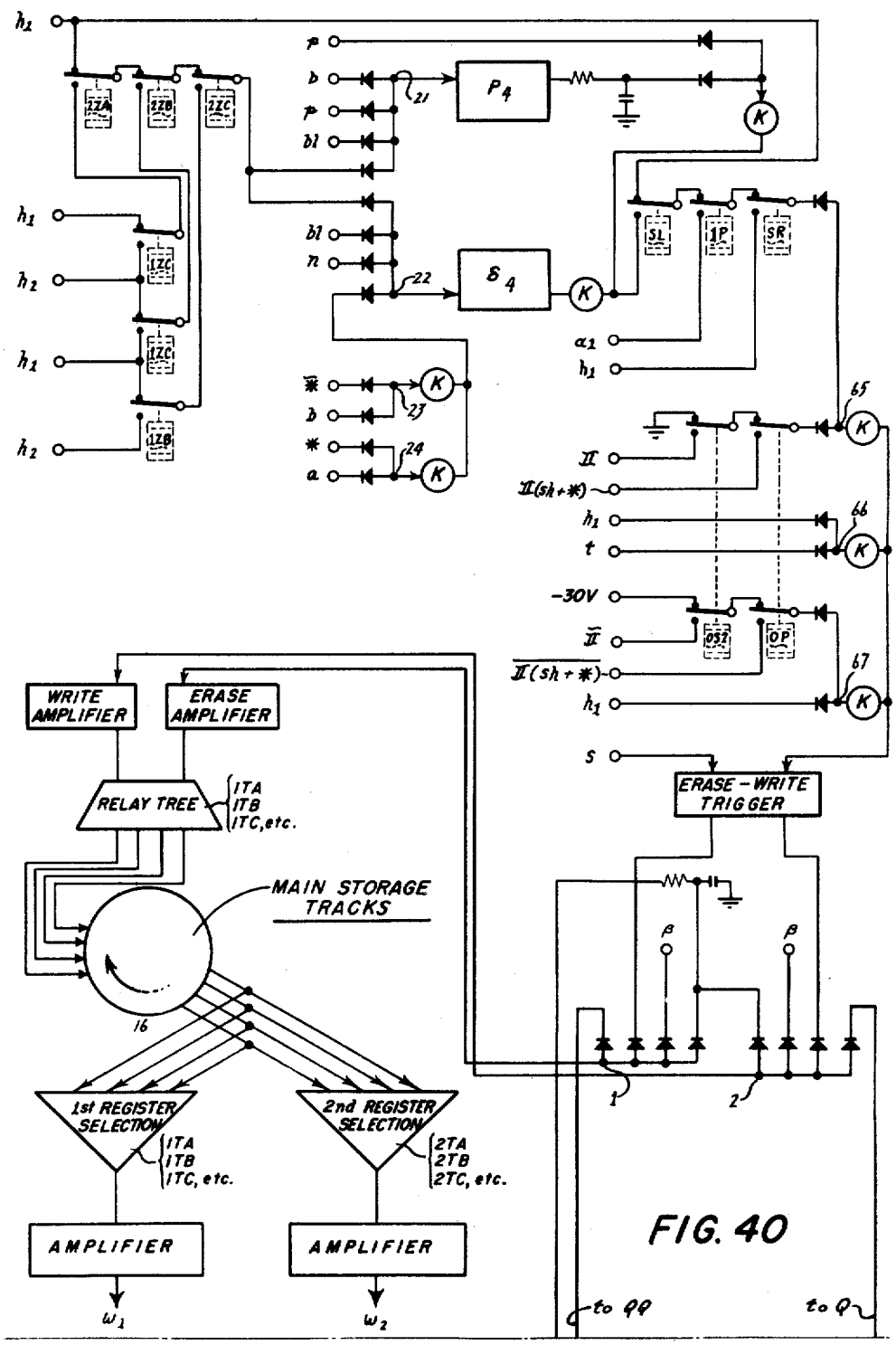
Figure 41:
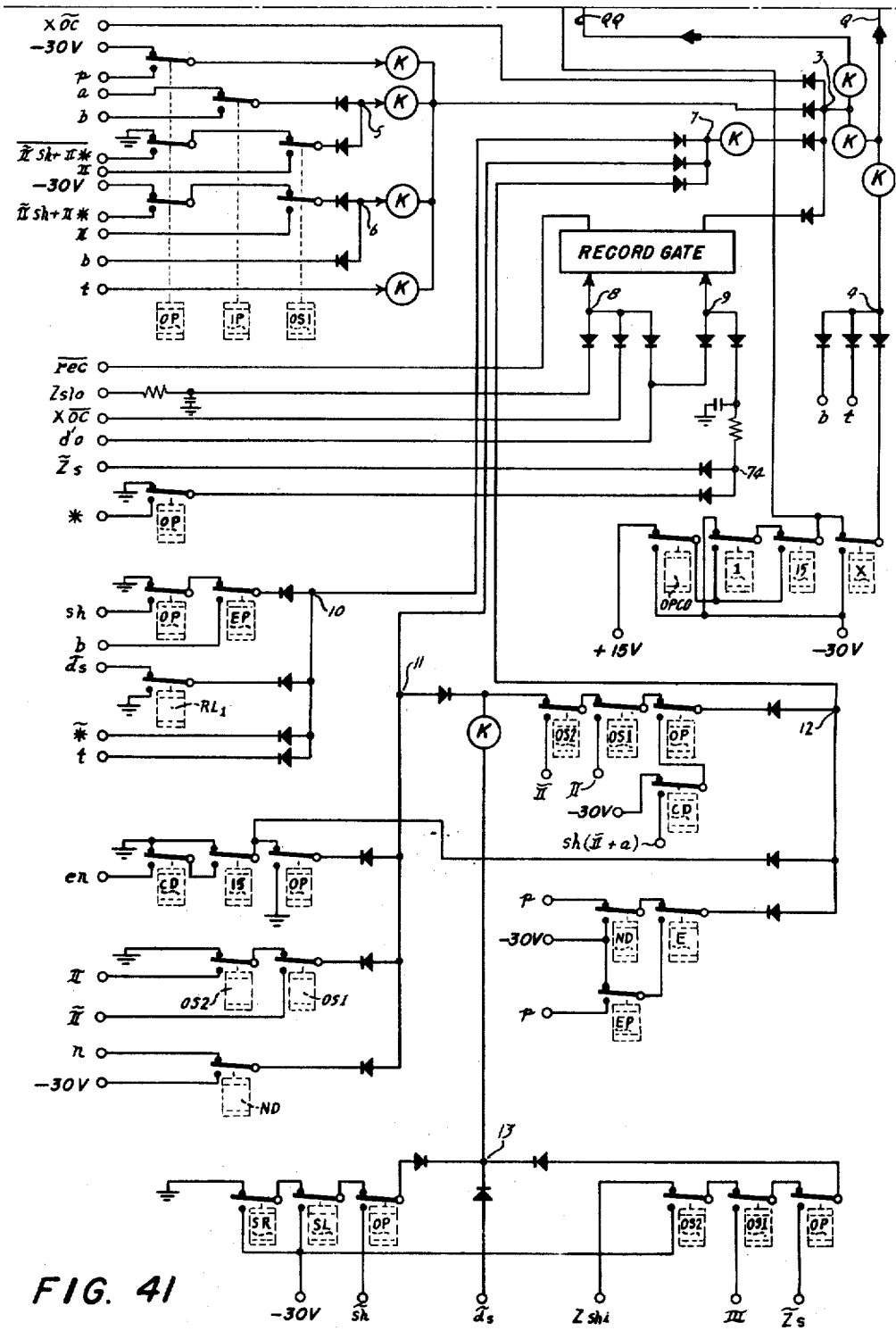

Figs. 40 and 41, arranged as indicated in Fig. 38a are line diagrams of the flow of logical data in certain functional operations of the invention.

Figure 42:
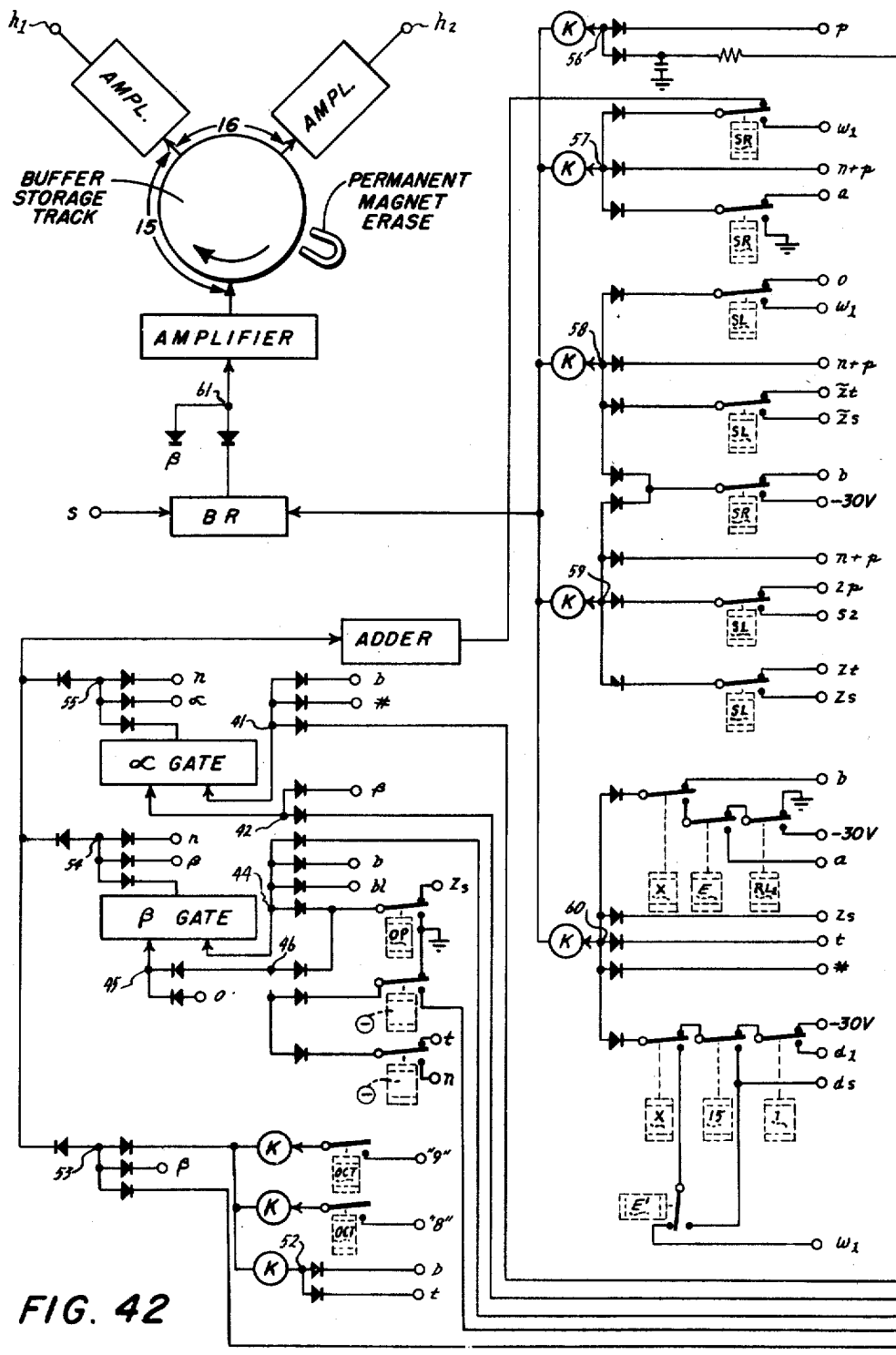
Figure 43:
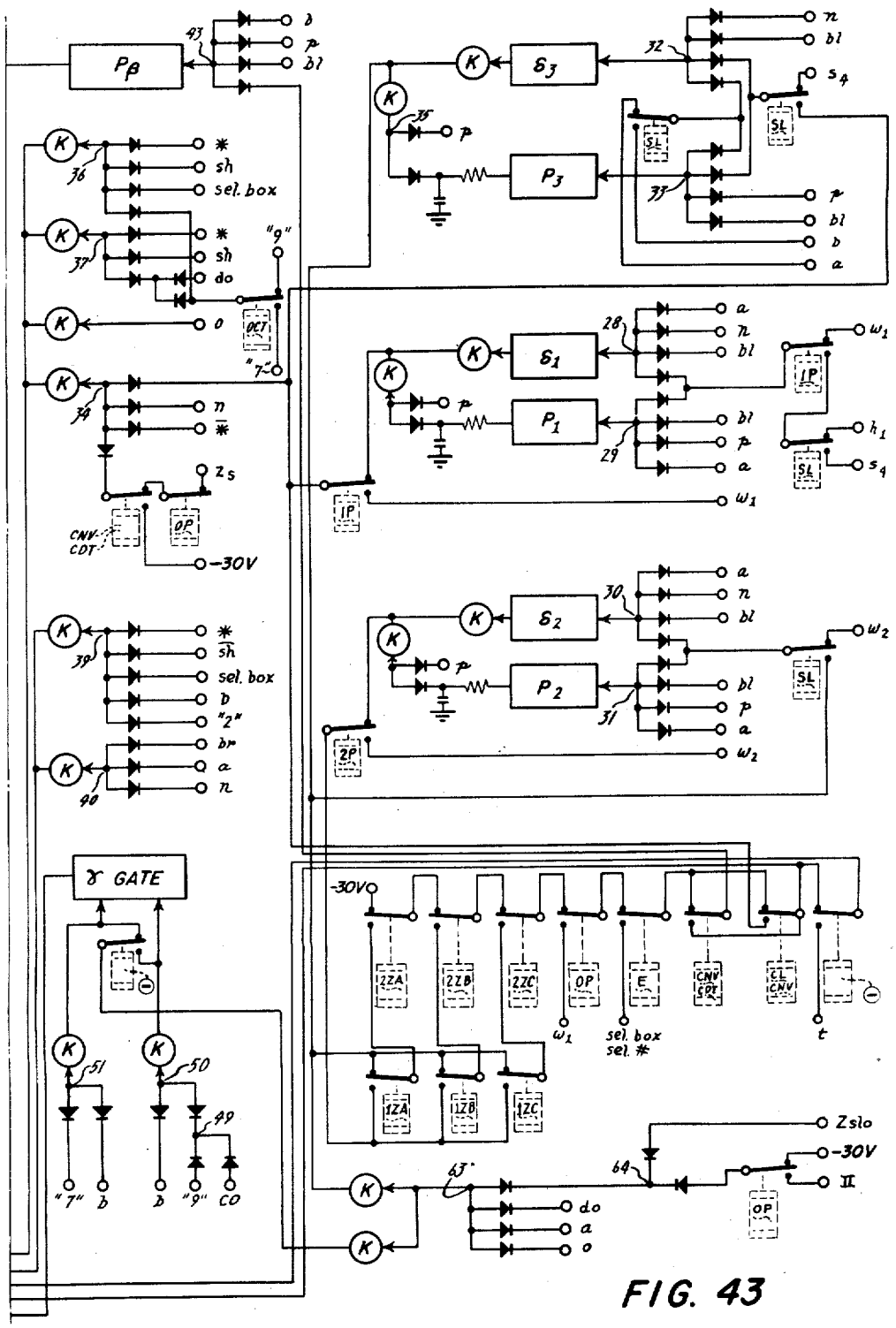

Figs. 42 and 43 arranged as indicated in Fig. 38b are line diagrams of the flow of logical data in certain operations of the invention.

Figs. 44 through 50 are line diagrams of the flow of logical data in various functional operations of the invention, and Fig. 51 illustrates diagrammatically certain logical operations of the invention.

In the objects previously enumerated certain features were pointed out; for example, "transfer of numbers between registers," "shifting of digits to higher and lower orders in a register," etc. In order to have a comprehensive understanding of the invention it is essential that each of these operations be understood; consequently, each of the logic components utilized will be described in detail so that thereafter in the explanation of the logic of a complete computation the principal theme of the invention will be described without reference to specific details. Prior to the explanation of the logic components, however, certain other details will be set forth as follows:

THE MAGNETIC DRUM

Figure 1:
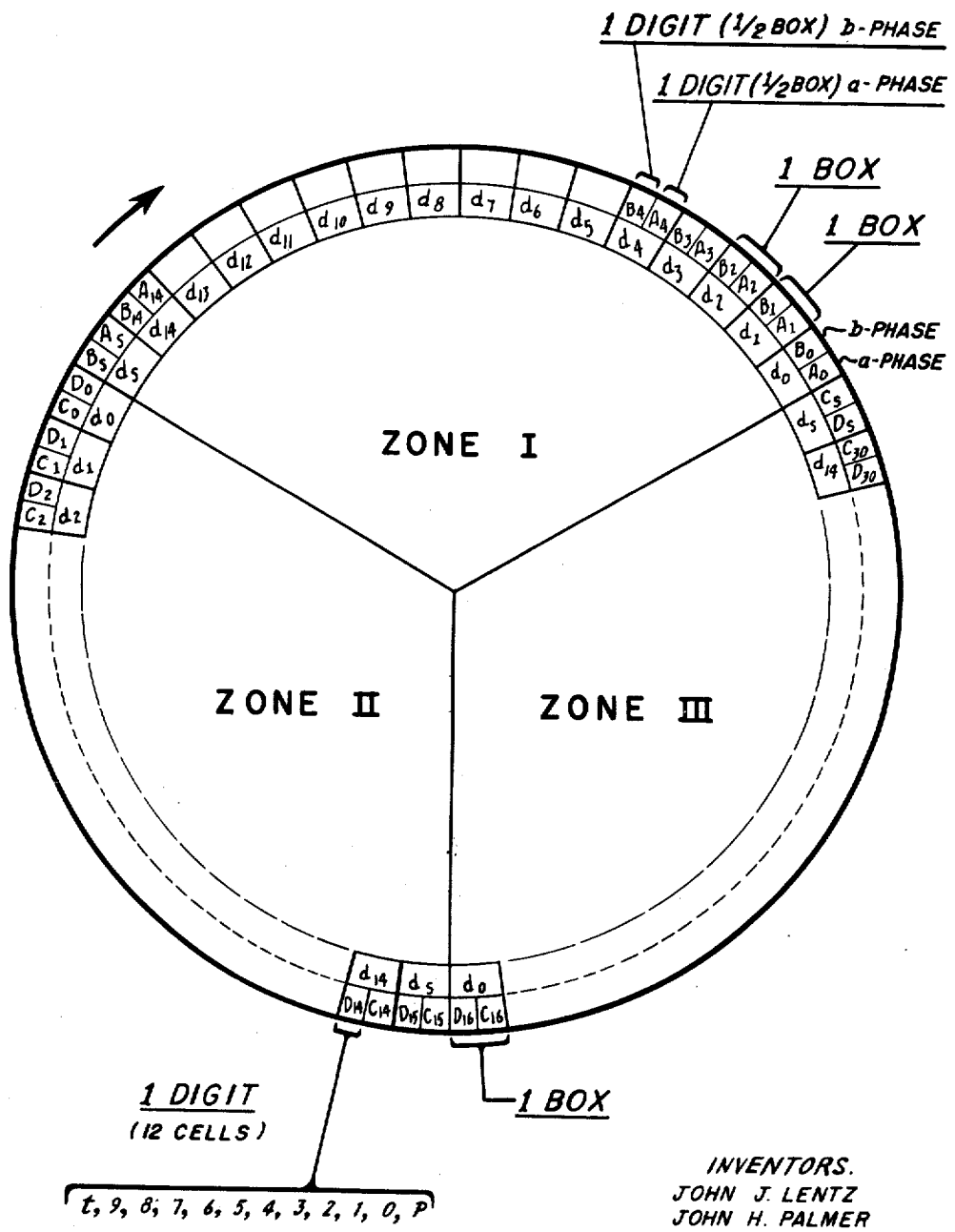
Fig. 1 is a diagram of the general manner in which data is stored in the registers of the magnetic drum storage and specifically discloses a special group of registers on a track of the drum.

Referring now to Fig. 1, information is stored upon a rotating magnetic drum turning at approximately 6500 r.p.m. in a clockwise direction as indicated in the drawing. The drum has a single "clock" or timing track containing 100 milled marks, 96 of the marks being equally spaced around its periphery and each occurs at "point-number" time, 4 of the marks being interspersed at intervals among the other 96 marks, one of these four at 96a for determining the beginning of the timing cycle and the other three 30a, 62a and 94a, for respectively determining the beginning of each of three zones of 120 degrees each into which each storage track is divided. Mark 30a lies between marks 29 and 30 and may be called mark 30 anticipate, mark 62a lies between marks 61 and 62, mark 94a lies between marks 93 and 94 and mark 96a between marks 95 and 96. Marks 30a, 62a and 94a occur at "7" time, b phase, Zones I, II, and III, respectively, and in box $d_{14}$. Mark 96a is in phase b, Zone III, box $d_s$ and also occurs at "7" time. There are a plurality of such regular storage tracks, a special track, as illustrated in Fig. 1 and also a buffer storage track on the drum. Each storage track is divided into three zones: Zone I, Zone II, and Zone III in the order of occurrence (see Fig. 1). Each zone is divided into 16 equal parts called "boxes." Each "box" is divided into two equal parts or "half-boxes," the first "half-box" a occurring first in time during the time when an electronic gate "phase a" is high (see Fig. 2). The second "half-box" b occurs when a gate "phase b" is high. Each "half-box" is divided into 12 equal parts called "cells." The "cells" in their order of timed occurrence are labeled: tag ($t$), 9, 8, 7, 6, 5, 4, 3, 2, 1, 0, point ($p$). Each cell is made up of four successive pulses (see Fig. 2) labeled in time occurrence: "space" ($s$), "alpha" ($\alpha$), "number" (#), and "beta" ($\beta$).

Referring again to Fig. 1, a zone may contain either two interleaved 16-digit numbers (or words), including algebraic signs, or as in the special track, two halves of two different 32-digit numbers. For example, in Zone I of Fig. 1 are stored the numbers A0, A1, A2, A3, etc., to As and B0, B1, B2, B3, etc., to Bs, the A number being in phase a and the B number being in phase b. The boxes are identified as $d_0$, $d_1$, $d_2$, $d_3$, . . . $d_{14}$, $d_s$ in the order of their recording or sensing, the units value of the number being recorded in the $d_0$ box, the tens order being recorded in the $d_1$ box, the hundreds order in the $d_2$ box, and the sign of the number in the $d_s$ box. This applies to both phase a and phase b numbers or words in their respective half-box positions in $d_0$, $d_1$, $d_2$, . . . $d_{14}$, $d_s$. In Zone II and Zone III, taken jointly, of Fig. 1 the numbers or words D and C, each being a 32-digit word, are stored in a similar manner. For example, D0 (units) is stored in $d_0$ of Zone II, D1 (tens) in $d_1$ of Zone II, D15 (the sixteenth order) in $d_s$ of Zone II, D16 (the seventeenth order) in $d_0$ of Zone III, D30 (the 31st order) in $d_{14}$ of Zone III, and $D_s$ (the sign) in $d_s$ of Zone III, all being in phase a. The C digits are similarly stored, in phase b.

SUMMARY OF TRACK DIVISIONS (1) A track is composed of three zones, I, II and III. The approximate time length per track is 9.2 ms. (Fig. 1).

(2) A zone is composed of 16 boxes, $d_0$ through $d_{14}$ and $d_s$. Approximate time per zone 3 ms. (Fig. 1).

(3) A box is divided in half. The first half-box occurring during phase a, the second half-box occurring during phase b. Approximate time per half-box is 96 microseconds (Fig. 2).

(4) One-half of a box, regardless of its phase, equals 12 cells called tag ($t$), 9, 8, 7, 6, 5, 4, 3, 2, 1, 0, and point ($p$). Each cell is approximately 8 microseconds in length (Fig. 2).

Figure 2:
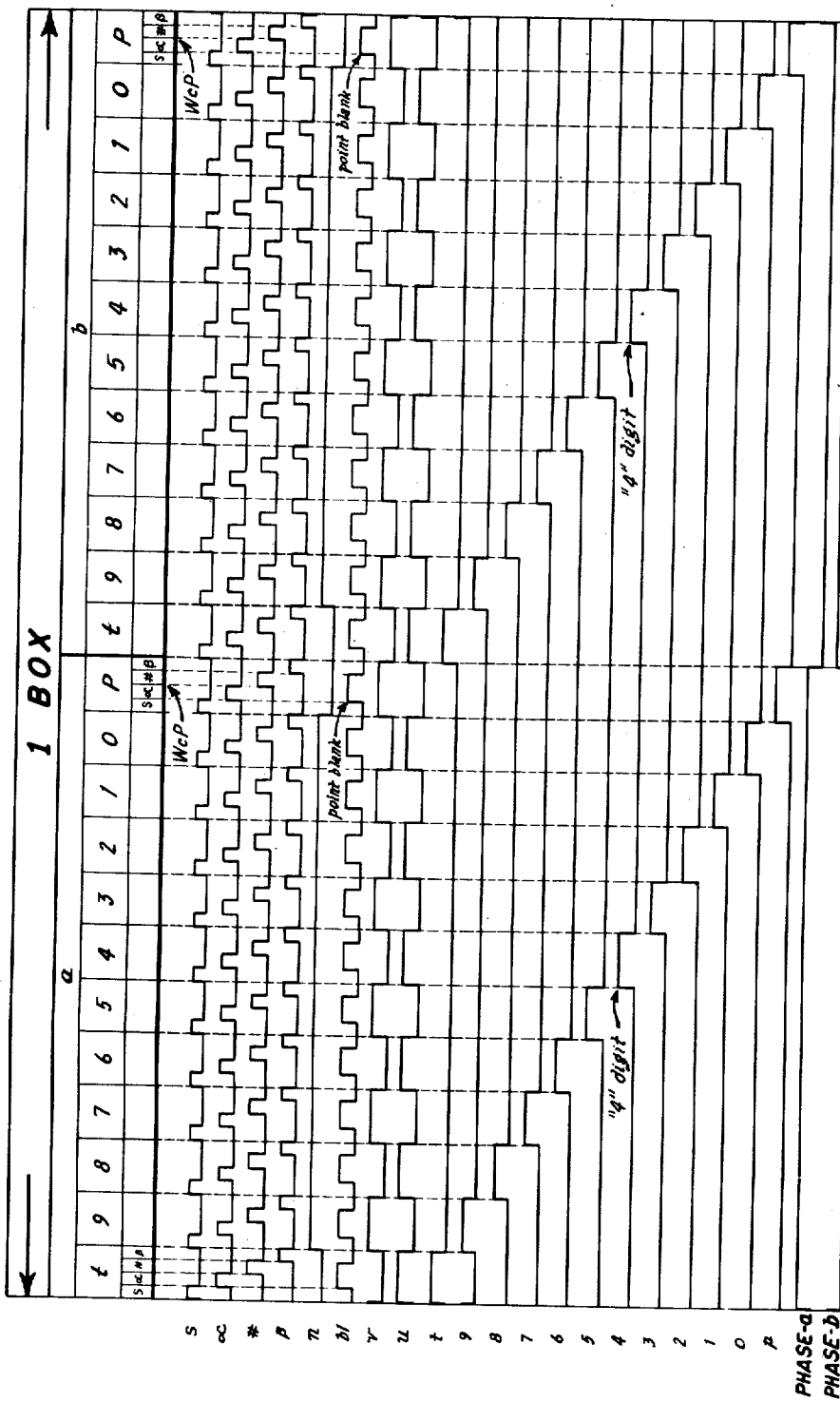
Fig. 2 is a timing chart illustrating some of the normally operating gating signals necessary for controlling operations and indexing the data in the various registers.

(5) Each cell encompasses space for recording four 2-microsecond pulses called respectively space, alpha, number and beta (Fig. 2).

THE ELECTRONIC GATES

Figure 3:
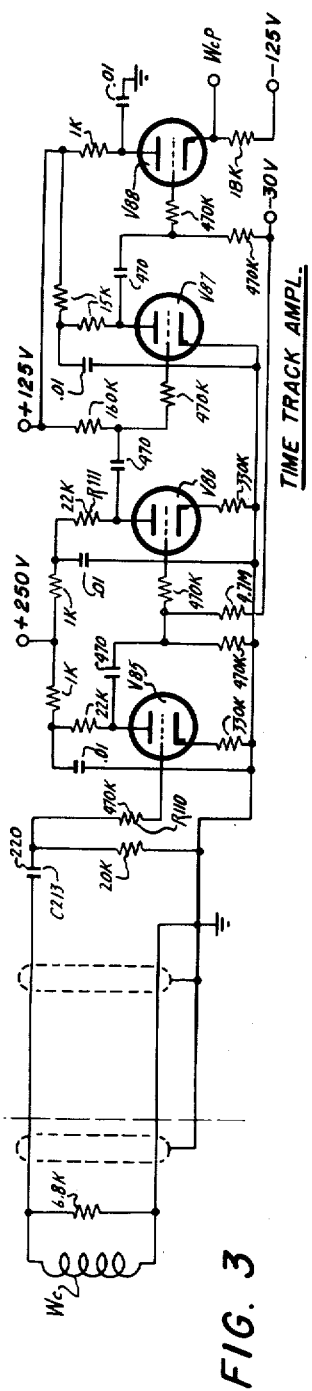
Fig. 3 is a conventional pulse forming amplifier circuit for sensing the timing track.

With reference to Fig. 2, the principal timing pulses for operation of the invention are shown. Most of these timing pulses are derived from electronic gates controlled or regulated from time pulses received from the magnetic drum timing track. Some features of the timing track are shown in copending application Serial No. 501,305 to John Alrich, filed April 14, 1955 now Patent 2,807,003 issued September 17, 1957; however, it is well to point out here certain features that are peculiar to the present invention. The 96 regular evenly spaced slots and the 4 special interspersed slots of the timing track, form discontinuities in the magnetic flux pattern of the timing track of the drum as established by a permanent magnet spaced a slight distance from that track as the drum rotates. A magnetic transducer Wc (see Fig. 3) senses these discontinuities and feeds them into a pulse forming amplifier of conventional design to provide output pulses WcP as shown in Fig. 3. These pulses, as stated above, occur at "point"-"number" time each half-box as shown in Fig. 2. The 4 special marks define the beginning of the cycle and the start of each zone and each, as stated above occurs at the beginning of the "7" digit time, these slots producing similar pulse outputs of the amplifier of Fig. 3, during the complete cycle of drum rotation but only at the 30a, 62a, 94a and 96a milled marks, as stated above.

Now with reference to Fig. 4 a free-running multivibrator circuit comprised of vacuum tubes V1a, V2a, V1b, V2b, hereafter referred to as "sync gate," has its output connected through a cathode follower V3b to an "and" gate designated by its junction 101 this "and" gate being jointly controlled by "point"-"blank" pulses (later explained herein), but see also Fig. 2. The "sync gate" is turned "on" by a "4" (Fig. 4) gate (later explained) and is turned "off" by a WcP pulse (produced by the timing track) previously referred to. The time overlap of the "sync gate" and "point"-"blank" determines the amount of charge taken from the capacitors C201 and C202 of the automatic frequency control circuit comprising vacuum tubes V4a and V4b, the output of this circuit feeding the free-running multivibrator circuit comprising a "base oscillator" formed by the triodes V5a, V5b, V7a, V7b, V8a, V8b and the diodes V6. The 96 regular WcP pulses as will now be evident regulate the "base oscillator" so that it remains in time phase with the drum's rotation over variations of drum speed. A special gate is developed via the 4 special slots of the timing track, this gate being hereafter referred to as WcN. This gate rises only during the phase b part of certain boxes (4 in all), three WcN pulses arising during "even" time and one WcN pulse arising during "odd" time (later explained). By the use of these four WcN pulses, therefore, the computing circuits are locked in with the zone gates in proper phase relative to the drum position under the reading heads, and the stored information on the drum is always read from its appropriate time location as recorded.

Four circuits of the computer utilize the WcN pulses. In Fig. 5 is shown what is hereafter called the "a—b gate oscillator" comprising triodes V9a, V9b, V10a, V10b, V11a, V11b, V12a, V12b having one input controlled by the tag pulse $t$ and the "and" circuit 102 jointly controlled by $t$ and another comprising WcN. The outputs b and a corresponding thereto are as indicated. When the circuits are first energized and the drum is rotating, the a or b output of the "a—b gate oscillator" may be high (trigger fashion); however, since WcN always rises at what should be b phase, the oscillator will be triggered to its proper phase at least once during the first drum revolution and thereafter will remain in proper phase since the $t$ input will always complement the "and" circuit 102 input thereafter.

Figure 6:
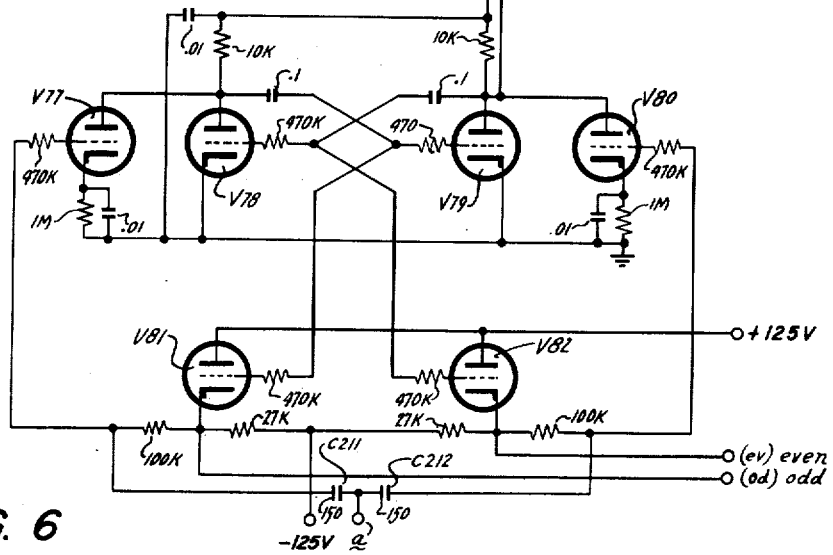
Fig. 6 is a trigger circuit (similar to that of Fig. 4) for producing odd (od) and even (ev) gates synchronizing certain steps of the timing control.

Fig. 6 shows the "odd" and "even" trigger circuit. The "even" gate is high during digit times of normal, even numbered digit positions; i.e., during $d_0$, $d_2$, $d_4$, $d_6$, through $d_{14}$, while the "odd" gate is high during the digit times of normal, odd numbered digit positions; viz., $d_1$, $d_3$, $d_5$, $d_7$, through $d_{13}$ and $d_s$. A complementing input is used to trigger the input of the "odd" and "even" trigger circuit so that if the circuit is out of phase when the computing circuits are first energized and the drum starts rotating, the network of the WcN pulse and the integrated $d_0$ "and" gate brings about the proper phase relationship. When this trigger circuit is in phase, certain controls are exercised in connection with the 4 special slots, and similarly when the circuit is out of phase. The operation of this circuitry is explained later in detail.

Although similar in many respects to the electronic gates of the first mentioned copending application above, for purposes of clarity and understanding of the description and explanations to follow, the nomenclature and other pertinent information relating to the principal gating circuits is summarized herewith.

| Gate Name | Symbol | Occurrence per revolution | Approximate Time Length for one gate |
|---|---|---|---|
| Zone | $z$ | 3 | 3 millisec. |
| $d_0$ | $d_0$ | 3 (one per zone) | 192 microsec. |
| $d_1$ | $d_1$ | do | 192 microsec. |
| sign | $d_s$ | do | 192 microsec. |
| a phase | "$a$" | 48 (one per box) | 96 microsec. |
| b phase | "$b$" | do | 96 microsec. |
| number | $n$ | 96 (two per box) | 8 microsec. |
| tag | $t$ | do | 8 microsec. |
| 9 | 9 | do | 8 microsec. |
| 8 | 8 | do | 8 microsec. |
| 7 | 7 | do | 8 microsec. |
| 6 | 6 | do | 8 microsec. |
| 5 | 5 | do | 8 microsec. |
| 4 | 4 | do | 8 microsec. |
| 3 | 3 | do | 8 microsec. |
| 2 | 2 | d1 | 8 microsec. |
| 1 | 1 | do | 8 microsec. |
| 0 | 0 | do | 8 microsec. |
| point | $p$ | do | 8 microsec. |
| blank | $bl$ | 1152 (twenty-four per box) | 4 microsec. |
| space | $s$ | do | 2 microsec. |
| alpha | $\alpha$ | do | 2 microsec. |
| number | # | do | 2 microsec. |
| beta | $\beta$ | do | 2 microsec. |

Throughout the following gating circuits it is to be noted that free running multivibrators are used in lieu of bistable triggers, since a free running circuit of this kind, having a period longer than the maximum possible period that it may be called upon to perform, need not be designed with the precision otherwise required and also provides a simpler circuit. In the gating circuits which follow it is generally taken that the high condition of the gate will be considered to be ground potential and the low condition of the gate −30 volts; however, it is quite understandable that other values could be used. Nevertheless, the parameters of the circuits as indicated in the drawings are set to these requirements for the most effective operation. It is also necessary to consider several of the gating circuits collectively since they are interdependent upon one another, as will be hereinafter explained.

Figure 4:
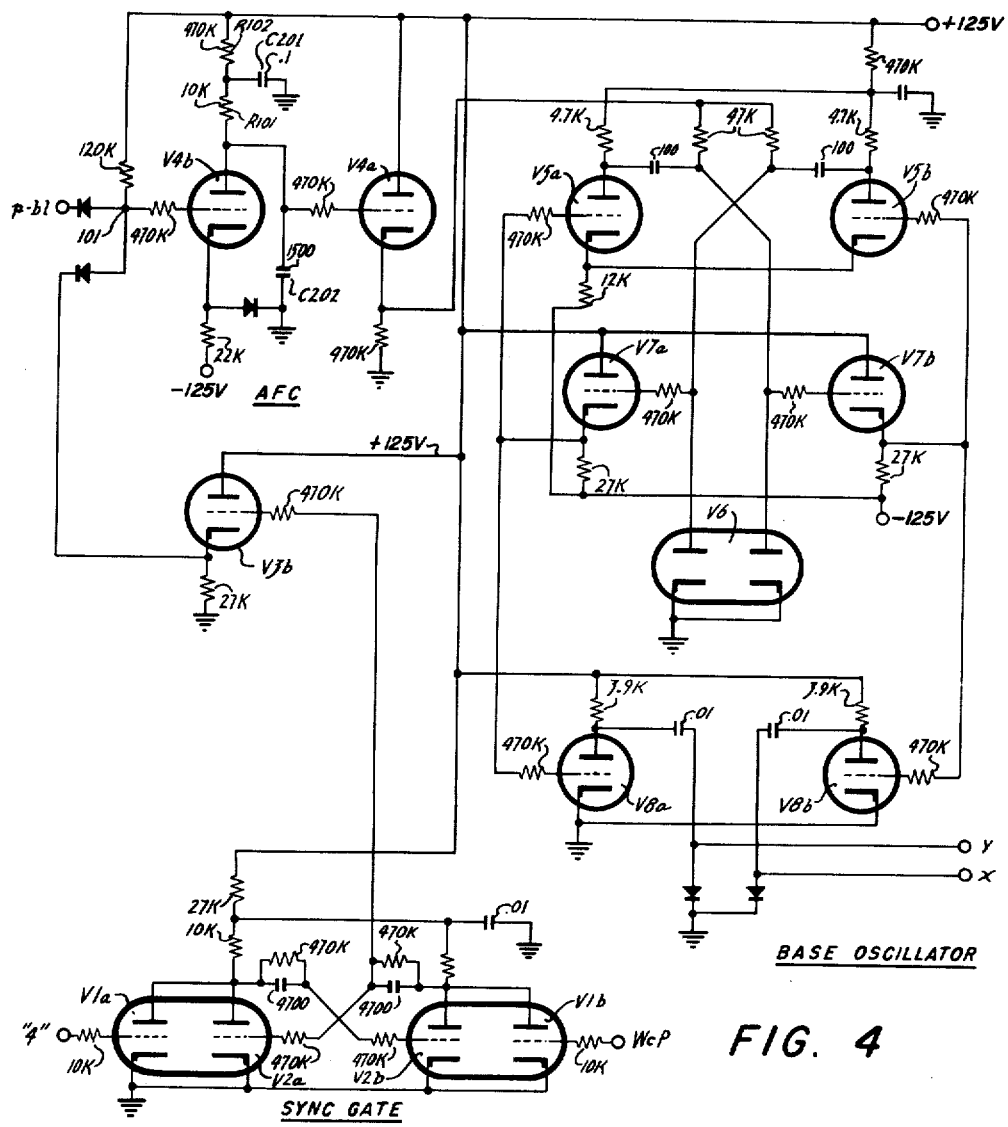
Fig. 4 is a trigger circuit of the free running type used in connection with the timing of the various gating circuits, together with a standard automatic frequency control circuit and an oscillator circuit.

Now describing the operation of the circuit of Fig. 4, in detail, and referring to Figs. 2, 4 and 4a, it will be noted that the combined circuit of Fig. 4 comprises a base oscillator, which is a free running multivibrator, having its frequency determined by an automatic frequency control voltage, an automatic frequency control voltage generator, whose output is a function of the drum speed (as a result of receiving WcP pulses), and a sync gate controlled by these WcP pulses, which determines the proper automatic frequency control voltage, is involved. The sync gate is turned on by a "4" digit pulse (later explained) and turned off by a WcP pulse from the timing track of the drum. Normally the WcP pulse will occur at approximately "point" ($p$)-"number" (#) time (see Fig. 2). Consequently, the sync gate output will be high from "4" digit time through "$p$-#" time, and low from "$p$-#" time to "4" digit time. The exact time at which the sync gate is turned off is of crucial importance in the operation of this circuit. Under normal operation when the sync gate is turned off by a WcP pulse at "$p$-#" time, the "and" circuit of junction 101 (see Fig. 4), which is controlled by the "point" ($p$)-"blank" ($bl$) diode connection and the diode connection to the sync gate, allows the grid of vacuum tube V4$b$ to rise for approximately 2 microseconds. The cathode resistor of V4$b$, when the latter is conducting, insures that the network made up of the capacitors C201 and C202 and the resistors R101 and R102 will be discharged. When vacuum tube V4$b$ returns to its normally cutoff condition, the capacitor C202 will be recharged. The voltage fluctuation across the network, previously mentioned, is passed on to vacuum tube V4$a$ and its cathode follower output is passed on to the base oscillator. Consequently, as the automatic frequency control voltage derived from vacuum tube V4$a$ rises, the base oscillator frequency increases, and vice versa. Since the WcP pulse is read directly from the engraved clock track on the drum, the interval between WcP pulses will vary as the speed of rotation of the drum varies. Since all gating circuits and operations of the computing circuits must be timed accurately with the speed of rotation of the magnetic drum, the circuit of Fig. 4 exercises control in the following manner. For example, when the drum speed increases slightly, the WcP pulse will occur, let us say, a half microsecond early and the sync gate will be turned off a half microsecond early. This results in a shortened overlap of the input to the junction 101 of the "and" circuit previously mentioned, involving the "$p$-$bl$" pulse and the pulse derived from the sync gate which has just been turned off by the WcP pulse. As a result, less charge will be taken from the capacitor C202 and the average value of the automatic frequency control voltage will be slightly greater. The increased value of the automatic frequency control voltage will therefore cause the base oscillator frequency to increase. When the WcP pulse occurs later than normal, the reverse conditions are set up, a longer overlap of the "$p$-$bl$" pulse and the sync gate output occurs at junction 101 and the base oscillator is caused to reduce its frequency. The base oscillator supplies an "$x$" gate and a "$y$" gate (see Fig. 4), which, in view of the time constants of the oscillator, are each high for 2 microseconds when the drum is running at its normal speed of approximately 6500 r.p.m. The uses of the "$x$" and "$y$" gates, representing the output of the base oscillator, will be discussed hereafter. It is to be noted that the time during which each of these gates is high may vary by a few percent as the drum speed varies over certain limits; however, synchronization is maintained over relatively wide variations in the manner which has just been explained. (Note in Fig. 4$a$ the circuit bearing the symbols K and I; in this circuit and in circuits which will be described later, these symbols are used to indicate cathode followers and inverters, respectively.)

Figure 7:
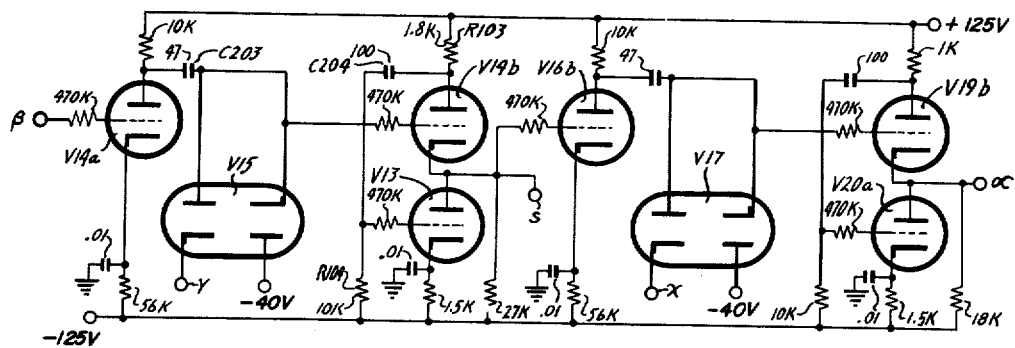
Fig. 7 is a diagram of a pulse forming circuit for the space and alpha gates.

Referring again to Fig. 2, it is to be pointed out that all of the gates such as, for example, "space" ($s$), "alpha" ($\alpha$), "number" (#), etc., are formed by means of pulse forming circuits. These circuits are explained hereafter in greater or lesser detail in order to show how the basic gating pulses are derived. For example, and referring now to Fig. 7, let it be assumed that a "$\beta$" pulse produced as described presently under control of the $y$ pulses arrives at the grid of vacuum tube V14$a$. This pulse will cause that tube to conduct, thereby dropping its anode voltage and charging capacitor C203 by the way of the right diode of vacuum tube V15 which is clamped to −40 volts. When the "$\beta$" pulse falls, the anode of vacuum tube V14$a$ will rise, thus causing the grid of vacuum tube V14$b$ to rise to ground potential, which potential will be maintained since the "$y$" pulse (see Fig. 4) applied to the cathode of diode V15 as indicated at this time is also at ground potential and will not allow the grid of V14$b$ to go higher. However, when the "$y$" pulse drops, the left section of the diode V15 will discharge capacitor C203 and return the grid of vacuum tube V14$b$ to −40 volts. In this way, a pulse will be generated on the grid of vacuum tube V14$b$ that will be 2 microseconds wide and will rise when the "β" pulse falls and will fall when the "y" gate falls to produce the "s" pulse. Vacuum tube V13 is used to discharge the network in the cathode circuit of the cathode follower V14b when the grid potential of that tube falls. For example, when the grid of V14b is at a high potential, its cathode is at a high potential and its anode is at a reduced potential due to the voltage drop through the resistor R103. This voltage drop is differentiated through a capacitor C204 and a resistor R104 and forms a short pulse that causes vacuum tube V13 to be at least partly cut off when it receives the negative pulse from the anode of vacuum tube V14b. It is obvious, also, that when vacuum tube V14b receives a positive pulse, it will conduct at a higher rate. Therefore, in either case vacuum tube V13 aids the cathode follower (vacuum tube V14b) to discharge or charge the capacitance network rapidly. The "s" pulse, or the output of the cathode follower represented by vacuum tube V14b, rises in approximately 1/10 microsecond and falls in approximately the same time.

Figure 8:
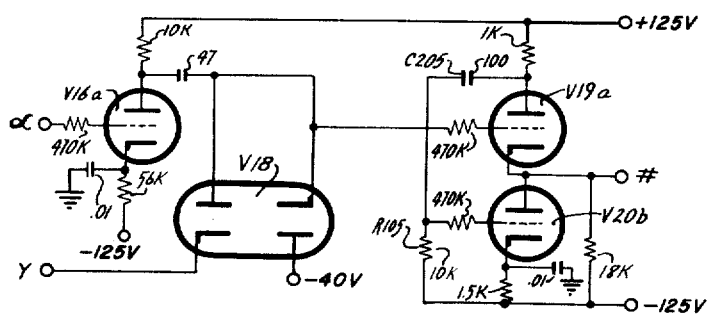
Fig. 8 is a diagram of a pulse forming circuit for the number gate.
Figure 26:
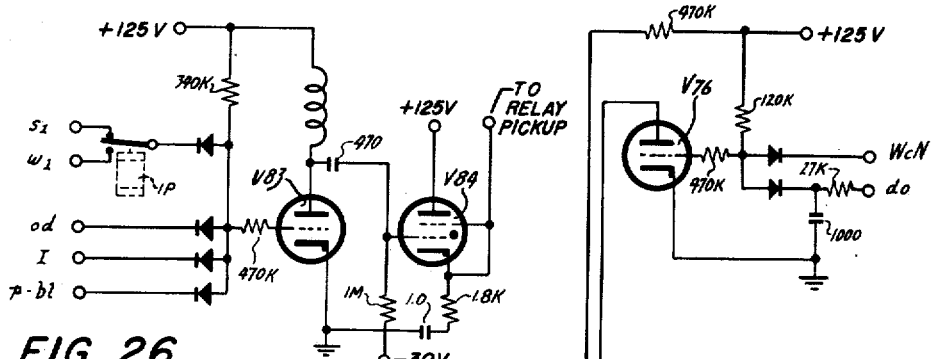
Fig. 26 is a typical thyratron control circuit utilizing a choke coil to assist the pick-up of the thyratron.

The "s" pulse in turn is applied to the grid of vacuum tube V16b and the operation takes place in a similar manner as for the generation of the "s" pulse except that the discharge operation is now done by an "x" pulse rather than a "y" pulse, and again a pulse is formed that is delayed 2 microseconds, being locked into the rise of the "s" pulse to produce the "α" pulse via vacuum tube V19b. The "α" pulse will rise when the "s" pulse falls and the "α" pulse will fall when the "x" pulse discharges the capacitor which feeds the vacuum tube V19b, as previously described in connection with the generation of the "s" pulse. Similarly, vacuum tube V20a is used as a discharge aid to assist reducing the network pertaining to the cathode follower vacuum tube V19b when the latter is falling. In a similar manner (see Fig. 8) the "#" pulse is formed via vacuum tube V19a, originating with the "α" pulse and making use of a "y" pulse to discharge via the diode V18. The vacuum tube V20b again assists in the discharging of the R-C network of capacitor C205 and resistor R105. It is to be noted that the negative potential supplied to the diode in connection with the "s," "α," "#" and "β" gates is −40 volts, rather than −30 volts which is normally used.

Figure 9:
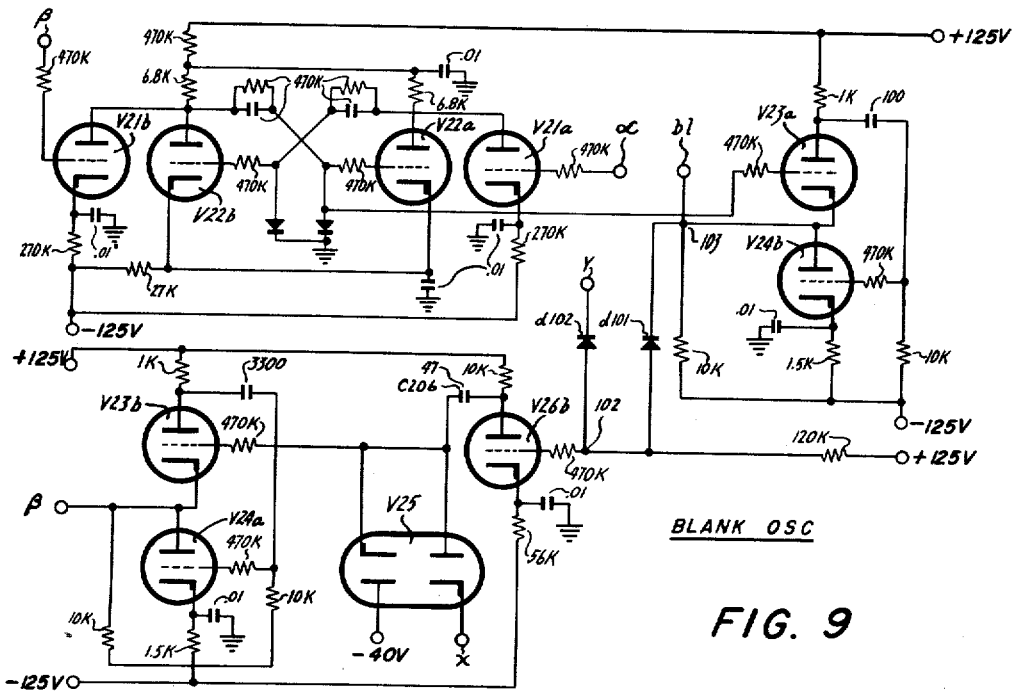
Fig. 9 is a diagram of a free running multivibrator comprising the Blank Oscillator, having two trigger inputs for arbitrarily changing its state of conductivity.
Figure 10:
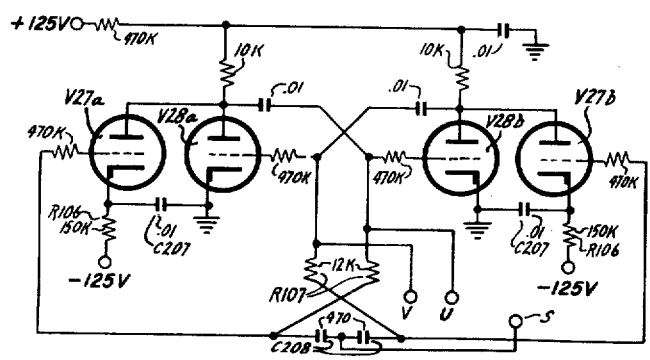
Fig. 10 is a free running multivibrator comprising the numbers oscillator, having only a single trigger input for changing its state of conductivity for producing the $u$ and $v$ gates.

Actually, the "s," "α," "#" and "β" pulses or gates form a chain, and it is necessary that this chain of gates be properly started. Referring to Figs. 9, 9a and 10, with special reference to Fig. 9, it is to be noted that the blank oscillator is a multivibrator which is controlled by a "β" pulse for locking it into one condition of conductivity and which is placed into the other condition of conductivity by an "α" pulse. Again referring to Fig. 9, it is to be noted that the lower left section of this circuit containing the vacuum tubes V26b, V25, V23b and V24a comprises a pulse forming circuit similar to that which has been previously described. The input of the circuit of Fig. 9 is the junction 102 of the diodes D101 and D102 (see center of Fig. 9). These diodes form an "and" gate at junction 102 which supplies a pulse to the grid of vacuum tube V26b, which starts the cycle of the chain of "s," "α," "#" and "β" pulses. When the circuit is first energized, the output derived from vacuum tubes V23a and V24b at junction 103 will either be at ground potential or will rise to ground potential shortly thereafter due to the free running characteristic of the blank oscillator made up of the vacuum tubes V21b, V22b, V22a and V21a, as long as no pulses are applied to the grids of vacuum tubes V21b and V21a. It is to be recalled that the base frequency generator of Fig. 4 is of the free running type; consequently, when its "y" pulse rises, the junction 102 will receive a pulse causing vacuum tube V26b to conduct. With further reference to the base frequency generator or base oscillator, it will be recalled also that when the "y" pulse is high, the "x" pulse is low, and vice versa. When vacuum tube V26b conducts, its anode voltage drops, and since it is synchronized with the rise of pulse "y" the grid of vacuum tube V23b which is under the control of pulse "x" is low and, similarly, its cathode. When the "y" gate from which the "y" pulse is derived falls, the plate voltage of V26b will rise at the same time that the "x" gate rises, and the grid of vacuum tube V23b will rise to ground, thereby providing a "β" pulse to be fed from the cathode of vacuum tube V23b. Two microseconds later when the "x" gate falls, discharging the capacitor C206, the output from the cathode of vacuum tube V23b will fall. Since the "β" pulse is definitely formed in this manner, the "s," "α" and "#" pulses will follow in turn as previously described. These pulses also will force the blank oscillator to lock in at the appropriate frequency and the "blank" (bl) gate will be formed so that once the drum and the base oscillator circuits are synchronized, the "bl" gate (output from junction 103) will be high at the start of the "α" pulse and will remain high throughout the duration of the "#" pulse; in other words, the "bl" gate will fall at the start of "β" time and will remain low until the start of "α" time. The circuit constants of the vacuum tubes V21a and V21b are so provided that, regardless of the condition of conductivity of the blank oscillator at any time, the operation which has just been described will be brought about. The diode V25 exercises a clamping action over both "α" and "β" pulses.

Referring now to Fig. 10, a numbers oscillator, formed by the vacuum tubes V27a, V28a, V28b and V27b produces u and v gates (see Fig. 2) as will now be described. An "s" pulse, derived as explained previously, is supplied to both grids of the vacuum tubes V27a and V27b. With the circuit constants shown and with vacuum tube V28b conducting, there will be a resultant voltage on the grid of vacuum tube V27a of approximately 15 volts negative with respect to its cathode. Also, the grid of vacuum tube V27b will be at approximately 45 volts negative with respect to its cathode. Under the assumption that vacuum tube V28b is conducting (its grid therefore being at ground potential), when an "s" pulse rises from −30 volts to ground potential, the grid of vacuum tube V27a will rise until conduction takes place. Since at this time the grid of vacuum tube V27b is at −45 volts, a rise of 30 volts will not cause it to conduct since it will be still cut off by approximately −15 volts, as has been explained. (The duty cycle of the vacuum tubes V27a and V27b is controlled by the cathode network of each of these tubes represented by resistor R106 and capacitor C207.) Continuing, when the vacuum tube V27a conducts, the numbers oscillator will be triggered into its other condition of conductivity so that the anode of vacuum tube V28a will drop, initiating a negative pulse into the grid of vacuum tube V28b, cutting off the latter tube and causing its anode potential to rise, and thereby transferring the positive-going pulse to the grid of the tube V28a. This is the typical "flip-flop" operation of a trigger circuit. The grids of the vacuum tubes V28a and V28b are stabilized by the R-C network represented by resistor R107 and capacitor C208, so that between "s" pulses the voltages on the grids of vacuum tubes V27a and V27b will always stabilize, permitting further triggering action. Following the type of operation just described, the numbers oscillator will reverse its condition of conductivity each time an "s" pulse is delivered to the junction of the capacitor C208.

Returning to Fig. 2, the "u" and "v" gates are generated as outputs from the circuit of Fig. 10 each time an "s" pulse is received. It is quite obvious that the "u" and "v" pulses are complementary with respect to one another.

Figure 11:
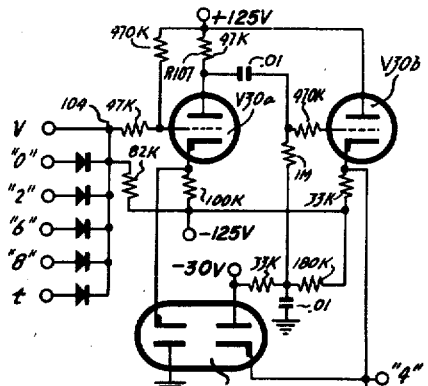
Fig. 11 is a series of pulse forming circuits for providing the "4" and "3" numbers gates under control of output pulses of the circuit of Fig. 10.
Figure 12:
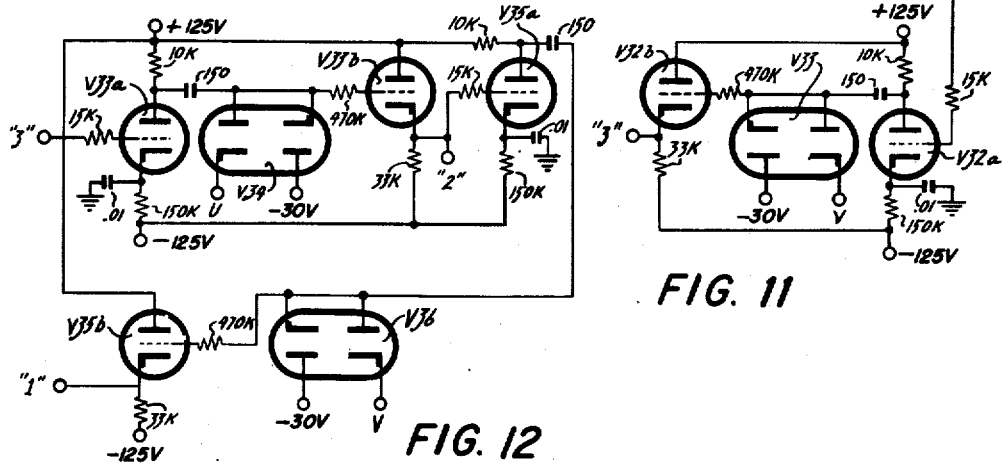
Fig. 12 is a series of pulse forming circuits similar to Fig. 11 for producing the "2" and "1" numbers gates.

Referring now to Figs. 2, 11 and 11a, the "numbers" gates are generated by pulse forming circuits, one such circuit feeding into another to provide successions of "numbers" gates under the control of the "u" and "v" gates just described. The "numbers" gates are restarted each drum cycle in a similar manner to the restarting of the "s," "α," "#," "β" pulse chain previously discussed. This insures that proper synchronization of the gates occurs for each drum cycle. As mentioned earlier, the "4" digit pulse is the first "numbers" pulse to be generated. This is brought about directly from the output of the numbers oscillator of Fig. 10 via a "v" pulse. Referring now to the "or" circuit of Fig. 11 having its junction 104 common to the "v" input together with the "0," "2," "6," "8," and "tag" (t) inputs for providing a pulse to vacuum tube V30a, the grid of vacuum tube V30a will be negative only at "4" digit time due to the fact that the "or" circuit previously discussed is low during only that time. It is to be noted that the output of the numbers oscillator with respect to the "v" pulse is passed through a cathode follower (not shown), thereby insuring additional safety factor in operation of the circuit. The "v" pulse output is high for the "9" digit, "7" digit, "5" digit, "3" digit, "1" digit and "point" (p) times. At other digit times, namely, "0," "2," "6," "8," and also the "t" digit times, the vacuum tube V30a will be held high through the "or" circuit via junction 104. Since the cathode of V30a is clamped to ground potential through the left diode of vacuum tube V31, current will flow in the anode resistor R107. At "4" digit time when the grid of vacuum tube V30a falls, the tube will be cut off and a positive-going pulse will be delivered to the grid of vacuum tube V30b, causing the cathode of the latter tube to emit a pulse which is the "4" digit pulse. The "4" digit pulse is thereafter fed into another pulse former similar to the one described, however being under the control directly of a "v" clamping pulse (see right section of diode V33). V32a is therefore rendered conductive and at the next "v" pulse (in this instance directly from the numbers oscillator and not through the cathode follower previously mentioned) a pulse corresponding to the "3" digit pulse will be emitted from the cathode of the vacuum tube V32b in precisely the same manner as the "4" digit pulse was emitted from the cathode of the vacuum tube V30b. Referring now to Fig. 12, the "3" digit pulse is passed into another pulse forming circuit comprising vacuum tubes V33a, V33b and the diode V34 so that upon the next pulse from the numbers oscillator, which is now a "u" pulse, a "2" digit pulse will be emitted by the cathode of the vacuum tube V33b in a manner similar to that which has been described with the production of the "3" digit pulse. Similarly, the "2" digit pulse is fed into a further pulse forming circuit comprising the vacuum tubes V35a and V35b and the diode V36, whereupon under the control of the next pulse from the numbers oscillator, which is now a "v" pulse, the cathode of vacuum tube V35b will emit a "1" digit pulse.

When the circuits are first energized, the numbers oscillator (Fig. 10) will immediately provide "u" and "v" pulses, and when the cathode follower into which the "v" pulse is fed goes high, regardless of the condition of any of the "numbers" gates, the chain of "numbers" pulses will be started since the "or" circuit of Fig. 11 will immediately go into operation, as has been described. The "4" digit gate will then be formed and the cycle which is herein described will follow.

Figure 13:
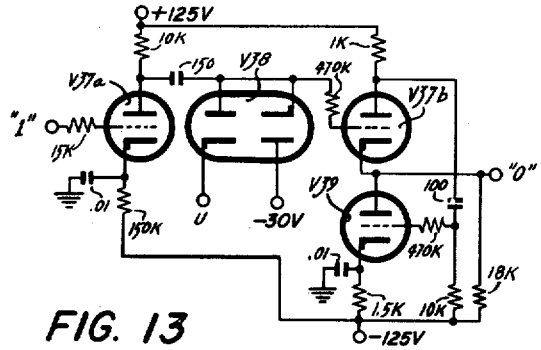
Fig. 13 is a special pulse forming circuit including a quenching facility for producing the "0" numbers gate.

The "0" digit pulse is formed under initiation from a "1" digit pulse by a similar pulse former; however, since the "0" digit is at an extremity of the "numbers" chain of pulses and is followed in sequence by a "p" pulse, a special quenching circuit is provided. With reference to Fig. 13, the "0" digit is formed by a "1" digit pulse energizing the grid of the vacuum tube V37a which is part of a pulse forming circuit comprising that vacuum tube and vacuum tube V37b together with the diode V38. A quenching tube, vacuum tube V39, and its associated circuit, is provided to assist the discharge of the vacuum tube V37b much in the same manner as has been described in connection with vacuum tube V24a of Fig. 9. An identical circuit is provided for generating the "p" pulse from the initiating "0" digit pulse since the "p" pulse is also separate and distinct from the "numbers" chain of pulses and is followed by a "t" pulse described later herein. It is to be noted that the "0" digit pulse is formed under the control of a "u" pulse, while the "p" pulse is formed under the control of a "v" pulse.

Figure 14:
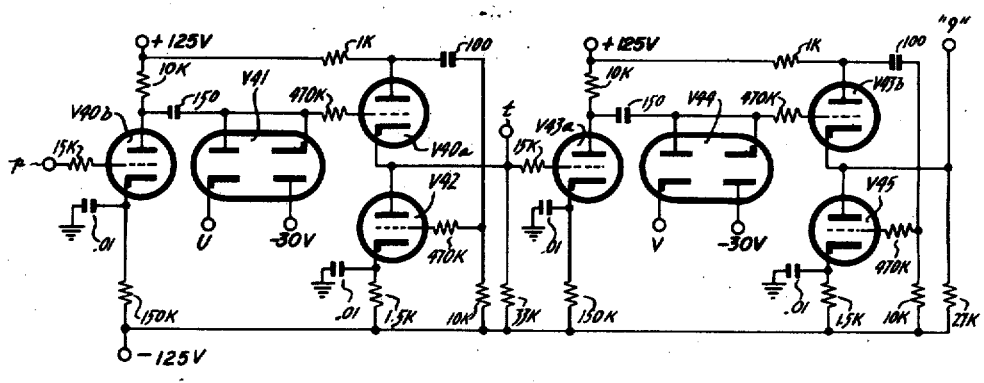
Fig. 14 is a series of pulse forming circuits similar to the circuit of Fig. 13, showing the coupling therebetween for producing the "t" and "9" gates.

Fig. 14 illustrates the manner in which the "t" (tag) and "9" digit pulses are derived, the "t" pulse being derived from the "p" pulse and the "9" digit pulse being derived from the "t" pulse much in the same manner as has been described in connection with the derivation of the "0" digit pulse and the "p" pulse. The pulse forming circuit comprising vacuum tubes V40b, V40a, and diode V41 and the quenching tube V42, under control of a "u" pulse, produces the "t" pulse under initiation of a "p" pulse. Similarly, the pulse forming circuit comprising the vacuum tubes V43a and V43b and the diode V44 with the quenching tube V45 provides a "9" digit pulse under the initiation of a "t" pulse. With reference to Fig. 15, the "9" digit pulse is fed into a pulse forming circuit comprising vacuum tubes V46a, V46b and diode V47 to provide, under the control of a "u" pulse from the numbers oscillator, the "8" digit pulse which, in turn, is fed into a further pulse forming circuit comprising vacuum tubes V48a, V48b, the diode V49 and the quenching tube V50 to provide, under the control of a "v" pulse from the numbers oscillator, the "7" digit pulse. In a similar manner, no further circuits being shown, the "6" digit pulse is derived under control of a "u" pulse from the numbers oscillator by initiation of the "7" digit pulse, and the "5" pulse under control of a "v" pulse from the numbers oscillator is provided from initiation of a "6" digit pulse. It is to be noted that the chain of "numbers" pulses originates with the "4" digit pulse and in successive fashion under control of the numbers oscillator the succeeding "numbers" pulses are generated in the order, 4, 3, 2, 1, 0, p, t, 9, 8, 7, 6, 5. Thereafter, the "numbers" pulses or gates are restarted by the initiation of a "v" pulse through the cathode follower previously described.

MISCELLANEOUS CIRCUITS

In order to understand the operation of an embodiment of the invention later herein described, certain circuit components will now be described to which reference will later be made. These circuits have no independent function except in connection with the invention per se in the understanding of the operation and logic of the description which follows. Consequently, the structure of each of these circuits, together with a general statement of its function, will be set forth, where applicable. Circuit constants, being significant, are also shown throughout.

Fig. 16 represents a differentiating circuit comprising the vacuum tubes V51, V52a, V52b and the diode V53. An input pulse $d_0$ produced as described presently is supplied to the grid of vacuum tube V51. This provides an output from the cathode of that tube known as $d_0'$. At the same time the signal is passed to vacuum tube V52a which, together with vacuum tube V52b and the diode V53, comprises a pulse forming circuit to produce pulse $d_1$ under the control of the gate "od" which is hereinafter described.

Reference is also made at this time to Fig. 17 which shows the voltage supply network filters with respect to the −30 volts used for the pulse forming circuits and the positive and negative 125 volt supply.

Figure 18:
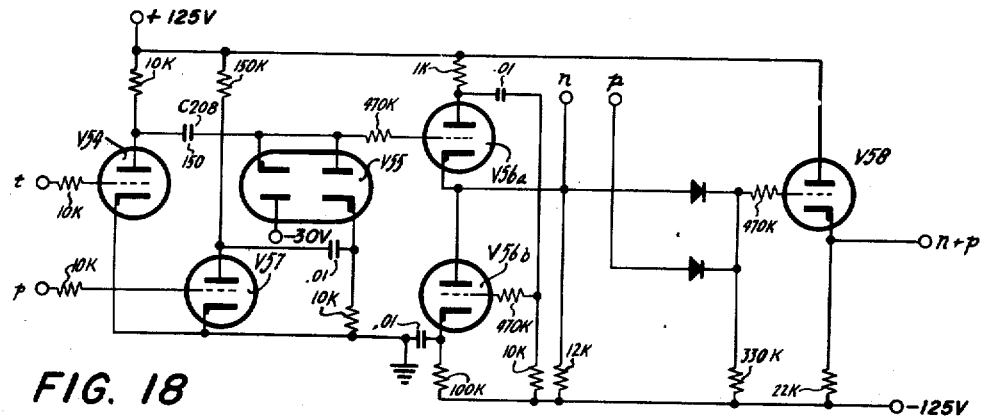
Fig. 18 is a pulse forming and pulse combining circuit for producing the $n$ and $n+p$ gates.

Referring now to Fig. 18, there is shown a pulse forming and combining circuit which produces the "numbers" gate. The "numbers" gate (n) is used for separating the "t," digits and "p" pulses so as to isolate the digits pulses for purposes of transferring data in the form of digits pulse representations. It is also desirable at times, as will later be explained, to group the digits pulses together with "p" pulses, as, for example, in decimal point control operations. The "t" pulse has already been derived as explained previously. The "t" pulse, therefore, can be fed into the input of a pulse forming circuit comprised of vacuum tube V54, diode V55 and vacuum tubes V56a, V56b and V57 to provide a pulse $n$ (Fig. 2) which will rise at the end of the "$t$" pulse and fall at the beginning of the "$p$" pulse, the latter having also been explained in the foregoing explanation. Let it be considered that tube V54 is conducting so that a pulse arriving at its grid of negative potential, such as the fall of the "$t$" pulse, will cause V54 to stop conducting. The anode potential of V54 therefore rises and the capacitor C208 is charged by the left-hand section of the diode V55. This action provides an input to the grid of vacuum tube V56a, causing the latter to conduct, and its cathode rises to produce a pulse output at "$n$" until such time as a "$p$" pulse is delivered to the vacuum tube V57 which thereat becomes conductive and the capacitor C208 is discharged through the right-hand diode of V55. Consequently, the "$n$" or "numbers" gate will rise at the fall of "$t$" time and fall at the beginning of "$p$" time. In the manner described during any half-box a control can be exercised whereby "tag," any of the digits, and the decimal point can be separated. There are occasions, however, where it is desirable to provide a gate similar to the "numbers" gate just described which will be high during "$n$" and "$p$" time so that by delivering a further "$p$" pulse to the grid of vacuum tube V58 which normally receives the output of the "$n$" gate, it is possible to obtain from the cathode of V58 a pulse which rises at the end of "$t$" time and falls at the beginning of "$t$" time, thereby embracing the time during which all the digits pulses occur and the "$p$" pulse.

Figures 19, 22:
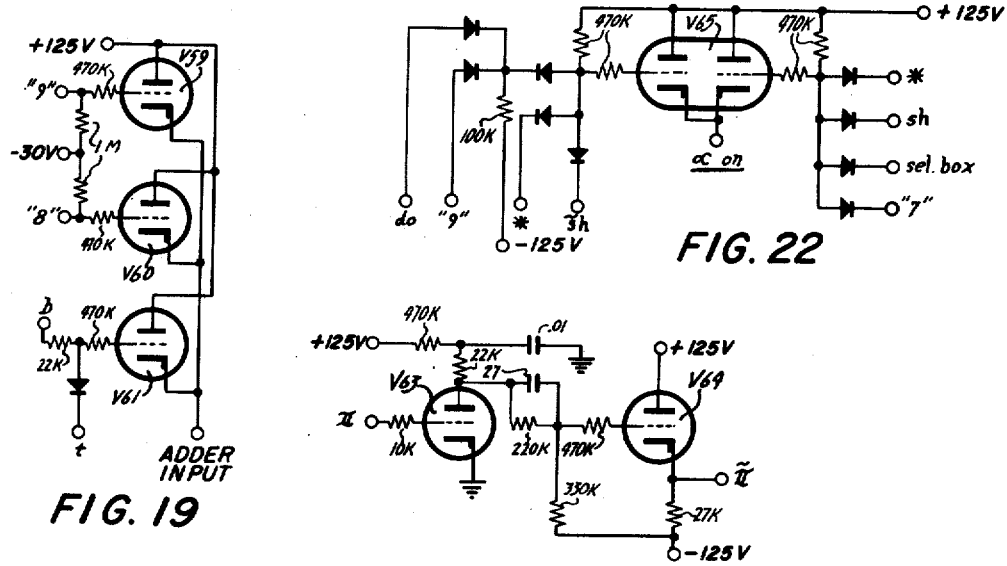
Fig. 19 is a cathode follower circuit having a multiple input "or" circuit connection.
Fig. 22 is a multiple "and" input circuit having a single output comprising the "$\delta$ ON" gate.

Fig. 19 shows a cathode follower circuit where a plurality of inputs can be separately supplied to give a common output as, for example, to the adder input circuit, which is later described herein. In the figure the most common application of a circuit of this kind is shown wherein a "9" digit pulse may be supplied to the grid of tube V59 or an "8" digit pulse supplied to the grid of V60, each of these tubes normally being biased below cutoff, and in another instance in connection with tube V61 the special single diode "and" circuit comprising a "$b$" phase gate and a "$t$" pulse, which together provide a pulse to render V61 conductive at certain other times.

Figure 20:
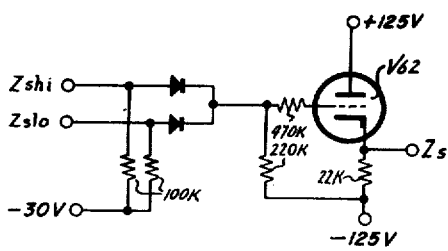
Fig. 20 is a circuit for producing the $Z_s$ gate.
Figure 39:
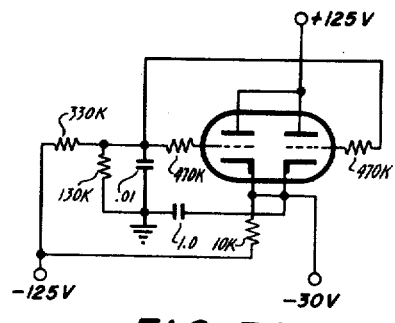
Fig. 39 is a voltage divider network for the −30 volt supply.

Fig. 20 illustrates a circuit somewhat similar to that of Fig. 19; however, here the two inputs of the "or" circuit are not isolated by vacuum tubes. The application of this circuit is generally in connection with a two zone register as will be later described wherein the first zone of the two zone register may be represented by $Z_s$ high ($Z_s$hi) and the other section of the register may be represented by $Z_s$ low ($Z_s$lo). When both of these pulses are delivered to the vacuum tube V62, its output will rise at the beginning of either of these pulses and fall at the end of the last pulse that has been provided; that is, the output $Z_s$ will provide a replica of either $Z_s$hi or $Z_s$lo or will be maintained during the duration of both of these pulses.

Figure 21:
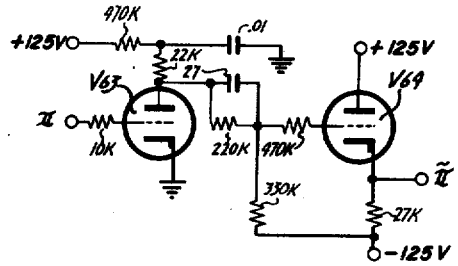
Fig. 21 is a direct current inverter circuit such as is employed in producing the inverted zone II gate.

With reference to Fig. 21, a direct current inverter circuit is shown comprising the vacuum tubes V63 and V64. The function of this circuit is to convert a given input voltage between ground and −30 volts so that the output will vary as an inverse function of the input. This type of circuit is frequently used to differentiate between a zone signal, for example, and as shown from a Zone II zone pulse feeding into vacuum tube V63 there is derived an inverse pulse Zone II (designated by a $\overline{II}$) which is the inverse of the input. As will be later shown, two inverter circuits of this type may be combined to provide a bistable trigger, which finds use in the logic circuitry which is explained later.

Fig. 22 illustrates a typical multiple "and" input circuit in connection with the dual triode V65. In either input a combination of pulses derived from digit pulses, timing or relay operations is combined to bring about a single result, for example, the turning on of an "$\alpha$" gate. The function of this circuit is brought out later in the logic description of the device.

Fig. 23 is a pulse stretching circuit comprised of vacuum tubes V65, V66 and V67. This circuit is used in conjunction with the WcN pulse previously discussed in connection with the special marks on the timing track of the magnetic drum. The input of V65 receives the special WcN pulses, three of which occur at even ("ev") time per revolution and only one of which occurs at odd ("od") time. The "od" signal applied to the cathode of tube V66 thus coincides, once per revolution, with the single WcN pulse which occurs at "od" time, once per revolution. Thus the signal $I_a$, which is designated as the Zone I anticipate pulse, is produced, once per drum revolution. This signal $I_a$, as indicated, is applied to the grid of tube V68 of Fig. 24 and is of particular utility in producing a "special type" of the signal $d_0$, employed only in synchronizing the circuit of Fig. 6, as described later, when the odd-even trigger is operating out of step.

As illustrated, the usual pulse producing circuit of Fig. 24 employs the $d_s$ pulse as its input, which, in conjunction with the "ev" signal applied to the right cathode of the dual diode V69 produces three $d_0$ pulses, each revolution, at the output of Fig. 24, as indicated.

In Fig. 24a there is illustrated the circuits of Figs. 23 and 24 combined. The input is again WcN. As stated above, 3 times per revolution, the signal WcN rises at "ev" time. Each of these, as stated above, occurs at "7" time, in box $d14$, and occurs at $b$ phase time for Zones I, II and III. The grid of the triode connected to the 470K$_1$ resistor thus falls at $I_{ds}$, $II_{ds}$ and $III_{ds}$ times in Zones I, II, and III, respectively, to initiate the operation of a conventional pulse network. As illustrated in Fig. 24a the right hand cathode of the dual diode is fed with the "od" pulses and accordingly, three $d_s$ pulses are produced, per drum revolution, at the output of Fig. 24a. These, in turn, are applied to the circuit of Fig. 24, as indicated, to produce three $d_0$ pulses, per drum revolution, which are the normal $d_0$ pulses.

Figure 25:
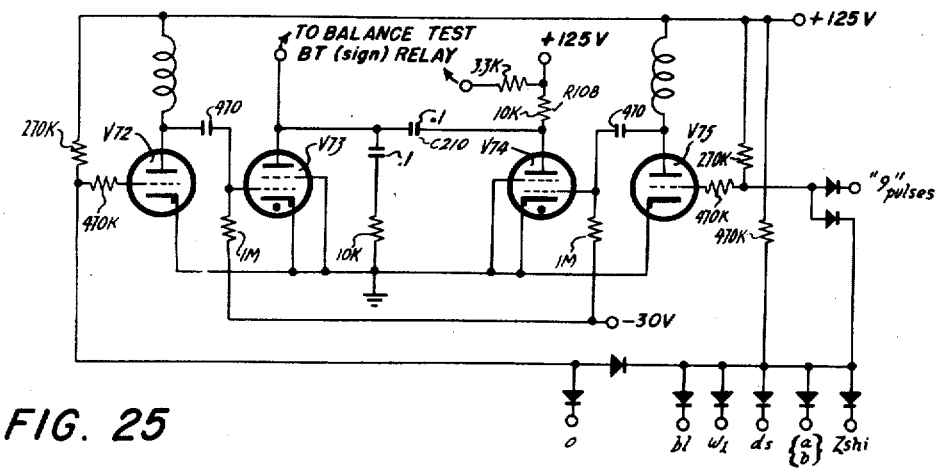
Fig. 25 is a balance test relay control circuit.

With reference to Fig. 25, the circuit comprising tubes V72 to V75 is a controlled multivibrator or trigger and the circuit operation is as follows. If the register is positive, the balance test signal will be high and the balance test relay will be picked up. If the register is negative, the balance test relay will not be picked up. The circuit permits release of the BT relay, as well as the pick-up, to be performed by a pulse, and this is done in the following way: if the grid of V72 goes high (as a result of the "and" circuit input), then the thyratron V73 will fire and the balance test relay will pick up. On the other hand, if the sign of the selected register becomes negative (i.e., nine), it is necessary that this relay be dropped out quickly and that this be done with a pulse. The input to the grid of V75 is a series of "9 time" gates. If at any time the last box of a selected register is "9," W1 will be high at "9" to indicate that the register is negative. This causes the thyratron V74 to fire, dropping its plate voltage through a resistor R108 and pulling a capacitor C210 down along with it. This lowers the plate voltage of V73, which has been fired previously, well below the cathode for perhaps 3 to 4 microseconds, and this is enough to effectively quench the thyratron V73 and thus invert the condition of the BT relay through the use of a pulse.

Now referring to Fig. 6, which has been discussed previously, the "odd-even" trigger is complemented at "$a$" time, as shown by the input to the common junction of the capacitors C211 and C212, but it is necessary that the "odd-even" output be phased properly when the machine is first turned on. This is done under control of the WcN and "$d_0$" ("and") input as described presently. If it so happens that when the machine is turned on the "odd-even" trigger starts in the proper phase, then the tube V76 will always be "cut off." However, if the "odd-even" trigger is out of phase with the drum, then the grid of V76 will rise at what should be "od" time and correct the "odd-even" trigger so that it is running in proper phase.

As previously mentioned, four sections utilize the four WcN pulses. First, consider the "ab" gate (see Fig. 5). When the machine is first turned on, the "ab" trigger may be in an incorrect phase as compared to the timing slots on the drum. Since WcN always rises at what should be "b" time, the "ab" trigger will be pulsed into its proper phase at least once during the first drum revolution and thereafter will remain in proper phase, being complemented by the "t" pulse alone, acting on tube V9a. The fact that these four pulses set the "ab" trigger into its "b" phase each drum revolution will have no effect after the original setting since the "ab" trigger will always be in the "b" phase when this pulse arrives at the grid of the appropriate trigger tube.

As stated above it is also necessary to employ the WcN and $d_0$ pulses in order to phase properly the "odd-even" trigger (Fig. 6), since the "even" gate must be high during "even" time which is defined as that digit time whose index is an even number, i.e., $d_0$, $d_2$, $d_4$, etc., up through $d_{14}$. Similarly, the "odd" gate must be high during "odd" time or when the digit index is an odd number, i.e., during $d_1$, $d_3$, $d_5$ up to $d_8$ time. A complementing input as stated above is used to trigger this circuit at the rise of "a" time as in Fig. 6. If the "odd-even" trigger, however, happens to rise out of phase when the machine is first turned on, the network made up of the WcN and the integrated "$d_0$" "and" gate corrects for this situation. It will be shown that when the "odd-even" trigger is out of phase, there will be three special pulses rising during "odd" time and only one pulse rising during "even" time, and this information is sufficient to correct the phase relationship of the "odd-even" trigger with respect to the drum.

Examine now the generation of "$d_s$" if the "odd-even" trigger is out of phase, i.e., if the "even" gate is rising at "odd" time and if the "odd" gate is rising at "even" time. If this is the case, the only pulse that can charge the capacitor (Fig. 23) will be the one rising at "III-$d_s$-b-7" time. The charge on the capacitor shown in Fig. 23 will remain high until discharged by the fall of the "even" gate which will be at the beginning of Zone I. This signal will initiate the action of the pulse former (Fig. 24) and, therefore, the output on the "$d_s$" lead (Fig. 24) will actually rise once per drum revolution at the beginning of Zone I time and fall one box later.

Examine next the generation of "$d_0$" when the machine is out of synchronization. The "odd" gate will be high three times per drum revolution when the special pulses are being read: at "I-$d_{14}$-b-7" time, "II-$d_{14}$-b-7" time, "III-$d_{14}$-b-7" time. The charge on the capacitor will be removed, therefore, at "I-$d_s$" time, "II-$d_s$" time and "III-$d_s$" time. This defines the fall of "$I_a$" ("Zone I anticipate") when the machine is working in synchronism). Since the "even" gate is fed into the pulse former (Fig. 24) defining "$d_0$," "$d_0$" will rise three times during a drum revolution at "$d_s$" time. Now refer back to the integrated input to the "odd-even" trigger (Fig. 6). When "$d_0$" rises at "III-$d_s$" time, it will be high for the fourth special pulse that rises during "III-$d_s$-b-7" time. Therefore, the "odd-even" trigger will be triggered into its "odd" state, and from then on the machine will be in proper synchronization.

The input into the "odd" side of the "odd-even" trigger will never go high once the machine is in proper synchronization. The "$I_a$" gate will go high only once, rising at "III-$d_s$-b-7" time and falling at the beginning of Zone I "$d_0$" time. This, of course, defines the proper rise to the input of the pulse former generating Zone I. Therefore, Zone I will rise at Zone I time and drop at the beginning of Zone II time, Zone II will rise at Zone II time and drop at the beginning of Zone III time, and Zone III will rise at Zone III time and drop at the beginning of Zone I time (see Fig. 1).

It is necessary to integrate the "$d_0$" input to the "odd" side of the "odd-even" trigger to insure that when it is corrected for phase, the "$d_0$" input is not immediately gated off and forced to interrupt the very pulse that is doing the triggering. This comes about because the "$d_0$" signal is discharged by the "even" gate and, in synchronizing the "odd-even" trigger, the "$d_0$" signal forces the "even" gate to go low. Therefore, if the fall of "$d_0$" were not slowed down somewhat, the gate setting the "odd-even" trigger to its "odd" state might be turned off before the full trigger time of the WcN pulse was effectively used.

Figure 27:
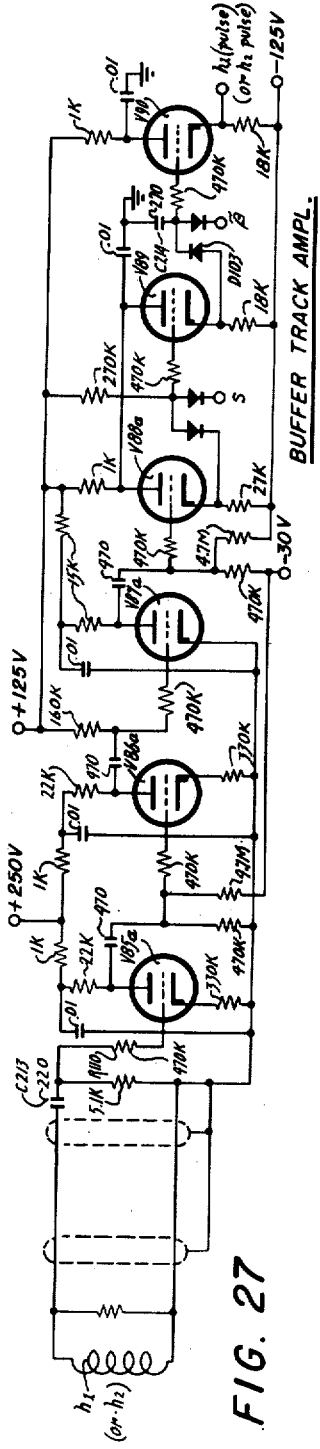
Figs. 27 and 28 are similar to Fig. 3, Fig. 27 illustrating the amplifier circuit for sensing the buffer track and Fig. 28 for sensing the main tracks.
Figure 28:
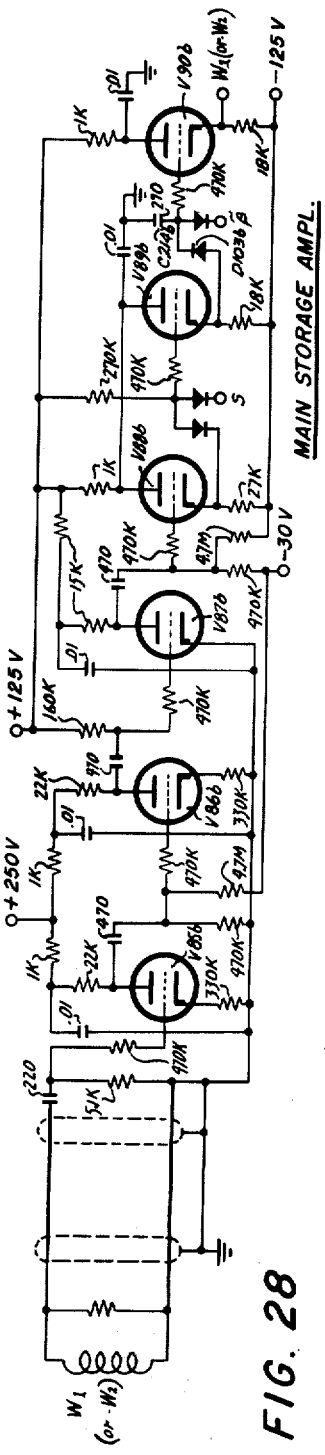

Figs. 27 and 28, respectively, provide the read amplifiers for the buffer track and the main storage while Fig. 3 provides the read amplifier for the time track. The output signals from these amplifiers are called $h_1$ or $h_2$ (Fig. 27), $W_1$ or $W_2$ (Fig. 28) and WcP (Fig. 3). Fig. 27 discloses a circuit which is identical for each of the two buffer amplifiers, $h_1$, $h_2$, and Fig. 28 discloses a circuit which is identical for each of the two main memory amplifiers, $W_1$ and $W_2$. The surface of the drum has been coated with a nickel-cobalt plating. Along one edge will be found 96 equally spaced slots that cut through the plating and form discontinuities in the plated surface. Four special slots interspersed among the 96 have also been engraved on this track and these are used to form zone gates, etc., in the computer. A permanent magnet as described in said Patent 2,807,003 is mounted near these slots to initially magnetize the surface of the drum in one direction and, thus, the reading head reads this change of flux each time one of the 96 regular slots and the four special slots passes under it. Referring to Fig. 3, the WcP signal is obtained from the discontinuities in the magnetized surface developing a signal in the head due to the change of flux, and this voltage is differentiated in the network made up of the capacitor C213 and the resistor R110 shown on the input to the grid of vacuum tube V85. This signal is amplified by both sections of V85 and V86 and is clipped by the resistor R111. After the clipped signal has been amplified by V87, it is fed into the grid of the cathode follower V88 and is emitted as "WcP" into the appropriate computer circuits.

The $h_1$ (or the $h_2$) amplifier (see Fig. 27) is similar to the Wc amplifier up to the grid of V88 of Wc. At the cathode of V88 of Fig. 27 the signal is approximately 6 microseconds wide and it is mixed in the "and" circuit made up of the "space" and cathode V88a diodes. The adjustment of the $h_1$ head is made such that the "space" or "strobe" pulses arrive at the center of the amplified pulse and spaced the proper number of boxes from the buffer record head, in this particular case, 15 boxes. At the grid of V89 the 2-microsecond signal will appear and be emitted from the cathode of this tube into the diode D103. This signal charges up the capacitor C214 for 6 microseconds, i.e., from the start of "s" time to the start of "β" time. At this time the capacitor C214 is discharged with (β), and inverted "β" pulse (derived as per circuit of Fig. 21), and the signal is isolated by the cathode follower made up of tube V90 and leaves the amplifier as $h_1$. The $h_2$ amplifier is exactly the same as $h_1$, as illustrated in Fig. 27 and the signal differs only in the fact that it is read from the drum 16 boxes (see Fig. 42) after the $h_1$ signal is read. This is to introduce one zone of delay for proper operation in the computer.

As previously mentioned, both the $W_1$ and the $W_2$ amplifiers (see Fig. 28), which read out from main storage, are exactly the same in principle as the $h_1$, $h_2$ amplifiers, and differ only in the particular tube layouts used and input signal information.

Figure 29:
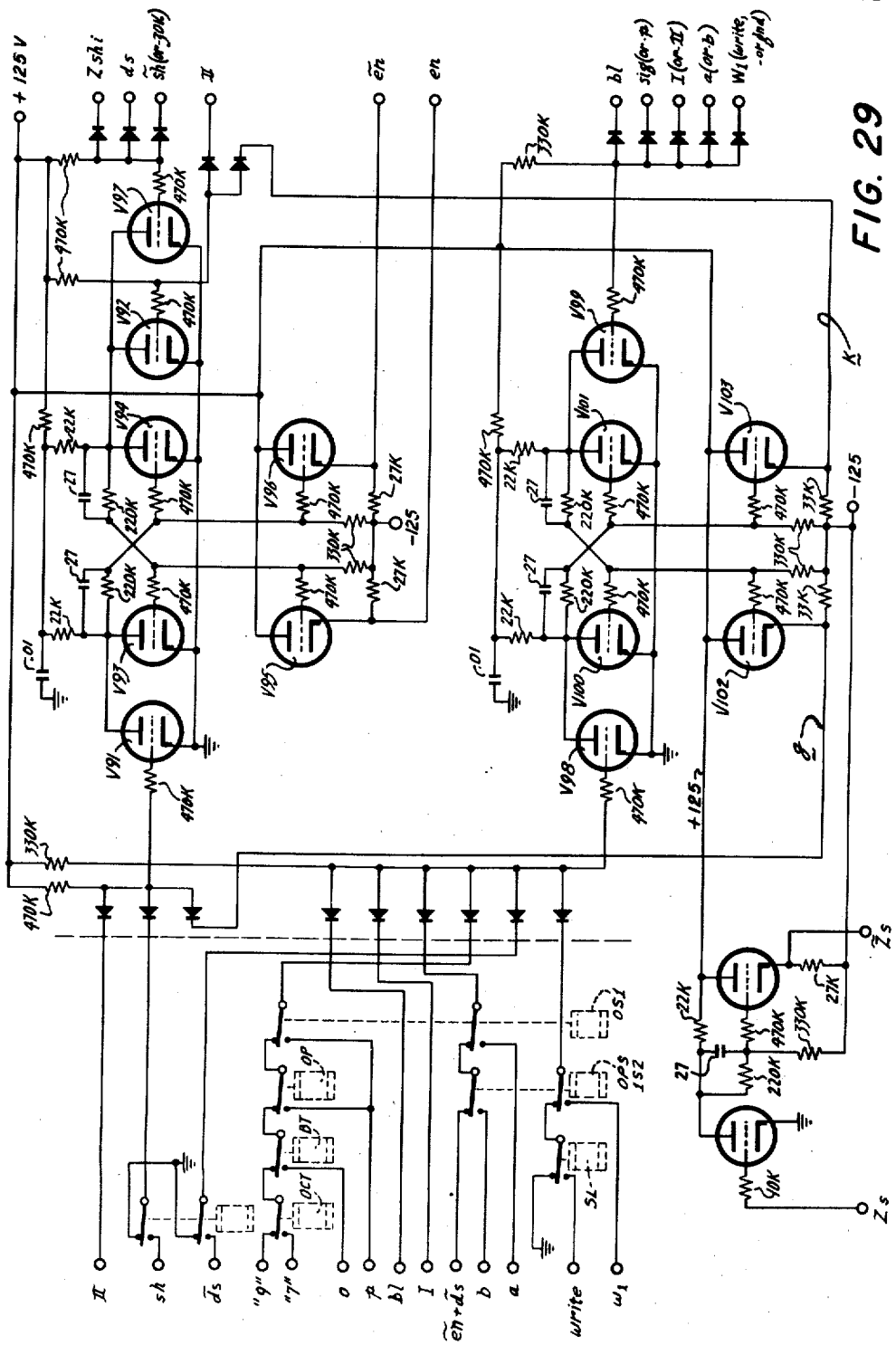
Fig. 29 is a dual bistable trigger circuit, one illustrating the "en" trigger and the other the trigger for producing the $g$ and $k$ pulses.

With reference to Fig. 29, wherein are produced the signals $en$, $\overline{en}$, $g$ and $k$, two bistable trigger circuits are shown, each of which is made up of two sections of the circuit of Fig. 21 with additional inverter tube inputs. The upper trigger circuit of Fig. 29 is comprised of the vacuum tubes V91, V93, V95, and the vacuum tubes V92, V94 and V96. Vacuum tubes V91 and V92 are inverters which change the state of conductivity of their respective cooperating trigger tubes V93 and V94. V97 is an additional input inverter to the trigger tube V94. The outputs of the trigger tubes V93 and V94 are carried respectively by the cathode followers V96 and V95, whose outputs provide the "$en$" and "$\overline{en}$" pulses which are employed as described later. The lower bistable trigger is comprised of vacuum tubes V98, V100, V102, and vacuum tubes V99, V101 and V103. This circuit operates very much in the manner of the first described trigger circuit, the inverters V98 and V99 being provided to pull down the anode voltages of their respective trigger tubes V100 and V101 in conventional trigger fashion, and the outputs of the trigger tubes just referred to being brought out respectively through cathode followers V103 and V102. The output pulses of the cathode followers V102 and V103 are referred to as the "$g$" and "$k$" pulses. The "$g$" and "$k$" pulses provide additional control at the "and" circuits of the first mentioned V92—V93 trigger circuit. For convenience in understanding the logic description of the invention, certain connections have been indicated on the left of the diagram of Fig. 29. The purpose of these identifications will be obvious during the later description of the logic of the invention. At the lower left-hand corner of Fig. 29 is shown an inverter circuit similar in every respect to the circuit of Fig. 21; however, this circuit is used for providing an inverted zone gate signal "$\overline{Z_s}$."

There are four delay units (Fig. 31) in the computer, each in its own separate plug-in and each built similarly to the other. There is a fifth delay unit called a control delay (see Fig. 32) which actually provides regulated voltages to the other delays, viz., delta$_1$ ("$\delta_1$"), delta$_2$ ("$\delta_2$"), delta$_3$ ("$\delta_3$"), delta$_4$ ("$\delta_4$"). The numbers delay unit (Fig. 31) comprises tubes V104a, V104b, V105a, V105b, V106 and V107. The point delay section comprises V112, V113, V114 and V115.

Figure 30:
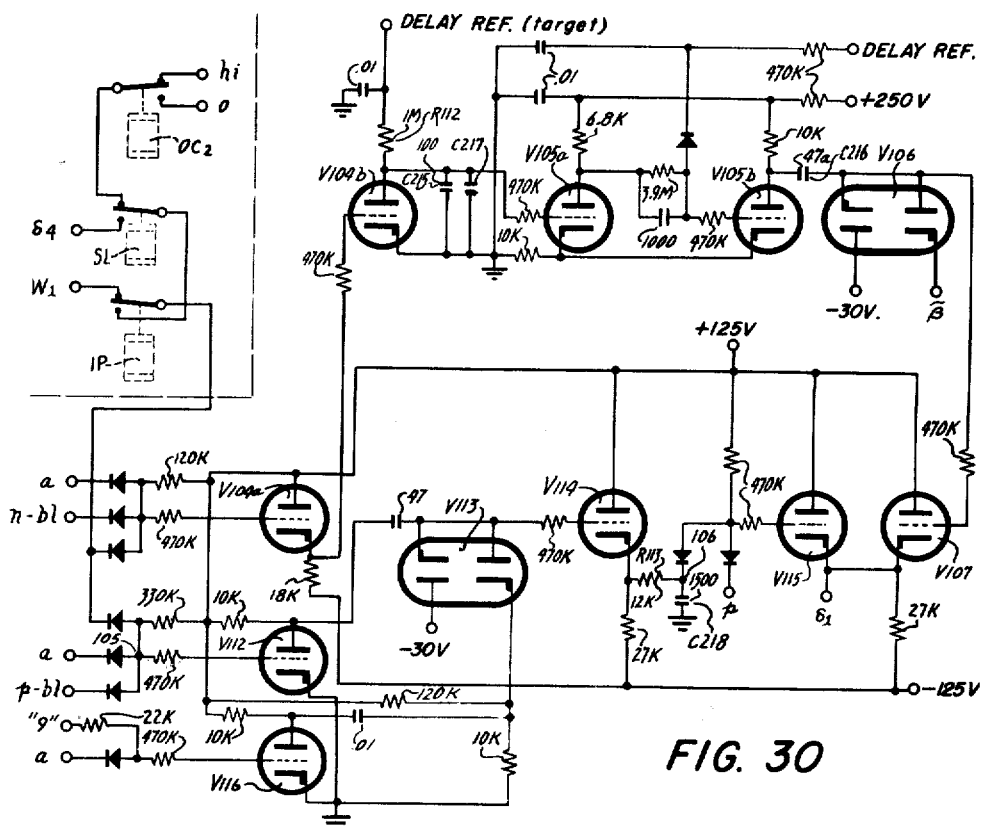
Fig. 30 is a typical pulse delay circuit used extensively in the circuit control of the flow of logic.

Referring to Fig. 30 (or Fig. 31 which is identical less the tube V116 and its associated circuits) the numbers delay unit will give approximately one half-box delay of any information that is fed into the grid of V104a. It does this in the following manner: the signal coming into V104a through the "and" circuit is applied to the grid of V104b from the cathode follower output. This causes the tube V104b to conduct and discharges capacitor C215 and its trimmer. When the 4-microsecond "$bl$" pulse drops back to —30 volts on the grid of V104a, the tube is cut off and the capacitor C215 begins recharging through a resistor R112 in the plate of V104b. The delay target voltage is automatically adjusted in a manner which will be explained later to insure that the proper amount of delay is developed as a function of drum speed. When the capacitor C215 is initially discharged, V105a is cut off and V105b goes into conduction because its grid is held at the delay reference voltage of about 62 volts. The capacitor C215 charges through the resistor R112 to such a value that one half-box after the pulse has left the grid of V104b, V105a will once again begin conducting and cause V105b to be cut off. Thus, the plate of V105b drops initially, charging a capacitor C216 in its plate circuit through the left section of diode V106. One half-box later the plate of V105b rises and approximately 4 microseconds later the charge on capacitor C216 is discharged by the "$\overline{\beta}$" pulse. This signal is isolated with the cathode follower V107 and is emitted as "$\delta_1$." An adjustment of a trimmer capacitor C217 permits setting the delay to give the appropriate width pulse at the input to V105a. In normal operation this pulse will rise at "$a$" time and be discharged by "$\overline{\beta}$." The delay target voltage has a nominal value of about 100 volts and is adjusted to give proper delay over wide variations of drum speed, as is later described.

As indicated by labels in Fig. 30 the "and" circuit having a junction 105 takes information from either the W$_1$ amplifier or the output of "$\delta_4$" and rises only at "$p$-$bl$" time during the "$a$" section of a box. If the grid of V112 rises to ground, the plate falls and a capacitor 47 is clamped at the —30 volt level through the left section of the diode V113. When the pulse leaves the grid of V112, the plate rises, thus raising the grid of V114 to ground which is the upper level allowed by the right section of the clamping diode V113. The signal on the grid of V114 is integrated through a resistor R113 and a capacitor C218 and appears at junction 106. Since the time constant of this network is 18 microseconds, in 90 microseconds the junction point 106 will be high and this, in coincidence with the "$p$" pulse, will raise the grid of V115 and in this way the cathode of V115 will emit a "$p$" pulse delayed the appropriate half-box. The capacitor 47 will be discharged at "$9$"-"$a$" time through the inverter V116 and will remain discharged until the next point is read whereupon the cycle is repeated.

Vacuum tubes V219 to V226 (Fig. 32) make up the section for the delay target voltage. It is this unit that adjusts the target voltage for the four numbers delay units so that the delay will be the correct proportion (1/96) of one drum revolution. That is, if the drum should speed up 2%, the delays will be shortened 2%, and vice versa. It will be noted that the circuitry is similar to the standard delay circuits that is, once per box a 4-microsecond pulse enters the grid of V219, is emitted from the cathode section into the grid of V220, discharges its capacitor C215 as previously described, recharges this capacitor like capacitor C215 of Fig. 31 was discharged, through a resistor like R112 of Fig. 31, transfers this information through its threshold discriminator made up of tubes V221 and V222, initially drops the plate voltage at V222, allows it to spring back up to the cut-off condition approximately one half-box later, thus giving a rise in voltage at the grid of V224. That is, here we see a step voltage that rises from —30 volts to ground approximately one half-box after the "$p$-$bl$" pulse leaves the grid of V219. The "and" gate whose junction is 107 normally has an overlap of about 2 microseconds, at the grid of V226. As in the AFC circuit, the amount of overlap determines the average voltage value allowed to remain on a capacitor C219 in the plate of V226. As the overlap becomes greater, the voltage on the capacitor drops, and vice versa. This average value is cathode followed by V225 and is the delay target voltage that is used in the other four delays and also is returned as the delay target voltage to the plate of V220. Thus, it is seen that the delay target voltage is being continually adjusted to give a 2-microsecond overlap at the "and" circuit junction 107 and to the plate of V220. That is, initially the capacitor C215 and its trimmer have been adjusted to give this 2-microsecond overlap at the "and" circuit junction 107 previously referred to. Once this adjustment has been made, the delay target voltage will correct for variations in drum speed and variations in supply voltages over rather large ranges. It will also correct for variations in temperature, since all four delays and delay target generator are mounted next to one another in the lower section of the computer where their temperatures will be very nearly the same.

Figure 36:
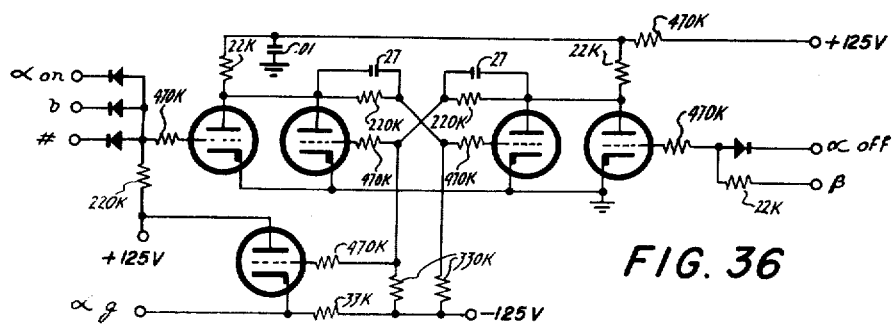
Fig. 36 represents one of a pair of similar gating circuits operating as in Fig. 9 for entry of pulses into the circuit of Fig. 35.
Figure 37:
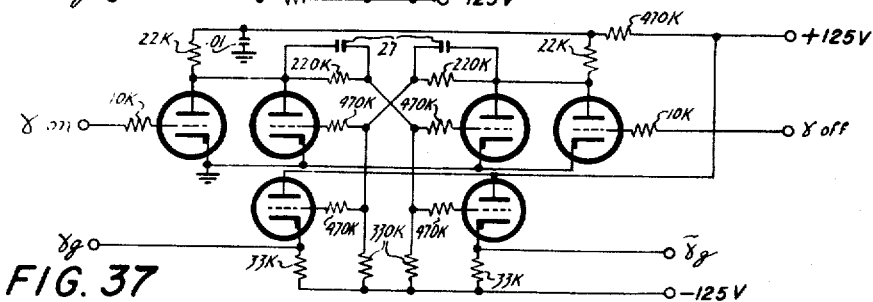
Fig. 37 is a gating circuit similar to Fig. 36 for entry of special pulses into the circuit of Fig. 35.

The arithmetic unit or adder (Fig. 35) is substantially the same as that shown in copending application Serial No. 388,160 previously referred to; however, certain features are herein pointed out for purposes of clarity. Normally the input to this circuit is provided by a pair of similar circuits known as the alpha gate ($\alpha g$) and the beta gate (βg) as shown in the circuit of Fig. 36. Arithmetic "carry" is provided via a circuit, as in Fig. 37, which is known as the gamma gate (γg). The respective outputs of these gates are entered via "and" circuits at the junctions 108, 109, and 110 of Fig. 35. The circuit of Fig. 35 emits a single pulse at the cathode of V240 after receiving 10 pulses into the grid of V230. The input gating is such that the emitted pulse will occur at a time that corresponds to the decimal sum, modulo ten, of the digit pulses that are in process of being added. For example, if a "9" and a "7" are to be added, the input gates, specifically the "α" and "β" gates, will gate the appropriate information into the adder at "b" time, and the adder will emit the "sum," modulo ten, at a time represented by a pulse occurring at "a–6" time. The carry will be emitted during the previous "b" time and will set the "γ" gate to give the proper sum for the next two decimal numbers.

The counting operation is accomplished by initially charging a "well" capacitor and discharging it in ten equal steps by means of a "bucket" capacitor. When the well capacitor C220 and capacitor C221 have been discharged, the grid of V240 rises and its cathode emits a counter output pulse (CO).

First, the initial charging of the capacitor C221 will be established. As will be shown later, V235b will conduct after V230 receives 10 pulses. The negative shift of the plate of V238 cuts off V239; the plate rise of V239 brings up the grids of V238 and V240, which in turn brings up the cathode of V240. This cathode output cuts off V237 since its cathode is raised about 12 volts positive with respect to its grid and this plate rise brings up the grid of V236 whose cathode then goes high. This brings up the plate of the diode V234 and charges the well capacitors C220 and C221 and the bucket capacitor C222 to +100 volts (C222 being charged via V233). Any excess rise of the cathode of V236 is clamped to the "adder reference" voltage through V232.

Since the well and bucket are now charged to 100 volts, they are conditioned to start receiving impulses. The input pulses are fed to the grid of V230 at "b" time with a resultant negative shift of the plate of V230. Initially, both sides of the bucket capacitor C222 rest at +100 volts, the plate of V230 impulses the left side of this capacitor with a 100-volt negative pulse, V233 conducts and effectively places the well and bucket capacitors in series. Since these capacitors are adjusted to be in the ratio of 9:1 (including stray), the voltage appearing across them takes a value proportional to their capacities. Therefore, neglecting tube drop, approximately 90 volts will appear across the wells C220 and C221 and 10 volts across the bucket C222. When the plate of V230 springs back up to +100 volts (clamped at the upper value by the "adder reference" to insure a very fast rise time), the bucket capacitor C222 will eject its excess charge through the resistor R114 to the V235a and V235b common cathode resistor. Since the bucket is returned effectively to the top of the well capacitor (neglecting for the moment the variation in grid to cathode bias of V235a as the tube current changes), V233 begins conducting almost immediately each time the plate of V230 begins to drop. Therefore, the full value of the plate pulse of V230 is divided by the well and bucket each time V230 conducts and the charge removed from the well is very nearly the same each time, resulting in equal steps in the voltage appearing on the cathode of V235a and V235b.

When the tenth step has occurred and the well has been discharged to its lowest value (about 12 volts in practice), V235a and V235b operate as a threshold discriminator and cause V240 to emit a pulse as previously mentioned. V231 is a negative peak rectifier and charges a capacitor C223 to the minimum value to which the plate of V230 falls. This voltage, together with the bleeder current from the resistors R115 and R116, raises the grid of V235b to about 15 volts so that immediately after the tenth step the grid of V235b "catches" its cathode, and the dropping of the V235b plate triggers V238 (or V239) and initiates a counter output pulse. The tenth pulse into the adder may arrive at either "α" or "β" time so the V238 and V239 multivibrator is continuously being reset by "s" or "#" pulses through junction 108. A capacitor C224 across a resistor R117 is used to keep stray noise pick-up from varying the threshold level in the high impedance grid section of V235b. Resistors R115 and R116 are chosen to compensate for supply voltage changes by applying a correction to the average threshold voltage at the grid of V235b and they also compensate for the increase in grid to cathode voltage in V235a as the tube current diminishes with the discharging of the well capacitor. Approximately one microsecond is allowed for propagation time between the time the tenth pulse leaves the grid of V230 and the time "CO" rises, having a duration of one microsecond.

The magnetic recording nad erasing amplifier is shown in Fig. 38, and comprises the tubes V241 and V242 which are operated in parallel and are tied into the main storage recording heads through the relay amplifier tree. That is, depending upon which track has been selected, an appropriate head (one of eight tracks) will be switched into the plate sections of the record amplifier. A similar circuit for the erase direction of current is made up of vacuum tubes V243, V244 and V245, all connected in parallel. The "and" gate controlling the grids of V241 and V242 is high for 2 microseconds ("β" pulse time) for each number digit that is to be recorded. The same thing is true with respect to the "and" gate controlling the erase section. The input gating is such that grids to V241 and V242 are never high at the same time that the grids of V243, V244 and V245 are high. When a full word is being recorded in main storage, the record tubes V241 nad V242 will be driven into conduction for 2 microseconds during each appropriate digit time and the erase tubes V243, V244 and V245 will be driven into conduction for 2 microseconds out of each 8 for all digits for which the record grids are not high. The inductance of the record heads has been made low enough so that the recording current can rise to saturation before the "β" pulse falls.

The buffer record section (Fig. 38) is made up of vacuum tubes V246 and V247. In this case the record head is the same type as that used in main storage with the exception that the two half-sections of each head are wired in series as shown in Fig. 38. This is possible since the buffer record amplifier only records information and never erases information, because the permanent magnet (Fig. 42) erase takes care of this for each revolution of the drum. Also, the buffer record amplifier need not have the resolution that the main storage amplifier must have, since it is never necessary to erase discrete bits of information between two other bits without interfering with the signal from the other two. In other words, the buffer record amplifier is always recording on a "clean" magnetic surface that has been saturated to one polarity by the permanent magnet. The network shown on the left, made up of a resistor R118 and the capacitor C225, is used to insure that no recording will be done when relay operations are in transit.

Figure 35:
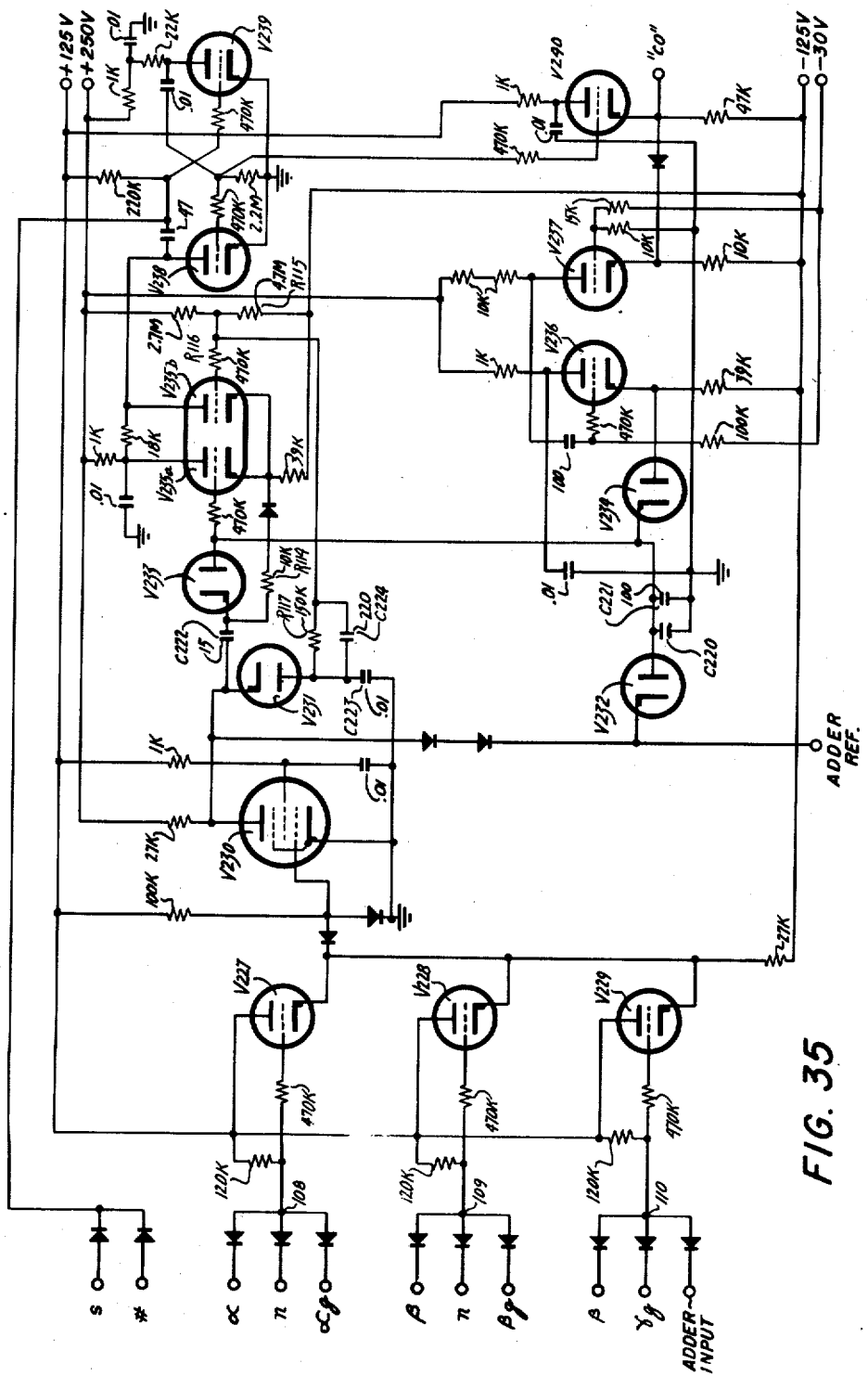
Fig. 35 is the circuit of the arithmetic unit or adder.

The serial adder of Fig. 35 is the only accumulating adder in the calculator. All adding and subtracting must be done in this adder and it is equipped with a carry circuit. All entries to any register pass through the adder and then to the selected register on the magnetic drum. All positive entries are made as true entries and all negative entries are made as complement entries.

In the following discussion, and in the description of the logic handling circuits of the invention, frequent recourse is made to "and" circuit connections. These will be referred to as follows: assuming the "and" circuit is composed of a "blank" ("*bl*") pulse, a "beta" ("*β*") pulse and "number" ("#") pulse, the designation will be *bl-β-#*. The adder is a decimal counter that accepts "*α*" and "*β*" pulses that have been appropriately gated and emits a pulse for every ten pulses that it receives. The gating operation is so arranged that if the adder emits a pulse at "*b*" time, this pulse is interpreted as a decimal carry. If the adder emits a pulse at "*a*" time, the digit time at which the pulse is emitted is equal to the sum, with or without previous carry, of the two digits that have been entered into the "*α*" and "*β*" gate. For example, if a "9" digit pulse enters the "*α*" gate and a "7" digit pulse enters the "*β*" gate, the adder will emit a pulse at "*b*" time (in this case shortly after "3"-*α* time) indicating a decimal carry which will turn the "*γ*" gate on and will emit an "*a*" pulse at "6"-*α* time indicating the decimal sum, modulo ten, is equal to 6.

The sections making up the complete (see Fig. 42) adder are the "*α*" gate, the "*β*" gate, the "*γ*" gate, the adder, and the "BR" trigger or "buffer record" trigger. As a first example, assume the addition of an entered "7" to a "9" being read from main memory, which appears at contacts of relay 1P (Fig. 43) at "9" digit time. The signals that are important are those appearing at junctions 40, 41 and 42 (going into the "*α*" gate), 44, 45 and 46 (going into the "*β*" gate), and 49, 50 and 51 that operate the "*γ*" gate (see Figs. 42 and 43).

First, let us define the operation of the "*α*" gate. Note that the "*α*" gate is always turned on at either "0" time or at the time the digit is being read from memory and arrives at the contacts of relay 1P (see Fig. 43). This turning on will always be at "*b*" time. In general, the "*α*" gate will gate through a number of pulses at "*b*" time equal to the value of the "numbers" pulse that is being received from memory. That is, if a "9" pulse impulses the "*α*" gate, junction 55 (see Fig. 42) will emit 9 pulses into the adder during the "*b*" time. The "*α*" gate will be turned on at "9-*b*-#" time. However, the number of pulses going into the adder will not start until the next "*α*" time, so the pulses going into the adder will be "8"-*α*, "7"-*α* through "0"-*α*, which is 9 pulses. The "*α*" gate will not be turned off until junction 40 (Fig. 43) goes high, which is composed of "*br–a–n*." That is, it will not be turned off until the buffer record trigger has been turned on, which is effectively when the counter output fires at "*a*" time and via junction 57 flips trigger BR (Fig. 42).

For an entry, the "*β*" gate will not be turned on until selected "numbers" time, occurring during selected box time, since the entry relay is picked up. That is, if a "7" is being entered into a particular location in the drum, the "7" pulse will rise, during the selected box, during "*a*" time, and once during "*b*" time. However, it will not operate the "*β*" gate until "*b*-7" time. Thus, at junction 54 (Fig. 42) we will get "7"-*β*, "6"-*β*, etc., to "1"-*β*. At "0" time the "*β*" gate will always be turned off, thus preventing any further pulses from getting into the adder from this particular gate.

To recapitulate, we are going to add a "9" and a "7" by means of the adder, with the "9" coming from storage and the "7" being an entry operation. The information is entering the "*α*" gate from storage and the entry information is entering the "*β*" gate. Both gates are activated at "*b*" time but at different portion thereof. During "*b*" time, the "*α*" gate will emit 9 pulses starting at "8"-*α* and extending through "0"-*α*. At "*b*" time, the "*β*" gate will gate through 7 pulses each at *β* time so that there is no conflict with the *δ* time pulse, beginning at "7"-*β* time and extending through to "1"-*β* time. Therefore, at the end of "*b*" time, the adder will have been impulsed by 16 pulses. It will have read out, a single carry pulse at "3"-*α* time, and this will be followed by 6 more pulses. Since the "*α*" gate is not turned off until the counter output emits a pulse at "*a*" time, the "*α*" gate will still be high. Therefore, junction 54 will emit no more "*β*" pulses but junction 55 will emit further "*α*" pulses. These will be "9"-*α*, "8"-*α*, "7"-*α* and "6"-*α*.

This will total the second group of 10 pulses and, therefore, the adder will emit a second counter output pulse at "*a*-6-*α*" time which is the sum of the 9 and 7 digits. The buffer record trigger will be set to its high position *a*-6-*δ* and at the same time the "*α*" gate will be turned off. The "*γ*" gate will be always turned off at "*b*-7" time. When the "*γ*" gate is turned on, it will be noted that junction 52 (Fig. 42) is the one that enters the extra pulse in ahead of the "*α*" and "*β*" pulses at "*b*-*t*" time as the carry pulse.

When numbers are complemented, i.e., when the negative (−) relay (Fig. 43) is picked up, it is necessary to add in an "elusive 1" in the least significant box ("*d₀*" time) in the addition cycle. This is accomplished by the line entering the common input to the negative relay contacts at the "*γ*" gate input (Fig. 43); namely, "$Z_s$lo-*d₀*-*a*-0." The "*γ*" gate goes high and the "*b*-*t*" is entered into the adder as the elusive 1. Note also that if the negative relay were not picked up, this same line goes into the "not gamma" ($\overline{\gamma}$) side of the "*γ*" gate. This performs the function of clearing the "*γ*" gate of a carry in case the addition of the previous two words produced a final carry as described later (the addition of two numbers in complement form with "nines" in their sign column). Note that, regardless of what numbers are being emitted by the "*α*" gate or "*β*" gate, the "*γ*" gate will never be turned on before "*b*-7" time. That is, the counter output will never emit a pulse as soon as "*b*-7" time. Assuming as above that a negative entry is being made, it will be necessary for the "*β*" gate to gate through the "nines" complement of the number entered from the keyboard. The only change in input information to the "*β*" gate will be the picking up of the negative relay. Following the logic through junctions 44, 45 and 46 once again, a "*t*" occurring at "$Z_s$-b-bl" time turns the "*β*" gate on and the selected number occurring at "$Z_s$-*n*" time turns the "*β*" gate off. Thus, if a "6" is to be entered negatively, the "*β*" gate will pass to junction 54, the "9"-*β*, "8"-*β* and "7"-*β* pulses only and will be turned off at the beginning of "6" time, thus preventing any further "*β*" pulses from getting into the adder. Therefore, the "6" has been complemented to its nines complement-3-and the rest of the add cycle continues as previously shown.

OPERATION

The principal components of the invention have been explained in detail in the preceding paragraphs in order to provide an understanding of the description which follows. Certain operations described hereinafter are dependent upon the design of the aforesaid components, many of which are critical in their functional performance and dependent upon their circuit parameters (which are shown in the drawings); however, it is to be pointed out that the chosen embodiment of the invention, particularly with respect to the description which follows, is in no way limited to these chosen parameters except in the manner in which they are interdependent.

It will be of material assistance in understanding the following to observe certain fundamental properties of the chosen embodiment of the invention, as follows:

Data recorded on the buffer storage track (see Fig. 42) of the magnetic drum may be read out from that track 15 boxes later in time at the $h_1$ output or 31 boxes later at the $h_2$ output.

Data recorded on the main storage tracks (see Fig. 40) of the magnetic drum may be read out in either phase "*a*" or phase "*b*" (see Fig. 1) from either $W_1$ or $W_2$ output.

The adder (see Figs. 35 and 42) accepts data only in phase "*b*" and data read out therefrom is always in phase "*a*."

The adder both adds and subtracts; however, when positive quantities are handled, the counting pulses are started when the digit value is sensed while, when negative quantities are handled, the counting pulses are started at a predetermined reference time and are stopped when the digit value is sensed.

The fixed delay circuits $\delta_1$, $\delta_2$, $\delta_3$ and $P_1$, $P_2$, $P_3$, $P\beta$ (see Fig. 43) and $\delta_4$, $P_4$ (see Fig. 40), as well as the adder, each produce a delay of data flowing through them of one half-box.

SHIFT LEFT (1 PLACE, 15 PLACES)

Referring now to Figs. 40 through 50, particularly Figs. 42 and 43, the number standing in any register may be shifted to the left, one decimal order at a time as described below. Furthermore, the number standing in a 31-digit register may be shifted to the left, 15 decimal orders at a time, if desired as also described presently. The objective in a shift left operation is to remove the information from storage and re-record it, shifted left in the register. This basically amounts to reading the information from units order position and re-recording it in tens order position. Obviously, the information that appeared in the tens position must in turn appear in the hundreds position, etc. In either a shift left or a shift right operation, only one register is selected; $W_1$ is the information source.

The information may occur during either "$a$" or "$b$" phase. The reading heads and the recording heads are located one zone apart (16 boxes) so that on read and re-record a shift left amounts to delaying the information 17 boxes. The word's phase must be determined, i.e., "$a$" or "$b$" phase.

Shift left of "a" phase registers

The process may be summarized by the following: SL of "$a$" phase register $W_1$, $\delta_1$, $\delta_3$, $\delta_2$, buffer storage, $\delta_4$, write trigger, main storage.

Detailed flow follows:

All information on a given selected track of main storage appears at $W_1$ during a shift left, as stated above, (Fig. 43) $W_1$ through $n/c$ (Fig. 43) 1P (1P is only up during "$b$" phase operations) through junction #28 (digit read-$n$-$a$-$bl$) $\delta_1$, (pulse is now "$b$" phase because retarded ½ box) K (cathode follower) $n/c$ 1P, $n/o$ SL, (SL is energized to close its contacts during shift left) junction #32 (digit-$bl$-$b$-$n$), $\delta_3$, (pulse is now "$a$" phase) K, $n/o$ SL (now closed) junction #30 (digit-$bl$-$a$-$n$) $\delta_2$, (pulse is now in "$b$" phase and has been delayed one-and-one-half boxes) K, via entry point marked $\delta_2$ (Fig. 42) to now closed contact of SL to junction #59, ($n$+$p$-output of $\delta_2$-$Z_s$-$b$) K, arrives at trigger BR (buffer record) and triggers it on. The digit value pulse, originally read from the $a$ phase register on the selected main storage track of the drum and now delayed one and one-half boxes, is now recorded on the buffer storage track and will be read, 15 boxes later (Fig. 42) at $h_1$. The output of $h_1$ is applied to one input of a four input junction #22 (Fig. 40) as follows: $h_1$ (Fig. 40), $n/c$ 2ZA, $n/c$ 2ZB, $n/c$ 2ZC. The second input is receiving "$bl$" pulses, the third input is receiving a "$n$" gate pulse, while the fourth and remaining input is receiving a "$b$" pulse which has been obtained from a two input "and" circuit (junction #23) consisting of "$b$"-"$\overline{*}$" which is high at this time. (For $\overline{*}$ see later description). The output of this "and" circuit is passed through delay $\delta_4$. The output of $\delta_4$ is the original digit now 17 boxes delayed (one and one-half boxes prior to entry on the buffer track, 15 boxes on the buffer track, and one-half box via $\delta_4$). It is now ready for re-entry into the same track of main storage as follows: output of $\delta_4$, K, $n/o$ SL, now closed, $n/c$ 1P, nc SR, to one input of the two input "and" circuit of junction #65. The other input of this "and" circuit is high, since ground is applied to it as follows: ground, $n/c$ OS2, $n/c$ OP to the input. The output of this "and" circuit passes through K, triggering "on" the erase-write trigger. The output of the erase-write trigger, now being high on the "write" side is applied to input 3 (counting from the left) of a four input "and" circuit whose junction is 2. Input 2 of this "and" circuit is receiving "$\beta$" pulses and the remaining two inputs are also high as follows: The circuit for input 1 may be traced as follows: +15 volts, $n/c$ OPCO (Fig. 41), $n/o$ 1 but now closed-time relay (the operation of the 1-time relay will be covered under the title "Generation of a "$b$" Phase Tag Pulse"), $n/c$ 15-times relay to input 1 (Fig. 40) of "and" circuit of junction #2. The 4 input may be traced as follows: tracing backwards from input 3, it will be found that the wire terminates in the output of two "and" circuits at junctions #3 and #4. If coincidence is obtained on either of these circuits, their output wires will rise and input 4 of "and" circuit of junction #2 will be high. The junction #4 "and" circuit is used for recording tags, the generation of which will be discussed later. Input 1 of "and" circuit of junction #4 is supplied with a "$b$" gate, input 2 is receiving "$t$" pulses, input 3 may be traced as follows: +15, $n/c$ OPCO (Fig. 41), now closed 1-time relay, $n/c$ 15-times relay, $n/c$ $x$ relay to the input of the circuit. The output of junction #4 "and" circuit is high during "$t$" time for the recording of tags. It is the output of the junction #3 "and" circuit that is used for the recording of the digital information in a shift left operation. The inputs will be traced one at a time, starting from top to bottom. Input 1 is high because of a $\overline{xoc}$ voltage ($\overline{oc}$=operation not complete as described later). Input 2 may be traced backwards to the terminus of a circuit whose junction is 5. Input 1 of this junction 5 circuit is high with an "$a$" gate applied through $n/c$ 1P. Input 2 thereof has ground applied through $n/c$ OP, and $n/c$ OS1. Input 3 of junction #3 may be "raised" by any one of three pulses: "$t$," P, and "$n$." It is the "$n$" circuit that is responsible for raising this input for left shift. The "$n$" line is raised by obtaining coincidence at junction #11. Input 1 of junction #11 is high because of ground through $n/c$ R15 and $n/c$ OP. Input 2 thereof is high because of ground being applied through $n/c$ OS2 and $n/c$ OS1. Input 3 thereof is high because of the number gate being applied through $n/c$ ND. Input 4 thereof is high because of a $\overline{d_s}$ being applied through junction #13. The fourth and remaining input of junction #3 will be high because of the Record Gate trigger, being on. This Record Gate trigger was turned on because of coincidence being obtained at junction #8 (a three input "and" circuit) consisting of $Z_s$lo-$\overline{xoc}$-$\overline{do'}$.

(NOTE.—A $Z_s$lo pulse is integrated so that it will rise one zone after $Z_s$lo. The "$a$" phase register in Zone I is read by the Read head but recording will take place at Zone II time at which time Zone I place will be under the "Record" head (Fig. 1).

The coincidence of "and" circuit of junction #2 has now been completed. Recording will take place whenever such coincidence is obtained, depending upon the status of the erase-write trigger. The erase trigger is always reset with a space pulse as indicated (Fig. 40) and will remain in the erase position until triggered by an input pulse, as just described above, thereby producing coincidence at junction #2 and energizing the Write amplifier.

The erase amplifier is energized by the output of the junction #1 "and" circuit whose inputs may be traced as follows: Starting at the left input 1 is receiving its conditioning voltage from junction 3, traced above. Input 2 is high when the erase-write trigger is in the "erase" position. Input 3 is receiving "$\beta$" pulses. Input 4 is conditioned by ground.

Shift right of an "a" phase register

In shifting right, information is recorded one position to the right. This is accomplished by using a delay of only 15 boxes (one box early). Information is read at $W_1$ and is passed directly into the record buffer amplifier. It will be remembered that $h_1$ reads the information from the buffer 15 boxes after it is recorded thereon. Information from $h_1$ will then pass directly to the record amplifier which re-records the information in main storage shifted one position to the right. Information from both "a" and "b" phase registers will pass into the record amplifier; the unwanted register will be filtered out. This is also true on Shift Left.

Detailed flow follows.

Information leaving $W_1$ enters input 1 of junction #57 (Fig. 42) through the n/o (now closed) SR points. Input 2 is high with n+p. Input 3 is high because of ground being applied through the n/o (now closed) points of SR.

The output pulse of junction #57 will turn on the "BR" trigger; the high output of "BR" is applied to input 1 of junction #61. Input 2 is supplied with "β" pulses. The output of junction #61 passes through the recorded amplifier and is recorded in buffer storage. Fifteen boxes later the information is read at $h_1$ and from $h_1$ enters the input 1 of junction #65 (Fig. 40) through the n/o (now closed) points of SR. Input 2 is high as follows: ground through n/c OS2 and n/c OP. This results in the triggering "on" of the erase-write trigger. The output of the write trigger is applied one input of junction #2. The other three inputs 1, 2 and 3 are high in a manner identical to shift left operation. The right hand input will be high during "a" phase for "a" phase words and low during "b" phase. The converse is also true (it will be high during "b" phase for "b" phase words and low during "a" phase).

Clearing of an "a" phase register

The clearing of an "a" phase register amounts to subtracting the number from itself; in short, the adding of its complement (tens complement).

The clearing of an "a" phase register basically amounts to reading the information from $W_1$, passing it through $δ_1$ with a resultant half-box of delay, passing it into the adder, through the "α" gate in positive form and through the "β" gate in negative form. The sum will be delayed another half-box. It will then be entered into buffer storage where it will be delayed 15 boxes and then re-recorded, making a total of 16 boxes of delay. Since the information enters the adder in both positive and negative form (complementary form), the number left in the counter should be zero. A more detailed explanation follows:

Digit value leaves $W_1$, passes through n/c 1P, (Fig. 43) input 4 (counting down) of "and" junction #28, enters $δ_1$. It entered $δ_1$ at "a" time, it will leave $δ_1$ at "b" time. It enters input 1 of "and" junction #34 (Fig. 43). Input 2 is high because of a number gate. Input 3 is high because * is high. Input 4 is high because of $Z_s$ being applied through the n/c points of OP and the n/c points of CNV–CDT. The output of junction #34 passes through a cathode follower and is applied to input 3 of junction #41. Input 1 is receiving a "b" phase gate, input 2 is receiving "#" pulses. The output of junction #41 turns on the "α" gate. The output of the "α" gate is applied to input 3 of junction #55. Input 1 is supplied with a number gate and input 2 is receiving "α" pulses. The positive value of the digit is therefore entered into the adder in the form of "α" pulses.

The negative value of the number (its tens complement) will enter the adder through the "β" gate as follows: From the output of $δ_1$, n/c 1P (already traced), n/o but now closed CL–CNV (Fig. 43), n/o (now closed) minus relay (Fig. 42) to input 2 of junction #46. (During a clear operation, both the minus and CL–CNV relays are up.) Input 1 of junction #46 (Fig. 42) is high with an applied $Z_s$, and input 3 is high with an "n" gate applied through the n/o points of the minus relay. It should be noted that the "β" gate is turned off, with thus arrival of the information pulse. The "β" gate was turned on from the output of junction #44. Input 1 of junction #44 receives a "t" clock gate through the n/o points (now closed) of the minus relay (Fig. 43). Input 2 is receiving a "b" clock gate. Input 3 is receiving a "bl" gate and input 4 is high because of the $Z_s$ gate being applied through the n/c points of OP.

Since the adder receives the positive value of the number in "α" pulses and the negative value of the number in "β" pulses, the adder's balance should be 0. The information is delayed one half-box as it passes through $δ_1$ and is further delayed one half-box as it passes through the adder. It then enters the record buffer amplifier where it is delayed 15 boxes, making a net total of 16 boxes of delay.

With reference to Fig. 42, the output of the adder may be traced as follows: The output of the adder, occurring in "a" phase, will pass through n/c SR to input 1 of junction #57. Input 2 is high with a "n+P" gate. Input 3 is high with an "a" gate applied through n/c SR. The high output of junction #57 triggers on the record buffer trigger. The high output of "BR" is mixed with "β" pulses, at junction #61 and passes through the amplifier, is delayed 15 boxes on the buffer track and is read at $h_1$. It then passes to junction #65 (Fig. 40) through the following path: $h_1$, n/c SL, n/c 1P, n/c SR to input 1. Input 2 is high because of ground applied through n/c OS2, n/c OP. The erase-write trigger is now high on the "write" side and is applied to input 3 (from the left) of junction #2 (Fig. 40). Input 1 is high as follows: +15 V, n/c OPCO (Fig. 41), n/o 1-time relay, n/c 15-times relay to the input. Input 2 is receiving "β" clock pulses. Input 4 is high in an identical manner to a shift left operation.

Clearing of a "b" phase register

The clearing of a "b" phase register is very similar to the clearing of an "a" phase register. Due to the very nearly identical circuits, only variations will be traced. In the clearing of an "a" phase register information is routed from $W_1$ into $δ_1$ where it receives the necessary one half-box of delay in order to get the information in "b" phase for counter entry. In a "b" phase word, information from $W_1$ first appears at the n/o points of relay 1P (Fig. 43) which will be picked for a "b" phase word. Adder entry, from this point on, is identical to the clearing of an "a" phase word. However, when information leaves $h_1$ it is not directed to the erase-write trigger but is instead routed to $δ_1$. This may be traced as follows: output of $h_1$ to and through n/c SL, n/o 1P to input 4 of junction #28. The other three inputs of junction #28 are high in a manner identical to a shifting left operation. The output of $δ_1$ is routed to the erase-write trigger as follows: output of $δ_1$ to and through n/o 1P, n/c SR to input 1 of junction #65. The remaining portions of the circuitry are identical to the clearing of an "a" phase register with but one exception. The exception is input 4 of junction #2 (Fig. 40). In the clearing of an "a" phase register input 4 of junction #2 is conditioned by an "a" gate, whereas in the clearing of a "b" phase register it is conditioned by a "b" gate.

TRANSFER OF INFORMATION FROM ONE REGISTER TO ANOTHER

In a transfer operation, the first register selected will be the register whose value will change, e.g., register 4 may be the first selected register and register 5 may be the second selected register. Information will be transferred through proper channels from 5 to 4 with the new balance appearing in 4. This is true for either addition or subtraction.

The word of the first selected register may appear on one track while the second selected register may appear on a different track. Since different words may be desired at the same time, it is necessary to have two amplifiers, The outputs of these amplifiers are called $W_1$ and $W_2$ (Fig. 40). To "look" at a word, one must determine the proper track, zone and phase.

Selection of a register comprises rendering selectively effective, by selective energization of zone selection relays (among them being 1ZA, 1ZB, 1ZC, 1ZD, 2ZA, 2ZB, 2ZC and 2ZD), as set forth below, one of three zone gates, the selected zone gate being designated below as $Z_s$. If the selected zone is Zone I, $Z_s$ will occur in time encompassed by Zone I (Fig. 1). If the selected zone is Zone II, $Z_s$ will occur in time encompassed by Zone II Fig. 1. If the selected zone is Zone III, $Z_s$ will occur in time encompassed by Zone III (Fig. 1). To select a register comprising both Zones II and III (Fig. 1), zone $Z_s$ must comprise a gate occurring in the time encompassed by both Zones II and III. Also signals $Z_s$lo and $Z_s$hi are produced. If $Z_s$ is a single zone only (as above) then zone $Z_s$lo and $Z_s$hi are identical with $Z_s$. If, however, $Z_s$ is a double zone then $Z_s$lo is Zone II and $Z_s$hi is Zone III. Each zone gate $Z_s$ is produced in the same manner as described above with regard to the production of the numbers gates. Further, to select a desired register, since two registers are interleaved in each zone, the particular register of the zone is selected in the same manner as the $a$ and $b$ phase words are selected in the above-mentioned application 788,160. Track selection is performed by relay trees as stated previously. Thus any register may be selected to the exclusion of all others.

Since two separate amplifiers are used, it is necessary to detect the track, zone and phase of both words. The track switching is accomplished by a relay tree. The relay tree establishes the proper path for the selected word upon the depressing of its associated key.

As selected words may appear in entirely different zones and have opposite phase relationships, proper timing circuits must be established. The information that appears in the first selected register will appear at $W_1$. The information that is in the second selected register will appear at $W_2$. A typical example of a transfer operation follows:

A word loacted on track 3, Zone III and phase "$b$" is to be altered (another word is to be added or subtracted from it). It is the *first selected register*. A completely different word located on track 1, Zone I, phase "$a$" is the word to be added or subtracted. It is the second selected register. Since both words must enter the adder together, it becames necessary to get them in the same phase. All words that are in "$a$" phase appear at $\delta_1$ and are there delayed one half-box. It is, however, necessary to provide for the zone delay. In the example, the word from the second selected register occurring in Zone I, phase "$a$," is directed to $\delta_1$, which automatically provides for one half-box delay. This word leaves $\delta_1$ at "$b$" phase and, since the first selected register is at "$b$" phase, it is necessary to delay the word appearing in Zone I (which is read first in time) 32 boxes, before the word appearing in Zone III may be interlaced with it for entry to the adder. After the word has been acted upon in the adder, it is then necessary to re-enter it in the first selected register, which in this case is in Zone III.

It has been assumed that a word located on track 3, Zone III and phase "$b$" is the first selected register, and the second selected register is located on track 1, Zone I and phase "$a$." Once the register selection has been made, certain relays will remain up for the transfer operation. In tracing the circuitry involved in the example, it will be understood that relays 1TC, 1ZC and 1P are energized. Relays 2TA and 2ZA are also energized as well as others indicated specifically below.

SECOND SELECTED REGISTER DELAY CIRCUIT

Having made the first and second register selections, the information is now available at $W_1$ for the first selected register and at $W_2$ for the second selected register. The information appearing at $W_2$ (second selected register) must be delayed 2 zones or 32½ boxes before entry to adder. With reference to Figs. 42 and 43, detailed circuitry follows:

$W_2$, n/c SL, (Fig. 43) through junction #30 (*a-n-bl-*digit just read value). $\delta_2$, K, n/c 2P, 2P is routed to input 3 of junction #59 (Fig. 42) through n/c SL. Input 1 of junction #59 is receiving a "$b$" clock pulse applied through the n/c points of SR. Input 2 is energized by a "$n+p$" gate. Input 4 is high with $Z_t$ gate applied through the n/c points of SL. The output of junction #59 may be traced through K to the input of trigger "BR." The high output of "BR" is mixed with "$\beta$" pulses, passes through the buffer storage amplifier and is recorded. 31 boxes later it is read at $h_2$ and is routed through $\delta_4$. It may be traced as follows: $h_2$, n/o 1ZC (now closed) Fig. 40, n/o 2ZA (now closed), n/c 2ZB, n/c 2ZC to input 1 of junction #22. The remaining three inputs of "and" circuit of junction #22 are conditioned as follows: input 2 is high with a "$bl$" gate, input 3 is high with a "$n$" gate, input 4 is high due to the high output of junction #23. Coincidence is obtained at junction #23 by applying $\ast$ to input 1 and a "$b$" clock gate to input 2. The output of $h_2$ enters $\delta_4$ during "$b$" phase, leaving $\delta_4$ in "$a$" phase. The output of $\delta_4$ (as indicated in Fig. 43) may be traced as follows: through n/c SL to input 3 of junction #32, input 1 is conditioned with a "$n$" gate, input 2 is conditioned with a "$bl$" gate, and input 4 is conditioned with an "$a$" clock gate that passes through n/c SL. The word has now been delayed 32½ boxes. It was delayed a half-box at $\delta_2$, 31 boxes in buffer storage, a half-box at $\delta_4$ and a half-box at $\delta_3$, making a net total of 32½ boxes of delay. The word is now properly timed for the turning on of the "$\beta$" gate. The turning on of the "$\beta$" gate is accomplished as follows: from the output of $\delta_3$ to and through n/c 1ZA, n/o 2ZA (now closed), n/c 2ZB, n/c 2ZC, n/c OP, n/c E, through n/c CL-CNV (now closed), through the n/c minus relay (Fig. 43) to input 1 of junction #44 (Fig. 42). Input 2 is receiving a "$b$" phase gate, input 3 is receiving a "$bl$" gate and input 4 is receiving a $Z_s$ gate through n/c OP. Coincidence will be obtained whenever the $\delta_3$ output goes high, resulting in the turning on of the "$\beta$" gate. The "$\beta$" gate will always be turned off at "0" time because of the output of "or" circuit of junction #45 receiving a "0" pulse. The output of the "$\beta$" gate is applied to input 3 of junction #54. Input 1 is receiving a "$n$" gate and input 2 is receiving "$\beta$" pulses.

The first selected register word is occurring in "$b$" phase and will be read at $W_1$. It turns on the "$\alpha$" gate as follows: $W_1$, n/o 1P (now closed), K, to input 3 of junction #41 when input 1 is receiving a "$b$" gate and input 2 is receiving a "#" pulse. The output of the "$\alpha$" gate enters input 3 of junction #55 where it coincides with the "$n$" gate being applied to input 1 and the "$\alpha$" pulses being applied to the input 2.

"$\alpha$" pulses representing the first selected register digit value enter the adder interlaced with "$\beta$" pulses that originated from the second selected register.

The output of the adder (see Fig. 42) which occurs at Zone III time is routed to the record buffer amplifier and will be read 15 boxes later at $h_1$ during Zone I time. The output of $h_1$ passes into $\delta_1$ for the remaining half-box of delay which may be traced as follows: $h_1$, n/c SL (Fig. 43), n/o 1P (now closed), to input 4 of junction #28. Input 1 of junction #28 is receiving an "$a$" phase gate, input 2 is receiving a "$n$" gate, while input 3 is receiving a "$bl$" gate. The output of $\delta_1$ (Fig. 40) will trigger "on" the erase-write trigger in the following manner: output of $\delta_1$ to and through the n/o points of 1P (now closed) n/c SR to the input 1 of junction #65 (Fig. 40). Input 2 is high with ground being applied through n/c OS2, and n/c OP.

Regardless of zone or phase, the transfer of one register to another is effected in each case in approximately the same manner. The delay circuits will vary depending upon the zones and phasing but the methods remains essentially the same.

OPERATIONS COUNTER "b" PHASE TAG PULSE

A "b" tag is used as a means of instructing the machine as to how many times an operation is to be performed. A tag ("t") pulse may be initially applied to any register in either position $d_0$ or $d_{14}$. A tag (t "pulse") applied to position $d_0$ will indicate a 1-time operation. A "t" pulse applied to position $d_{14}$ will indicate a 15-times operation. The 1-time relay will pick up for a 1-time operation, while the 15-times relay will pick up for a 15-times operation. A pulse occurring at $d_1$ time is applied through the n/o points of the 1-time relay for a 1-time operation. A $d_s$ pulse is applied to the n/o points of the 15-times relay for a 15-times operation. Regardless of the operation selected, it is necessary to provide circuitry to guarantee the correct arrival of the pulse. The outline for a 1-time operation follows:

(1) Pick up 1-time relay (Fig. 42).

(2) The output of junction #60 (Fig. 42) after the pickup of the 1-time relay triggers "BR" trigger (buffer record) and records a "b" tag on the buffer..

(3) Triggering of "BR" also results in the pickup of the "X" relay, as described later.

(4) The "b" tag is read 15 boxes later, at $h_1$, at $Z_s d_0$ time.

(5) Output of $h_1$, triggers the erase-write trigger to the "write" side.

(6) The high "write" output of the erase-write trigger, in conjunction with the output of junctions #5, #10 and #2, results in the recording, in main storage, of a "b" tag at $d_0$ time.

(7) This "b" tag is read at $W_1$ and is re-recorded in buffer storage but is not re-recorded in main storage, due to the fall of $\overline{d_s}$ (it will be $d_s$ time).

(8) OPCO picks up (operation is complete).

For ease in circuit tracing it will be assumed that the first register selected is one which occurs during "a" phase and a shift left operation has been called for, which is a 1-time operation. Tracing of the tag follows:

The "picking" of the 1-time relay (Fig. 42) allows a $d_1$ gate pulse to pass through the n/o contact (now closed) of the 1-time relay, n/c 15-times relays, n/c X, to input 5 of junction #60 (Fig. 42), $Z_s$ is applied to input 2 of this junction, and "t" and "#" are applied to inputs 3 and 4. The function tag is only applied at "b" phase; consequently, it is necessary to supply input 1 of junction #60 with a "b" phase gate and it is supplied through the n/c points of the X relay. It should now be apparent that a "$d_1$-t-#-b-$Z_s$" gate has been formed which allows a "#" (2-microsecond pulse) to pass through a cathode follower to turn on the "BR" (buffer record) trigger. The output of the "BR" trigger and the first following "β" pulse are applied to "and" junction #61 whose output is applied to the record buffer amplifier. This pulse occurs during "ZI-$d_1$-b-t" time.

The "b" tag pulse is read at $h_1$, 15 boxes later, during "ZII-$d_0$-d-t" time. Although this pulse occurs at this time, it will be recorded in position "ZI-$d_0$-b-t." It should be recalled that the record heads for the main tracks are 16 boxes advanced (Fig. 40) from the read heads, and time is measured at the read heads.

Particular note should be made of the fact that it is possible to pick up the 1-time relay but it is not possible to turn on the buffer record trigger until the necessary coincidence circuits are "brought in." It should also be kept in mind that "time" is always referred to when a discrete portion of the drum is at the reading heads. For example, at Zone I time, Zone III is actually under the recording heads.

Tag and the output of $h_1$ (Fig. 40) are mixed at junction #66. The output of this junction is used to trigger the erase-write trigger to its "write" side.

As stated above, the input to the record buffer amplifier occurs at "ZI-$d_1$-t" time and is read 15 boxes later which is "ZII-$d_0$-t" time. Therefore, the erase-write trigger will be turned on at $d_0$ time.

The high output of the erase-write trigger feeds into input 3 of junction #2, whose output is supplied directly to the write amplifier "as follows": Input 1 of junction #2 (Fig. 40) is high with +15 v. applied through n/c OPCO, n/o (now closed) 1-time relay, and n/c 15-times relay. Input 2 is high at "β" time. Input 4 is high at "t" time due to the high output of junction #4. Input 1 of junction #4 is high with a "b" gate, input 2 is high with a clock tag gate and input 3 is common to input 1 of junction #2. The write amplifier will be high during "b" tag time. Having satisfied the various conditions of junction #2, a "β" pulse occurring at "b" phase $d_0$ tag time will be recorded in main storage.

The tag pulse that is recorded in main storage will be read, at $W_1$, during $d_0$ tag time and will pass to and through n/c E' (Fig. 42) and the n/o X relay (described presently) now closed, to input 5 of junction #60. The four remaining inputs of junction #60 are conditioned in a manner identical to the initial recording of the tag pulse at $d_1$ time. The tag will now be re-recorded in buffer storage at $d_0$ time.

The $d_0$ tag pulse will appear at $h_1$ (15 boxes later at $d_s$ time) and will appear at input 4 of junction #2 (Fig. 41). When the tag was initiated, it occurred during $d_1$ time.. It is now occurring at $d_s$ time; therefore, the #2 junction "and" circuit will not accept the pulse due to the fall of $\overline{d_s}$.

ONE-TIME RELAY

Reference (see Fig. 42) has been made to the 1-time relay. The 1-time relay is picked up whenever a 1-time operation is required, e.g., shift left, shift right, transfer, etc. The pickup time of the 1-time relay is normally arbitrary. Since "br" (Fig. 44) is in the gate used for X pickup, it assures that the "br" trigger has been picked up by the initial $d_1$ gate, since in the event that the 1-time relay was picked up at a time that split the "$d_1$-t-#" pulse, "br" would not be triggered; it would, however, receive a full-length pulse on the next coincidence of junction #60 which would result in its triggering.

X relay

Figure 44:
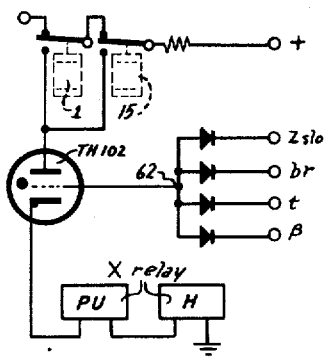
Figure 45:
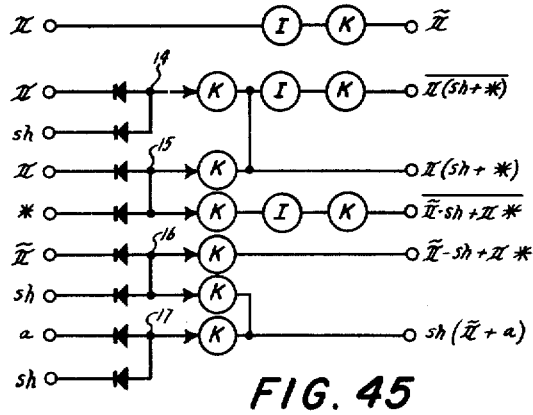
Figure 46:
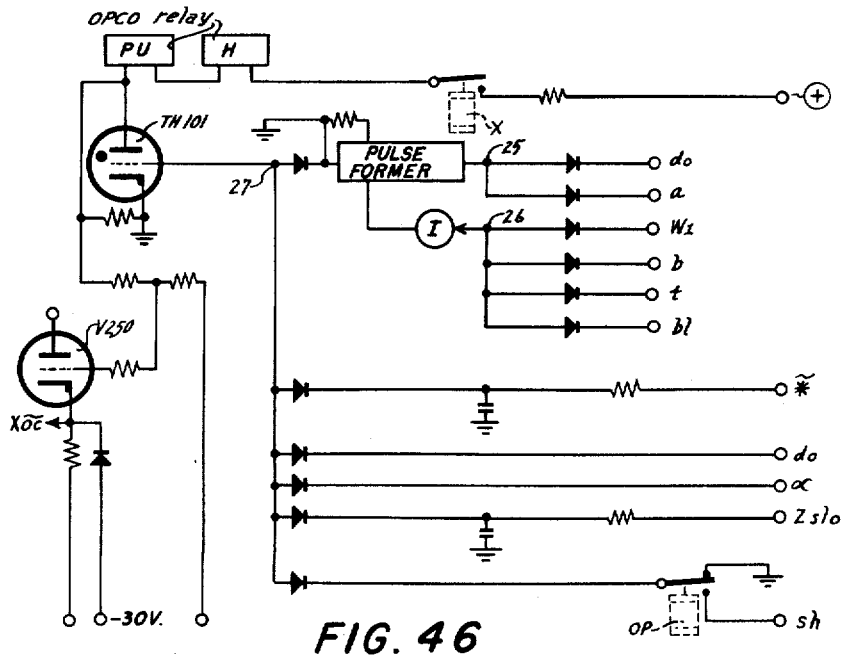
Figure 47:
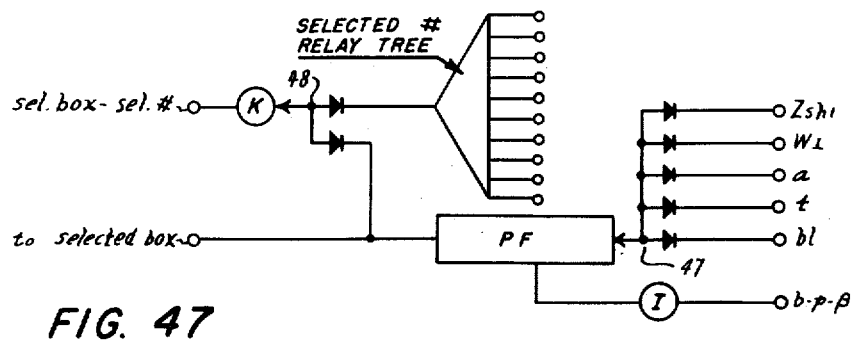

The X relay (Fig. 44) is picked up during the generation of the "b" phase tag pulse as stated above. The X thyratron TH102 must be fired before pickup occurs. The thyratron grid bias is controlled by the output of junction #62 (Fig. 44). Input 1 of this circuit is supplied with a "$Z_s$lo" gate. Input 2 will go high when the buffer record trigger goes on. Input 3 is receiving a clock tag gate and input 4 is receiving "β" pulses. The plate circuit of TH102 may be traced as follows: +40 volts, n/c 15-times relay, n/o (now closed) 1-times relay, plate of thyratron, cathode, coil of X relay to ground. The timing of the X relay is fairly critical; it must not pick up in less than 3 milliseconds or more than 9 milliseconds.

OPERATION COMPLETE RELAY

The relay for operation completed, OPCO relay (Fig. 46) picks up whenever an operation is complete. In a 1-time operation, OPCO will pick up after the 1-time operation while for a 15-times operation, such as shift, shift left, OPCO will pick up when the operation is complete. The OPCO relay depends upon the firing of the OPCO thyratron TH101 as the OPCO relay is in the plate circuit is as of this tube. The plate circuit follows: + side of the line through n/o (now closed) X relay, coil of OPCO relay, plate of OPCO thyratron, cathode to ground. (NOTE: The X relay will pick up for every operation.)

The $\overline{xoc}$ ($\overline{xoc}$ means operation *not complete*) voltage (Fig. 46) is obtained from a tube whose grid is controlled from the OPCO thyratron plate. When the OPCO relay is not picked, its thyratron's plate will be high with a resultant high $\overline{xoc}$ voltage (the operation is *not* complete). When the OPCO relay is picked, its thyratron's plate is low with a resultant low $\overline{xoc}$ (the operation is complete).

The grid circuit of the OPCO thyratron is supplied from the output of junction #27. Input 1 of this junction is supplied from the output of a pulse former labeled "PF." This pulse former receives a charging pulse from the output of junction #25 during every $d_0$ "$a$" time. This results in a high output from the pulse former unless a "$t$" pulse is read by $W_1$ during this zone, in which case the output of junction #26 is applied to the pulse former which will pull down its output. The inputs of junction #26 are conditioned as follows: input 1 receives the output of $W_1$, input 2 receives a "$b$" phase gate, and input 3 receives a "$t$" gate, input 4 receives "$bl$" pulses. A high output from this junction results if coincidence is obtained during "$b$" tag time (a "$b$" phase tag is present). Input 2 of junction #27 is high with $\overline{*}$, input 3 is high with $d_0$, input 4 is high with "$\alpha$," input 5 is high with "$Z_s$lo" gate, and input 6 is high with ground applied through $n/c$ contacts of relay OP.

"$b$" PHASE TAG 15-TIMES OPERATION

A 15-times operation is quite similar to 1-time operation. Due to their similarity in action, the complete circuitry will not be traced; however, differences will be pointed out. At a 15-times operation the 15-times relay will be energized (Fig. 42) and a $d_s$ gate will be fed through $n/o$ (now closed) 15-times relay, $n/c$ X relay to input 5 of junction #60 (Fig. 42). The other four inputs are conditioned in a manner identical to the 1-time operation. Since the gate is entered at $d_s$ time, the "BR" trigger is turned on at $d_s$ time. The tag gate is recorded in buffer storage at $d_s$ time and is read 15 boxes later at $h_1$ during $d_{14}$ time. The output of $h_1$ is mixed with a "$t$" gate at junction #66 (Fig. 40). The output of junction #66 results in the triggering of the erase-write trigger at $d_{14}$ tag time. The action is identical with the generation of a 1-time tag and the pulse enters junction #2 and in turn passes into the amplifier and records a "$t$" pulse at "$d_{14}$-$b$-$\beta$" time in the main storage during the proper zone. The X relay is picked up in a manner identical to the 1-time operation; the $d_{14}$ pulse is read at $W_1$ and fed into input 5 of junction #60 (Fig. 42) through the $n/o$ points of the X relay (now picked up). It leaves punction #60, turns on the "BR" trigger and records a pulse in buffer storage at $d_{14}$ "$\beta$" time. This process is repetitive and will continue until such time as the tag falls off at $d_0$.

The method of dropping the "$b$" tag at $d_0$ is identical to a 1-time operation. (The output of junction #2 will not rise due to the fall of $\overline{d_s}$.)

GENERATION OF AN "$a$" TAG

The generation of an "$a$" tag starts with the generation of a "$b$" tag, and reference should be made to "$b$" tag generation. The "$a$" tag is used to "look" at a particular digit of a given word, while the "$b$" tag is used as an operation counter.

When the relay E picks up and latches, relays E' and ND also picks up but do not latch. The pickup of E' results in the pickup of the 1-time relay. This starts the generation of a "$b$" tag 1-time operation. This is summarized as follows:

The $d_1$ gate enters the buffer amplifier (see Fig. 42) (using a word occurring in Zone I as an example) at "I-$d_1$-$b$" time. Fifteen boxes later the output of $h_1$, which occurs at "II-$d_0$-$b$," is recorded in main storage. The actual recording takes place at position "I-$d$-$b$" at "II-$d_0$-$b$" time. The circuits are now set up for the generation of the "$a$" phase tags.

$d_s$ gate is applied to and travels through the following circuit: $d_s$, $n/o$ E' (now closed), $n/o$ X (now closed), to input 5 of junction #60 (Fig. 42). Input 1 of junction #60 is being supplied with an "$a$" phase gate through $n/o$ E (now closed) and $n/o$ X (now closed). The remaining three inputs are conditioned in the same manner as they were in the generation of the "$b$" phase tag pulse, namely, $Z_s$, "$t$" and "#." The high output of junction #60 results in the recording on the buffer amplifier of a $d_s$ pulse which is read 15 boxes later at $d_{14}$. The output of $h_1$ is mixed with a "$t$" gate at junction #66, (Fig. 40). The output of junction #66, as in the generation of the "$b$" phase tag, triggers the erase-write trigger to the "write" side. The output of this trigger is applied to input 3 of junction #2 (Fig. 40). Input 1 is high with +15 v. applied through $n/c$ OPCO, $n/o$ 1-time relay and $n/c$ 15-times relay. Input 2 is receiving "$\beta$" pulses. Input 4 is high at "$t$" time due to the output of junction #3 which is high as follows:

Input 1 (see Fig. 41) is conditioned with an applied high $\overline{xoc}$. Input 2 is high with a "$t$" gate. Input 3 is also receiving "$t$" gates due to input 1 of "or" circuit of junction #7 which is receiving the high output of junction #10. Input 4 of junction #3 is high because the record gate is on. The record gate is triggered on, one zone after $Z_s$lo at $d_0'$ time due to the high output of junction #8.

(NOTE.—Gate circuits of junctions #11 and #12 are disabled at this time because of the transferred ND relay points; this prevents the recording (writing or erasing) of any information except tags.)

Having obtained coincidence at junction #2 results in the "$a$" phase tag being recorded in main storage during the proper zone at "$a$" phase tag time. This tag will remain in its recorded position until the next operation of relay E at which time it will be shifted one step lower to $d_{13}$. Each time the relay E is operated, the "$a$" tag will be shifted one step lower until it drops off at $d_0$, due to the fall of $\overline{d_s}$.

ENTRY OF INFORMATION AND USE OF THE "$a$" TAG PULSE

The "$a$" tag is used for register entry and read-out. For example, upon the selection of a number, a relay tree is set up which selects the proper number gate to be applied to input 1 of junction #48 (Fig. 47) (i.e., if a "5" is selected, a "5" gate is established). Input 2 is conditioned by the output of a pulse former (PF). The pulse former is conditioned by the output of junction #47. Input 1 of junction #47 is receiving a "$Z_s$hi" gate. Input 2 is receiving the output of $W_1$ which included the "$a$" tag. Input 3 is conditioned by an "$a$" phase gate. Input 4 is conditioned by a clock tag gate and input 5 is receiving a "$bl$" gate. The pulse former receives a discharging pulse at the extreme end of every box at "$b$-$p$-$\beta$" time. The output (see box, see #) of junction #48 passes through a cathode follower K, to the $n/o$ points (now closed) of the entry relay E' (Fig. 42), to and through $n/c$ CL–CNV, $n/c$ minus relay to input 1 of junction #44 (Fig. 42). Input 2 of junction #44 is receiving a "$b$" gate. Input 3 is receiving a "$bl$" gate. Input 4 is receiving $Z_s$ through the $n/c$ OP relay points. When coincidence is obtained at junction #44, its output will rise, triggering the "$\beta$" gate to its "on" side. It has been shown how the "$\beta$" gate has been turned on. The *time* at which the "$\beta$" gate is turned on will depend upon the number selected. The output of the "$\beta$" gate conditions input 3 of junction #54, input 1 is conditioned with a number gate, and input 2 is conditioned with "$\beta$" pulses. The output of junction #54 (which occurs at digit value time) will feed to the adder. "$\alpha$" pulses are also feeding to the adder, the "$\alpha$" and "$\beta$" are interlaced, and therefore the adder output will result in the new digit value. The operation of the adder has been previously described.

ARITHMETICAL OPERATION

The fundamental arithmetic with which the invention is concerned may be expressed as $$\frac{y}{z} \text{ times } x$$

the resulting quotient or product being referred to as Ac. Normally each of the values representative of $x$, $y$, $z$ is placed in a separate register of the main storage tracks of the magnetic drum in the manner as has been previously described. Also, normally the quantity representative of $x$ becomes the multiplicand (MC), the quantity representative of $y$ the multiplier (MP), and the quantity representative of $z$ the divisor (DIV). A separate register is also provided in which the result Ac is obtained. When the product of $x$ times $y$ only is desired to be obtained, a value of unity is entered into the $z$ register, and where the quotient of $$\frac{y}{z}$$

only is desired, a value of unity is entered into the $x$ register.

Referring now to Fig. 1, it may be considered for purposes of explanation that the quantity representative of $y$ is entered (in phase "$a$") of the register $A_0$, $A_1$, $A_2$, etc.., the quantity representative of $z$ is entered (in phase "$b$") of the register $B_0$, $B_1$, $B_2$, etc., the quantity representative of $x$ is entered (in phase "$b$") of the register $C_0$, $C_1$, $C_2$, etc., and that the register $D_0$, $D_1$, $D_2$, etc., (in phase "$a$") represents the resultant quantity Ac.

Reference is made to Fig. 51 wherein a diagrammatic representation is shown of the condition of a track in the main storage of the magnetic drum after a shift left or a shift right operation. Let it be assumed that a quantity 7645 is placed in a register in Zone I (disregarding "$a$" or "$b$" phase) in normal position (see center of Fig. 51) wherein the quantity is recorded with a "5" digit in $d_0$, a "4" digit in $d_1$, a "6" digit in $d_2$, and a "7" digit in $d_3$, the remaining boxes ($d_4$ through $d_{14}$) being "0" digits except $d_s$, which is a sign digit. Under a shift left operation each digit is shifted one box in a direction contrary to the direction of rotation of the magnetic drum so that a "5" digit is now recorded at $d_1$, a "4" digit at $d_2$, a "6" digit at $d_3$, a "7" digit at $d_4$ (see top view of Fig. 51) and "0" digits are recorded in the remaining boxes $d_0$ and $d_5$ through $d_{14}$, except $d_s$, the sign remaining unchanged. Under a shift right operation each digit, on the other hand, is shifted one box in the same direction as the rotation of the magnetic drum so that a "4" digit is recorded at $d_0$, a "6" digit at $d_1$, a "7" digit at $d_2$ (see bottom view of Fig. 51), and the remaining boxes $d_3$ through $d_{14}$ have "0" digits recorded therein except $d_s$, the sign digit being unchanged. It is to be noted that the "5" digit is not recorded at all in the shift right operation since recording for that digit does not take place in Zone I.

In order to evaluate the function $$\frac{y}{z} \cdot x$$

use is made of circuits described previously, i.e., those used in addition, subtraction, shifting, etc. For convenience, this operation will hereafter be referred to as "OP." The developed answer will appear in register Ac, as noted above.

The magnitudes of $y$, $z$, and $x$ in the function $$\frac{y}{z} \cdot x$$

will appear during step ($a$) (step ($a$) below) in the registers MP, DIV and MC in this manner:

$$\frac{y(MP)}{z(DIV)} \cdot x(MC)$$

The following preparatory steps are required of the operator.

*a.* If the proper divisor ($z$) is not already present in the DIV register, enter $z$ into the DIV register. (This first step is similar to any normal register entry.)

*b.* Select the register containing $x$. (This step is a normal first register selection.) Then depress "OP" key. $x$ is non-additively transferred into MC and MP is selected as the first register.

*c.* Select the register containing $y$. (The machine transfers $y$ into MP and then evaluates the expression as will be explained.)

$$\frac{y}{z} \cdot x$$

It will be seen from the above that the values of $y$, $z$, and $x$ appear in the registers as $$\frac{y(MP)}{z(DIV)} \cdot x(MC)$$

The circuits heretofore described may be considered as elements of a combination that will now be used to accomplish the operation.

The machine method of arithmetically computing the function $$\frac{y}{z} \cdot x$$

is to progressively subtract the divisor (DIV) from the multiplier (MP) until overdraft occurs, at the same time adding the multiplicand (MC) to the accumulator ($a$) for each subtraction. This is illustrated by the following sample.

Given 42, 20 and 30 as the values of $y$, $z$, and $x$, respectively, then:

$$\frac{y}{z} x = \frac{MP}{DIV} \cdot MC = \frac{42}{20} 30 = 63$$

For convenience in explanation, $$\frac{y}{z} x$$

will hereafter be referred to as $$\frac{MP}{DIV} MC = Ac$$

| Start | MP 42 | | Ac 00 |
| | DIV 20 | | MC 30 |
| MP−DIV | 22 | Ac+MC | 30 |
| | DIV 20 | | MC 30 |
| MP−DIV | 02 | Ac+MC | 60 |
| MP shifted left | 20 | MC shifted right | 03 |
| | MP 20 | | Ac 60 |
| | DIV 20 | | MC 03 |
| MP−DIV | 00 | Ac+MC | 63 |

Result appears in Ac: 63.

In the simplified example shown above, all numbers were assumed to be positive.

The sign of the word in the MP register may be either positive or negative at the start of the operation; however, the computing circuits require that it must be positive before starting the central portion of OP. To accomplish this objective, the following sign control program rule is established.

Sign control program

If MP is greater than or equal to zero, convert DIV.
If MP is smaller than zero, convert MP.
This rule may be clarified by stating that conversion is *always* necessary and MP *must* end up positive.

The following table illustrates this conversion rule and a resultant positive MP.

| Before conversion | After conversion | Operation due to sign of DIV |
|---|---|---|
| +MP, +DIV | +MP, −DIV | Add (MP+DIV, Ac+MC). |
| −MP, +DIV | +MP, +DIV | Subt. (MP−DIV, Ac−MC). |
| +MP, −DIV | +MP, +DIV | Subt. (MP−DIV, Ac−MC). |
| −MP, −DIV | +MP, −DIV | Add (MP+DIV, Ac+MC). |

The above table indicates that either addition or subtraction, depending upon the sign of DIV, follows as a result of conversion. If addition follows, DIV is added to MP and MC is added to Ac; if subtraction follows, DIV is subtracted from MP and MC is subtracted from Ac.

DETERMINATION OF SIGN

If the sign of MP and DIV are the same, the sign of the product is the same as the sign of MC. If the signs of MP and DIV are not the same, the sign of the product is opposite to the sign of MC.

The operation comprises the following steps:

a. The first register selection relays (1ZA, 1ZB, 1ZC) storing the address of the $x$ quantity transfer the data address to the second register selection relays (2ZA, 2ZB, 2ZC) and then drop out, the sign of the $x$ word being stored in a relay not used at this time but picked up if $x$ is positive.

b. Relays 1TA, (a double relay with contacts of one of these in the Relay Tree (Fig. 40) and the contacts of the other in "The First Register Selection Tree," Fig. 40) 1ZC, 1P and (1) are picked up, MC becomes the first selected register and the $x$ word is now transferred to MC.

c. MP now becomes the first register selected, relays 1TA, 1ZA being picked up, and relay 1P dropped. When the $y$ register selection is made, the $y$ word is transferred non-additively into register MP.

d. This is a conversion step; during this step the sign of MP is stored on relay BT (BT is picked up if MP is negative and remains down if MP is positive). If MP is positive, register DIV is selected for conversion and relays 1TA, 1ZA and 1P are picked up. If MP is negative, register MP is selected for conversion and relays 1TA, 1ZA are picked up and relay 1P dropped out. Relays (1), CL–CNV, and (−) (minus) are picked up for converting regardless of which register is converted when the OP key is depressed.

e. If the sign of the DIV register ($z$) is positive, the minus (−) relay is held in its picked up condition. Register Ac is selected via relays 1TA, 1ZC; (1), CL–CNV, and (−).

f. Relay 1TA is again picked up to supply plate voltage to the recording amplifiers. Relays OP, SL, (15) are also picked up. The central part of OP is accomplished during this step.

A reading cycle in OP is defined as a period comprised of three zones starting with the beginning of Zone I and ending with the end of Zone III. A recording cycle in OP is defined as a period comprised of three zones starting with the beginning of Zone II and ending with the end of Zone I.

During the central portion of OP the quantities MP±DIV, Ac±MC, MP shifted left and MC shifted right are all developed and recorded on *buffer storage* during a reading cycle. During Zone II-$d'_0$ time of a *reading cycle* a decision is made as to which shall be recorded in *main storage* during a recording cycle, MP±DIV and Ac±MC, or MP shifted left and MC shifted right, the recording decision rests upon the presence or absence of a carry from the adder during Zone I-$d_s$-$b$ time. The *absence* of a carry indicates overdraft, which will result in the *recording* of MP shifted left and MC shifted right. The converse is also true; the *presence* of a carry will record MP±DIV and Ac±MC.

If MP shifted left is to be recorded, it will be recorded during "II-$a$" time and its source will be $\delta_4$. If MP shifted left is recorded, MC shifted right will also be recorded during III and I at "$b$" phase time and the source will be $h_1$.

If MP±DIV is to be recorded, it will be recorded during Zone II-$a$ and its source will be $h_1$. If MP±DIV is recorded, Ac±MC will also be recorded during Zones III and I at "$a$" phase. Circuits will not be traced in detail since the majority of the circuits have been previously discussed in connection with Figs. 40 through 50. However, a brief summary of each circuit will be given. During OP all words in main storage appear at $W_1$.

Figure 50:
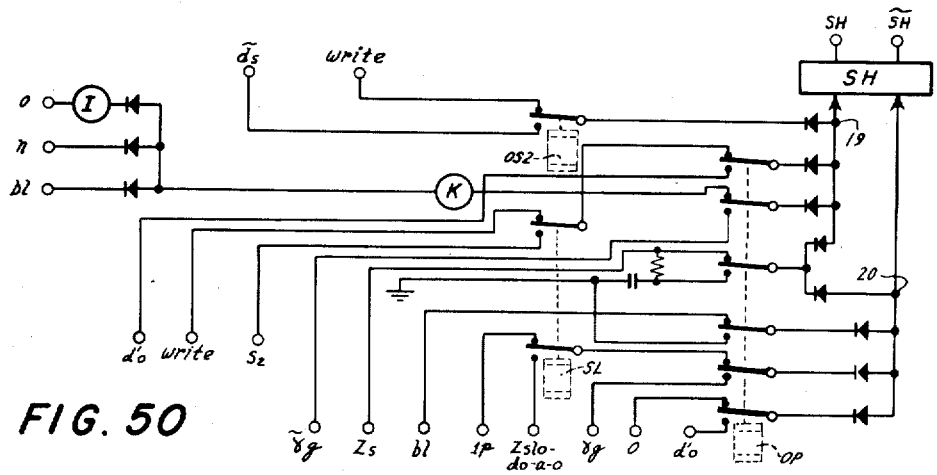

As previously stated, the recording of MP±DIV and Ac±MC will be instigated by the presence of a carry from the adder during Zone I ($d_s$-$b$) time. This carry will turn on the "$\gamma$" gate. The output of the "$\gamma$" gate is supplied to junction #20 (Fig. 50) at the beginning of Zone II and the output of this circuit turns on the "$sh$" trigger to its "$sh$" side (Fig. 50).

(*Note.*—The output of the shift ($sh$) trigger will always be high on its "$sh$" side and low on its "$sh$" side when shifting. Its status will be determined by the presence or absence of a carry.)

The MP ($y$) register word may be traced as follows: $W_1$ at "I-$d_0$-$a$" time, in $\delta_1$ (is delayed one half-box), out $\delta_1$ (Fig. 42) in adder (is delayed one half-box), out adder, in junction #57 (Fig. 42), in buffer amplifier, out buffer amplifier, off the buffer via $h_1$. MP±DIV and Ac±MC is now available at $h_1$ for recording due to the presence of a carry.

The MP word shifted left equals 17 boxes of delay. The circuit has been previously described under the shift left operation. It is summarized as follows: MP word, from $W_1$, through $\delta_1$, $\delta_3$, $\delta_2$, via SL contacts normally open buffer storage, $h_1$, $\delta_4$ via SL contacts normally open. The output of $\delta_4$ is MP shifted left and is available for recording during "$a$" phase. It should be noted that in the recording of MP shifted left and MC ($x$) shifted right, MP will be recorded in "$a$" phase but MC will be recorded in "$b$" phase. MP shifted left appears at the output of $\delta_4$ and is applied to input 1 of junction #65 (Fig. 40). Since the "$\gamma$" gate will not go on due to the lack of a carry, the "$sh$" trigger (Fig. 50) will be high in the "$sh$" position. ($sh$+*) will be high during Zone II, and is applied to input 2 of junction #65. The recording of MP shifted left is accomplished during Zone II. The output of $\delta_4$ is cut off at the end of Zone II due to the fall of the Zone II gate circuit.

MC shifted right will appear at $h_1$ during "$b$" phase, during Zones III and I and is applied to input 2 of junction #67 (Fig. 40). Input 1 is high due to "II-($sh$+*)" being applied to it through the n/o contacts of relay OP.

During OP, the record gate trigger is turned on by the output of junction #8 (Fig. 41) and will not be turned off until the OP (operation) is complete. During OP, $Z_s$, $Z_s$hi and $Z_s$lo are all high during Zone I, the output of $Z_s$lo being applied to input 1 of junction #8. Input 2 is receiving a high $x\bar{o}c$ gate, input 3 is high with an applied $d_0'$ gate. The record trigger will not be turned off until the operation is complete. The enabling circuit (junction #9) for turning the record trigger off is held down by a low input to its 2 input. This is a result of a low output from junction #74. Input 1 of junction #74 is low due to a low "*" voltage applied through the n/o points of the OP relay.

The operation is concluded by a reconversion cycle. MP or DIV is selected, depending upon the condition of the BT relay; BT was picked up during (d) (see above) if MP was negative. If MP was negative it was converted and it is now necessary to reconvert it, in which case relays 1TA, 1ZA will be picked up. If MP was not converted, DIV was converted and it will be necessary to reconvert DIV. If DIV is to be reconverted, relays 1TA, 1ZA and 1P will be picked up. Regardless of which register (MP or DIV) is to be reconverted, relays (1) and CL-CNV will be picked up.

CONTROLLED DECIMAL OPERATION

Controlled decimal operation of the invention relates to automatic placement or punctuation of decimal quantities entered into registers of the machine during and through computing operations. Entry of information into a selected register, read-out of information from a selected register, clearing of a register, converting a quantity in a selected register, a single shift left of the data in a register, and a single shift right in a register are all operations, previously described, wherein the decimal point control operation is identical with a non-decimal control operation. However, in transfer and multiple shift operations left or right (15 times), and in the OP and square root operations certain other factors are necessary. Consideration in these latter operations must be given to delay units such as $\delta_1$, $\delta_2$, $\delta_3$, $\delta_4$ and their corresponding decimal point delays $P_1$, $P_2$, $P_3$, $P_4$ and to $P\beta$, which is a point delay passing the adder (see Figs. 40 and 43). Both the first mentioned delay units and the decimal point delays, respectively, delay the passage therethrough of digits and decimals points by a period of time equal to one half-box, as previously explained.

SHIFT RIGHT 15 PLACES (UNDER CONTROLLED DECIMAL OPERATION)

SR-15 under decimal point control is restricted to 32-position registers such as $D_0$, $D_1$, $D_2$, etc., and $C_0$, $C_1$, $C_2$, etc., of Fig. 1. When this order is called for, the machine shifts the number in the selected register into right hand standard position. Right hand standard position is defined as that position in which the decimal point of a given word in a double length register lies in Zone II $d_s$ of the register: $W_1$ is "watched" during Zone II for the presence of a "point." If a point is there during Zone II, the word is in right hand standard position.

The point may not lie in the high order digits of a double length register; it may lie somewhere farther down. Presumably, however, SR-15 is only called for when the point is known to lie somewhere among the high order digits of the word. During a shift right 15 boxes operation, $W_1$ is interrogated during Zone II for the presence of a point. If there is no point, when the record gate comes on at the beginning of Zone III the word is recorded shifted right one position. During the next Zone II, $W_1$ is again interrogated for the presence of a point. If there is no point in Zone II, when the record gate comes on in Zone III recording is again permitted using the "en" (enabling) trigger (Fig. 48) to enable recording. Eventually one of these shift rights that are taking place will cause the decimal point to be recorded at Zone III $d_s$ time, then at the next Zone II $d_s$ time the point will be read. When the point is read at $W_1$ during Zone II $d_s$, there is time to turn "en" off. Thus, when the record gate comes on at the beginning of Zone III and tries to record the word shifted right again, the "en" trigger (Fig. 48) is off, preventing recording because there is no "en" signal available (Fig. 41).

The "gk" trigger (Fig. 48) "looks" at $W_1$ during Zone II and "g" is turned on for shift right by a convenient series of clock pulses during Zone I. During Zone II the "gk" trigger makes the "k" wire high if and only if a point is in the low order position of the selected register by the end of Zone II. By the time Zone II ends, the "en" trigger has been conditioned by the setting of the "gk" trigger. If there was a point in the low order of the register at the end of Zone II, "gk" is in the "k" state. If there was no point in the low order of the register at the end of Zone II, "gk" is in its "g" state. At the beginning of Zone III, the record gate goes on and the digits of the register, shifted right, are or are not recorded, depending on whether "en" is up or down, which in turn depends on whether there was a point in the low order position of the register.

In summary, SR-15 under controlled decimal operation amounts to "watching" for the decimal to appear at $W_1$ during Zone II and shifting until it does. When it appears at "ZII-$d_s$" it is in the low order half of the double length register. (Note: The signal control is in the $d_s$ box of the Zone III half of the double length register.) The operation of "gk" and "en" then prohibits any further recording in the register. The record gates will run their full cycle a total of 15 shifts. The "b" tag "falls off" the register and the operation is conducted in the same manner as other 15-time operations.

TRANSFER UNDER CONTROLLED DECIMAL OPERATION

Transfer under controlled decimal operation differs considerably from fixed decimal transfers. Transfer under controlled decimal operation may be divided into two parts:

(1) The first register selected is not Ac ($D_0$, $D_1$, $D_2$, etc.)

(2) The first register selected is Ac.

The machine will only justify decimal points on a transfer when Ac is the first selected register.

WHEN THE FIRST REGISTER SELECTED IS NOT Ac

Transfer into any register but the Ac will result in the loss of the accepting register's number and decimal point (i.e., number in the accepting register prior to the transfer). The number in the emitting register will be transferred unchanged into the accepting register. The whole number and point which was in the accepting register is lost and is replaced by the number and point of the emitting register. This process is accomplished by utilizing a point on the CNV-CDT relay (Fig. 43). This relay always picks up for a conversion operation and it also picks up during a controlled decimal transfer, so that the input to the "$\alpha$" gate is held to −30.

The holding of input 4 of junction #34 (Fig. 43) to −30 volts by relay CNV-CDT results in effectively losing the digits of the accepting register. The accepting register's information appears at point 1P (Fig. 43) but cannot pass through junction #34. Therefore, when the zeros entering the "$\alpha$" gate are combined with the digits of the emitting register (which are passing through the "$\beta$" gate), the sum is simply the digits of the emitting register. This sum is recorded in buffer storage, is read at $h_1$ and recorded in the accepting register. The "$\beta$" gate on controlled decimal transfer is connected to the same source to which it is connected when a noncontrolled transfer is taking place, i.e., it is connected via contacts on the 2Z relays (Fig. 43) and the 1Z relays either to "br on" or to $\delta_3$. The decimal point in the accepting register which appears at 1P during "b" phase is lost as it is in a normal transfer.

The decimal point of the emitting register, on the other hand, appears at the input wire to the "$\beta$" gate along with its digits. The information input to point $\beta$ is connected to the input wire of the "$\beta$" gate, and thus the point of the emitting register passes $\beta$ and is recorded on the buffer in proper phase, is read at $h_1$ and is recorded in the accepting register. This is true in both controlled and uncontrolled decimal operation. The only difference between a controlled and an uncontrolled decimal transfer (excluding register Ac) is that the digits of the accepting register are lost in controlled decimal transfer, i.e., they do not enter into the addition which is performed, whereas in an uncontrolled decimal transfer the digits of the two registers are added together and their sum recorded in the accepting register. The operation of the "$\beta$" gate is exactly the same for both kinds of transfer, controlled and uncontrolled.

WHEN THE FIRST REGISTER SELECTED IS Ac

When the Ac register is the first selected (accepting) register, decimal points will be justified. Assume two numbers, each equipped with a decimal point, the numbers being located in registers $A_0$, $A_1$, $A_2$, etc., and $B_1$, $B_2$, $B_3$, etc. (see Fig. 1). It is wished to obtain the sum of these numbers with their decimal points justified. To accomplish this, (1) Ac is cleared and selected as the first register. The first register selection is effected by picking up the 1P relay. This makes the first register selection appear to be the $C_0$, $C_1$, $C_2$, etc., register. Having picked up the 1P relay, register $A_0$, $A_1$, $A_2$, etc., is transferred into register $C_0$, $C_1$, $C_2$, etc. This is identical to a normal decimal point control transfer, when Ac is not the first register selected; i.e., the digits of register $A_0$, $A_1$, $A_2$, etc., are simply transferred into the 15 high order places of register $C_0$, $C_1$, $C_2$, etc. Any number that has been in register $C_0$, $C_1$, $C_2$, etc., is cleared out, as was previously explained for normal decimal point controlled transfers.

(2) A shift right 15 operation is now performed on the $C_0$, $C_1$, $C_2$, etc., register, so that there results a shifting of the number in $C_0$, $C_1$, $C_2$, etc., into right hand standard position. The decimal point of the number which was in the $A_0$, $A_1$, $A_2$, etc., register now lies in the middle of $C_0$, $C_1$, $C_2$, etc., register with its digits grouped around it in proper relationship. When this is completed, the 1P relay is dropped out, thus making the first register selection appear to be register Ac ($D_0$, $D_1$, $D_2$, etc.). Register $C_0$, $C_1$, $C_2$, etc., is now treated as a second register selection since a first register selection is still established (register Ac has not been released), and another transfer is performed which does not pick up the CNV–CDT relay. Thus the digits of the accepting register $C_0$, $C_1$, $C_2$, etc., are not lost on this transfer, being added to the digits of Ac via the adder. Thus, if Ac was clear before this transfer started, the result is that the digits of register $A_0$, $A_1$, $A_2$, etc., with their point are transferred into register Ac in right hand standard position.

(3) Register $B_0$, $B_1$, $B_2$, etc., is selected, the first register selection of Ac still being effective, the relay 1P picks up and performs the transfer of register $B_0$, $B_1$, $B_2$, etc., into register $C_0$, $C_1$, $C_2$, etc., and whatever was left over in the $C_0$, $C_1$, $C_2$, etc., register is cleared out. A shift right 15 operation then shifts the number which was in the $B_0$, $B_1$, $B_2$, etc., register into right hand standard position of the $C_0$, $C_1$, $C_2$, etc., register, and the 1P relay is dropped out. The CNV–CDT relay again is idle so that the digits of registers $D_0$, $D_1$, $D_2$, etc., and $C_0$, $C_1$, $C_2$, etc., are added together in the adder, and the decimal points are justified because the decimal point of the digits that are associated with register $A_0$, $A_1$, $A_2$, etc., is in the center of the Ac ($D_0$, $D_1$, $D_2$, etc.) register, and the point associated with the number of register $B_0$, $B_1$, $B_2$, etc., is in the center of the $C_0$, $C_1$, $C_2$, etc., register. Thus, the addition is performed with the decimal points justified in the two registers. The sum of the digits with its proper decimal point appears in register Ac in right hand standard position.

SHIFT LEFT 15 PLACES (UNDER CONTROLLED DECIMAL OPERATION)

Figure 48:
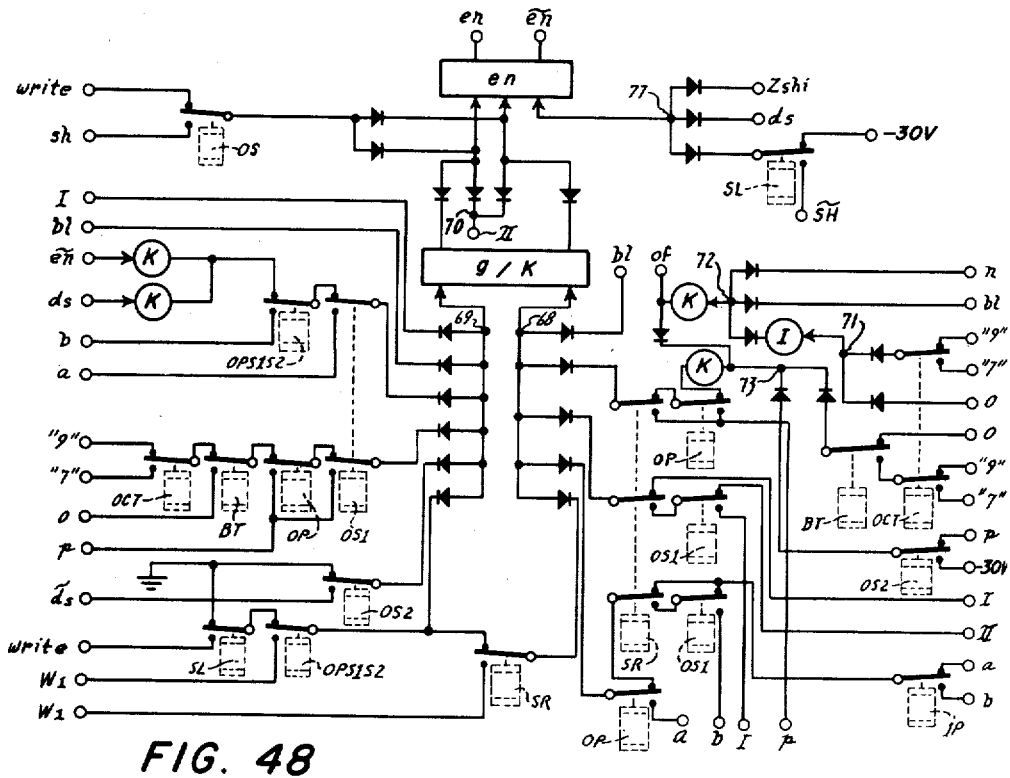
Figure 49:
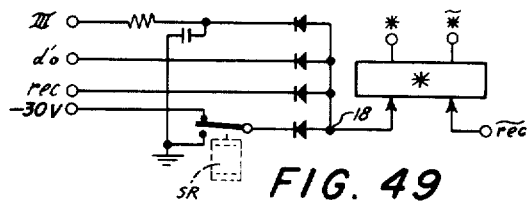

When SL–15 is impulsed under controlled decimal operation, it results in the shifting of the word in the selected register to its left hand standard position (LHSP). SL–15 is restricted to registers $C_0$, $C_1$, $C_2$, etc., and $D_0$, $D_1$, $D_2$, etc. A word is in LHSP when it is located in a register in such a manner that its first non-zero digit or decimal point (whichever appears first) is positioned to the extreme left hand (high order) position of the register. In performing this operation non-significant digits are shifted off the left hand (high order) position of the register; however, digits and decimal points are retained via the use of the "gk" and "en" triggers (Fig. 48).

The "gk" trigger examines the significance of the high order digit of the register at the "write" terminal of the read-write trigger. This digit is the digit which will be read at $W_1$ during Zone III–$d_{14}$ of the next cycle. The "gk" trigger determines the status (significant or not significant) of this digit during Zone I and passes its information to the "en" trigger during Zone II of the same cycle. The "en" trigger will, as a result, either enable or inhibit recording during the following Zones III and I. The "gk" trigger must decide whether the digit read at the read head during Zone III–$d_{14}$ will be significant the next time it is read. It decides this partially by observing what is at the "write" terminal during the Zone I–$d_{14}$ interval preceding the next Zone III–$d_{14}$ interval. Another factor affecting the "gk" trigger's decision is whether or not recording is taking place during the Zone I–$d_{14}$ interval at which the "gk" trigger observes the "write" terminal. If recording takes place during Zone I, the high order digit which will be read during the next Zone III–$d_{14}$ time will be that digit which is recorded during Zone I–$d_{14}$ time. If recording does not occur, the high order digit of the register which will be read during the next Zone III–$d_{14}$ time will be that digit which arrived at the "write" terminal during Zone I–$d_s$ time, due to the normal 17 boxes of delay. To summarize, the "gk" trigger examines the high order digit at the "write" terminal during Zone I–$d_{14}$ time if recording; if not recording, it examines it during Zone I–$d_s$ time.

To assist in determining the significance of the number, two gates are developed, "sig" (significant) (junction #73) (Fig. 48) and "$\overline{sig}$" (not significant) (4th input to junction #69). The "sig" gate is high during each "bf" gate for 9 through 1 if the selected register is positive. If the register is negative, it is high during each "bf" gate for 8 through 0, due to the pickup of the balance test (BT) relay. The "sig" input to junction #69 also has a tenth pulse on it whether the register be positive or negative; this pulse occurs at point time. On SL–15 under controlled decimal operation, the same relays will be up as are up during fixed decimal SL–15 (the 15-times and SL relays). An additional relay, the CD (Fig. 41) (controlled decimal), is also up. (This relay is up during all controlled decimal operations.) The output of the "en" trigger passes through the n/o points of the CD relay (Fig. 41).

As soon as the "gk" trigger notes that the high order digit that will be read by $W_1$ during the next cycle is significant (in the case of a positive number, if it is a 9, 8, 7, 6, 5, 4, 3, 2, 1 or if there is a point in the high order digit position), the "gk" trigger will control the "en" trigger in such a manner as to inhibit further recording of the selected register shifted left. The record gate (Fig. 41) continues being turned on at Zone III time and off at Zone II time through the remainder of its 15 cycles.

(Note.—Registers $C_0$, $C_1$, $C_2$, etc., and Ac ($D_0$, $D_1$, $D_2$, etc.) are read at $W_1$ during Zones II and III but are recorded during Zone III and I times, the high order digit appearing during "I–$d_{14}$" time.)

A "look" at this high order digit being recorded on the drum will enable the "gk" trigger to position itself in the "g" position if the digit is not significant, or in the "k" position if the digit is significant. During Zone II when there is no recording going on, the "gk" trigger will pass its information to the "en" trigger, thus setting the "en" trigger in a suitable position to control the recording of numbers and points the next time the record gate rises. If the high order digit going on the drum in main storage is significant, the "en" gate is triggered off during Zone II so that no recording will be possible during the next record gate, whereas if the high order digit observed by "gk" is not significant, the "en" trigger will be triggered on during Zone II, bringing the "en" wire up. Then the next time the record gate wire rises during Zones III and I, the register will be recorded shifted left one place.

Again, during this Zone I the "$gk$" trigger will "look" at the high order digit and be positioned accordingly.

There is no $d_{14}$ gate available from the computer clock, so in order to insure that the "$gk$" trigger is positioned in a state determined by the digit recorded at $d_{14}$ time, it is necessary to cause every digit of the high order half of the word being recorded to actuate the "$gk$" trigger one way or another; into the "$k$" state if the digit is significant, into the "$g$" state if the digit is not significant. By using the $d_s$ gate, the last digit to operate the "$gk$" trigger is the digit that arrived at the write amplifier (Fig. 40) during $d_{14}$ time. Thus, when Zone II starts, "$gk$" will be positioned in a state which is dependent only upon the digit recorded at $d_{14}$ time, and on no other digit. However, it does not suffice simply to "look" at the digit being recorded at Zone I-$d_{14}$ time, because if not recording, it is necessary to "look" at "I-$d_s$" time.

Consequently, the condition of trigger "$gk$" is "looking" at "I-$d_{14}$" when recording and at "I-$d_s$" when not recording, the exception being that when not recording and "$en$" is up and the record gate down, "I-$d_{14}$" is again referred to. The "$gk$" trigger is conditioned on its "$k$" input from the output of junction #68 via Zone I-$bl$-$a$ or $b$-$\overline{sig}$-write, and it is conditioned on its "$g$" input from the output of junction #69 via Zone I-$bl$-$(\overline{en}+\overline{d_s})$-$\overline{sig}$-write (see Fig. 48). Zone I is supplied to both circuits as this is the time at which the high order digits or points of the selected register will appear at the write trigger. A "$bl$" gate is supplied to both junctions #68 and #69, and both circuits are connected to the "write" terminal as it is the information (digit or point) source (see Fig. 48).

The "$k$" side accepts all significant digits which will result in the trigger taking its "$k$" position if the high order digit is significant. The "$g$" side satisfies two conditions, viz., accepting during $d_{14}$ time if recording, and accepting during $d_s$ time if not recording. If recording, "$\overline{en}$" must be low and $\overline{d_s}$ is high during $d_{14}$ time but low during $d_s$ time; therefore, non-significant digits occurring during $d_{14}$ time will result in triggering the "$gk$" trigger to the "$g$" side. If not recording and "$\overline{en}$" is high, it will be high during the entire zone; therefore, non-significant digits occurring during $d_s$ time will trigger the "$gk$" trigger to the "$g$" side. If not recording and "$\overline{en}$" is low, the "$en$" must be high and the record gate must be low; therefore, only non-significant digits occurring during $d_{14}$ time will trigger the "$gk$" trigger to its "$g$" side. Under these conditions, if a non-significant digit occurs during $d_s$ time, it will not trigger the "$gk$" trigger to the desired "$g$" state; however, the "$gk$" trigger will on the next cycle trigger "$en$" off, which will restore the condition previously described ("$\overline{en}$" high so that the shift will occur).

The decimal point is read in time after the digit with which it shares a half-box. During any half-box, the "$gk$" trigger gets information on whether there was a point stored in that half-box after it has received all the information on the significance or lack of significance of the digit. Therefore, no matter whether a digit which arrives at "$gk$" is significant or non-significant, if there is a point stored with that digit the "$gk$" trigger will be left in the "$k$" state. Thus, a decimal point in the high order digit of the selected register will throw the "$gk$" trigger to the "$k$" state and disable any further recording.

The write trigger receives the output of $\delta_4$ if register $Ac$ ($D_0$, $D_1$, $D_2$, etc.) is selected via $\delta_1$, $\delta_3$, $\delta_2$, buffer, $h_1$, $\delta_4$, and the output of $\delta_1$ if register $C_0$, $C_1$, $C_2$, etc., is selected via $\delta_3$, $\delta_2$, buffer, $h_1$, $\delta_4$, $\delta_1$. The "$k$ on" trigger has an input which, although occurring in proper phase, is redundant in this operation. This input is necessary during a shift right operation when $W_1$ is the information source.

Negative numbers are stored in a register in complementary form, and are identified by a 9 in the sign position of the register. The first non-zero digit in a register, counting from right to left, appears as a tens complement, all other digits appearing as nines complements. Examples of the numbers —23, —127, and —460, including their sign, are below as they would appear in a six position register.

—23=sign (9) 99977
—127=sign (9) 99873
—460=sign (9) 99540

In the above examples, the underscored digit is a tens complement and the nines are not significant.

Non-significant digits are nines, but nines are not always non-significant; those nines that are not significant, as in the above examples, are shifted left (off the end of the register). Three examples of significant nines appear below; they represent the numbers —1, —10, and —100, including their sign, as they would appear in a six position register before shifting. The significant nines are underscored.

—1=sign (9) 99999
—10=sign (9) 99990
—100=sign (9) 99900

From the above examples, it should be evident that shifting should be stopped when a significant 9 is shifted to the high order position. In the above examples, the significant nines would be shifted off the register along with the non-significant nines, were it not for a special circuit. In the specific example —1, the proper result after shifting would be two nines, a nine in the sign position and a nine in the high order position.

The method of identifying significant nines when negative numbers are involved is somewhat different than has been explained. "$sig$" and "$\overline{sig}$" are set up to handle nines complements. This is satisfactory except in the case of the tens complement of "1." In order to handle this condition, use is made of the "$sh$" trigger. It examines all digits of the selected register, starting with the low order digit up to and including the next to the highest order ($d_{14}$) digit, and if all these digits are zero it sends a command to the "$en$" trigger to disregard the setting of the "$gk$" trigger and stop shifting, i.e., turn the enable trigger into its "$\overline{en}$" state. A gate is formed, under which pulses can be detected which are not zero, by inverting the zero gate and mixing it with "$n$" and "$bl$"; thus during each half-box there appears on the wire called "$\overline{0}$-$bl$," nine pulses occurring at 9, 8, etc., down through 1 time. The "$sh$" trigger is preset to the "$\overline{sh}$" state by the output of junction #20 (see Fig. 50) ($Z_s$-$bl$-($Z_s$lo-$d_0$-$a$-0)). If shift left is to continue, the "$sh$" trigger is set to the "$sh$" state by the output of junction #19 ($\delta_2$-$\overline{0}$-$Z_s$). The "$sh$" side "watches" the output of $\delta_2$ for any non-zero digits. The zero which will be inserted in the lowest order position for SL arrives at the output of $\delta_2$ at "$d_0$-$b$" time. All the digits appearing at the output of $\delta_2$ during Zones II and III arrive at the "$sh$" trigger, and the first non-zero digit triggers the "$sh$" trigger into the "$sh$" state. The "$sh$" trigger is interrogated at Zone III-$d_s$ time to determine whether any digits which are not zero have arrived at the "$sh$" "on" trigger from the output of $\delta_2$. The last pulse which is tested at the "$sh$" "on" terminal of the "$sh$" gate before interrogation time (Zone III-$d_s$ time) is the digit which emerged from $\delta_2$ during Zone III-$d_{14}$ time. This digit is the next to the highest order digit of the word being shifted left. If all the digits which read off the drum beginning with Zone II-$d_0$, up through and including Zone III-$d_{13}$, are zero, the "$sh$" trigger will still be in the "$\overline{sh}$" state when Zone III-$d_s$ time starts.

There is an extra input to the "$\overline{en}$" side of the "$en$" trigger; this input is the output of junction #77 ($Z_s$hi-$\overline{sh}$-$d_s$). If all the digits have been zero, the "$en$" trigger will be thrown to the "$\overline{en}$" state during the start of Zone III-$d_s$. On SL-15, recording is done during Zones III and I. The "$\overline{en}$" trigger has its state changed during recording time if all the digits have been zero. Digits which are zero before the "$en$" trigger is pulsed to its "$\overline{en}$" side may be shifted left, and in such a case zeros over zeros are recorded for half a word and then stop; the value of the word will not be changed. In such a case recording will start during Zone III because of the "$gk$" command as in the example —1. In this example the "$gk$" trigger "looked" at the 30 zeros and the 2 nines at the write trigger and "concluded" that another shift was necessary; however, this command would not be satisfactory and it is superseded by the command of the "$sh$" trigger. During the earlier part of Zone III zeros are recorded over zeros and during Zone III-$d_s$ the "$en$" trigger is turned to the "$\overline{en}$" state and thus stops recording.

$\frac{y}{z} \cdot x$ (CONTROLLED DECIMAL METHOD)

When the controlled decimal operation is used, the solution to the function $$\frac{y}{z} \cdot x$$

is obtained with the decimal point appearing in its proper place in register Ac. The fixed decimal method of evaluating the function, previously explained, contains many features to which the decimal controlled method will be referred. After the values of $y$, $z$ and $x$ are in registers MP, DIV and MC, $$\frac{y}{z} \cdot x$$

will be expressed as $$\frac{MP}{DIV} \cdot MC$$

as it is in the Fixed Decimal "OP" (operation). The following preparatory steps are required of the operator:

(a) Before starting the operation, any quantities stored in registers MP, MC, and DIV must be transferred to other available registers if they are required in later program steps, as they will be lost during the entry of $y$, $z$ and $x$.

(b) The quantities $y$, $z$, and $x$ should be stored in LHSP and they must contain a decimal point.

(c) If the proper divisor ($z$) is not already present in the DIV register, it must be entered. This step is identical to step $a$ in the fixed decimal method with the exception of the LHSP entry.

(d) Select the register containing $x$ (this step is a normal first register selection); this step is also identical to preparatory step $b$ by the fixed decimal method.

(e) During this step the MC register is cleared and $x$ is then transferred into it. MP is then automatically selected as a first register.

(f) Select the register containing $y$ ($y$ is transferred into MP and the expression $$\frac{y}{z} \cdot x$$

is evaluated, as will be explained). The selection of $y$, which is a second register selection, results in transferring the quantity $y$ into register MP. The quantity of $y$ is now in register MP, the quantity of $z$ in register DIV, and the quantity of $x$ in register MC. Thus, the values of $y$, $z$ and $x$ appear in the registers as $$\frac{y(MP)}{z(DIV)} \cdot x(MC)$$

This same condition exists at the end of step $c$ in fixed decimal OP.

The sign control program is identical to Fixed Decimal OP.

The operation comprises the following steps:

(a) Steps $a$, $b$, and $c$ of the fixed decimal operation.

(b) If the decimal point in MP lies to the left of the decimal point in DIV, shift the MP point right (without shifting the MP numbers) until it "lines up" with the DIV point. The MC numbers are simultaneously shifted to the right (without shifting the point) the same number of places as the MP point is shifted.

Satisfying the conditions of step $b$ (above) does not affect the numerical value of the solution to any given problem, as may be observed from the following example. If, in the function $$\frac{MP}{DIV} \cdot MC$$

MP=.072, DIV=02.4, and MC=12.0, then, by conventional arithmetic, the result will be .36.

$$\frac{(MP).072}{(DIV)2.4} \times (MC)12.0 = .36$$

The answer is the same using the rule of step $b$.

MP point shifted right _____ 07.2
DIV unchanged _____ 02.4
MC numbers shifted right _____ .12

$$\frac{7.2}{2.4} \times .12 = .36$$

If the decimal points "line up" or if the DIV point lies to the right of the MP point, the conditions of this rule are satisfied and shifting does not take place. During step $b$, relays SR, 15, OS1, and OP (Fig. 48) are picked up. The controlled decimal relay CD (Fig. 41) is also up (it is for all controlled decimal operations). Also during step $b$, all the information that is stored on track 1 in main storage (registers MP, DIV, MC and Ac) appears at junction #57 ($W_1$-$(n+p)$-$gnd$) (see Fig. 42), is recorded in buffer storage and appears at $h_1$ fifteen boxes later. The output of $h_1$ is applied to input 1 of junction #65 (Fig. 40), input 2 being high ($gnd$); therefore, all information during step $a$ appears at the output of junction #65. As the output of junction #65 is applied to the write trigger, it is necessary to filter out all information not required. During step $b$, as previously stated, only the point in MP is shifted right (when required); therefore, numbers must be filtered out during recording time which is Zone II. Points are enabled during Zone II by junction #12 via (II-$p$-$en$) (Fig. 41). The correct phase ("$a$") is obtained by the output of junction #5 ($a$-II). The source of MC shifted right for recording is also $h_1$, its phase ("$b$") being obtained from the output of junction #6 ($\overline{II}$-$b$). The recording of the numbers of MS shifted right, but not its points, is enabled by the output of junction #11 ($en$-$\overline{II}$-$n$-$\overline{d_s}$).

The setting of the "$en$" trigger enables or inhibits recording. The "$en$" trigger is controlled by the "$gk$" trigger. The "$en$" trigger interrogates the "$gk$" trigger at the beginning of every Zone II. This action is similar to a controlled decimal shift left 15 times operation. The "$gk$" trigger receives the output of junction #68 via (I-$bl$-$b$-$p$-$W_1$) (Fig. 48) on its "$k$" side, and receives the output of junction #69 via (I-$bl$-$a$-$p$-$gnd$-$W_1$) on its "$g$" side. It is evident from the foregoing that the "$g$" side receives the point of the MP register while the "$k$" side receives the point of the DIV register. The points in both registers (MP and DIV) are read during Zone I with the point in the MP register occurring during the "$a$" phase and the point in the DIV register occurring during the "$b$" phase.

If the MP register point is to the left (as it would appear if written) of the DIV register point, it will occur later in time, which sets the "$gk$" trigger to the "$g$" side. When the "$en$" trigger interrogates the "$gk$"

trigger at the start of Zone II, if the "gk" trigger is set to its "g" side, the "en" trigger will be triggered to its "en" side, enabling the recording of the shifted information. When the MP point coincides with the relative position of the DIV point, or if the MP point were originally to the right of the DIV point, the "gk" trigger will be set to its "k" side. In the former case, the points will be in the same relative boxes, the DIV point will occur during "b" phase and is therefore the last signal that the "gk" trigger receives, thus setting it to its "k" side which inhibits further shifting.

A further condition must be satisfied; namely, if there are any non-significant digits to the left of the first significant digit in the DIV register, shift the DIV numbers left (without shifting the point) to the first significant digit, simultaneously shifting the MC point right (without disturbing the numbers) the same number of places as the DIV numbers were shifted. Satisfying the conditions of this rule does not affect the numerical value of the solution to any given problem, as may be observed from the following example.

If, in the function $$\frac{MP}{DIV} \cdot MC, \quad MP=07.2, \quad DIV=.024, \quad MC=12.0$$

then by conventional arithmetic the result will be 3600.

$$\frac{(MP)07.2}{(DIV).024} \times (MC)12.0 = 3600$$

The result is the same (3600) using the above mentioned rule.

MP unchanged _____ 7.2
DIV numbers shifted left _____ .24
MC point shifted right _____ 120.

$$\frac{7.2}{.24} \times 120 = 3600$$

During this operation, $Z_s$, $Z_s$lo and $Z_s$hi are all high during Zone I, relays SL, 15, OP, OS2, and 1P are picked up and remain up. The DIV information shifted left is available at the write trigger during Zone II for recording if required. Its information flow is as follows: $W_1$, $\delta_3$, $\delta_2$, junction #59, buffer, $\delta_4$, $\delta_1$, junction #65, write trigger (see Fig. 42).

The proper phase ("b") for recording is obtained from the output of junction #5 (Fig. 41.) The output of junction #11 enables the recording of numbers but not points when "en" is high. The MC information shifted right is available at the write trigger during Zones III and I for recording if required. Its information flow is as follows: $W_1$, junction #58 ($W_1$-$n$+$p$-$\overline{Z_s}$-$b$) (Fig. 42), buffer, $h_1$, junction #67 ($\overline{II}$-$h_1$) (Fig. 40), write trigger. It is necessary to gate out the numbers, as only the MC point is shifted. The output of junction #5 (Fig. 41) is supplied the proper "b" phase gate for recording the MC point shifted right. The recording of the point is enabled by the output of junction #12 via ($\overline{II}$-$p$-$en$). The "en" trigger will be high for the recording of the MC point if it was high for the recording of the DIV numbers.

The action of the "en" trigger is similar to its action during step b (above), and it is largely controlled by the "gk" trigger. The action of the "gk" trigger is also similar to its action in step b, i.e., its position at the end of Zone I will determine the setting of the "en" trigger during Zones II, III, and I following. The "gk" trigger is triggered to its "g" side if there are any non-significant digits to left of the first significant digit in register DIV. (Non-significant digits are zeros with respect to positive numbers and nines with respect to negative numbers.) The BT relay stores the sign of DIV; BT is down if DIV is positive, thus providing a zero gate, and it is up if DIV is negative, thus providing a nine gate. The appropriate gate, 0 or 9, is supplied to junction #69 (I-$\overline{bl}$-$b$- $\overline{sig}$-$d_s$-$W_1$). This will trigger the "gk" trigger to its "g" side for non-significant digits. The "gk" trigger is triggered to its "k" (stop) side when a significant digit appears, due to the output of junction #68 (I-$\overline{bl}$-$sig$-$b$-$W_1$). The last digit which the "gk" trigger reads during Zone I-$d_{14}$ determines its setting, except in the special case of $a$ —1 which can occur in the same manner as previously described under SL-15.

The special case of $a$ —1 is handled in essentially the same way as it is in shift left 15 times. If "sh" is up at the end of Zone I, the setting of the "en" trigger is entirely dependent upon the setting of the "gk" trigger; i.e., the "en" trigger is set to its "en" position if the "gk" trigger is positioned on its "g" side. It is set to its "$\overline{en}$" position if "gk" is set to its "k" side. "en" interrogates "gk" at the beginning of Zone II. If "$\overline{sh}$" is high at the end of Zone I, the "en" trigger is not entirely dependent upon the setting of the "gk" trigger. If DIV is positive and the "gk" trigger is set to its "k" side, it will trigger the "en" trigger to its "$\overline{en}$" position; however, if DIV is negative, as it is in the case of the —1, the "en" trigger will be triggered to its "$\overline{en}$" side if coincidence is obtained at "II-$k$+($Z_s$hi-$d_s$-$\overline{sh}$)". Coincidence is obtained in the case of the —1 and will be explained as follows:

The "sh" trigger is conditioned on its "sh" side by the output of junction #19 ($\overline{d_s}$$\delta_2$-$n$-$\overline{0}$-$Z_s$) (Fig. 50). It is conditioned on its "$\overline{sh}$" side by the output of junction #20 ($Z_s$-$\overline{bl}$-$Z_s$-lo-$d_0$-$a$-0). The last digit that is accepted by "sh" is that digit occurring during Zone I-$d_s$ which may be any digit 9 through 1, i.e., not zeros. This last acceptable digit was read at $W_1$ during $d_{13}$ time; it has been delayed 17 boxes and is now applied to "sh" during $d_{14}$ time. Hence, the last acceptable digit at "sh" occurs during $d_{14}$ time which is the next to the highest order digit of register DIV (it is the 13th digit). The "sh" trigger will be positioned to its "sh" position each time a digit is read, other than zero, during Zone I except in the special case of the —1. In this case, the last digit that the "sh" trigger looks at is a zero in the $d_{13}$ position of DIV, which appears at "sh" during $d_{14}$ time as the output of $\delta_2$. Zeros cannot trigger the "sh" trigger to its "sh" state; therefore, the trigger remains in its "$\overline{sh}$" state. This high "$\overline{sh}$" is applied to junction #77 (Fig. 48), and the output of this junction results in triggering the "en" trigger to its "$\overline{en}$" state at $d_s$ time. This results in leaving the DIV sign (9) and the $d_{14}$ (any number other than zero) undisturbed and completes the left shifting of the DIV register.

Thereafter, the word in register MC is shifted left 15 boxes and then is shifted one box to the right, as in the fixed decimal operation. During controlled decimal OP, digits are handled the same as they are in fixed OP (that portion referred to previously as the "central portion of OP"; viz., MP±DIV, Ac±MC, MP shifted left and MC shifted right are developed and recorded on buffer storage during the reading cycle). During shift cycles, the MP point is recorded shifted left along with the MP digits, and the MC point is recorded shifted right along with the MC digits, simultaneously recording a decimal point Ac. The point in Ac is recorded in the same relative position as the MC point occupied before each shift cycle. This action continues until the MP point lies one position to the left of the DIV point, at which time no further recording of points is permitted.

Referring to Fig. 43, the MP register point shifted left (1½ boxes delayed) is recorded in buffer storage during Zone I, "b" phase: source $W_1$, $P_1$, $P_3$, $P_2$, buffer; the DIV register (½ box delayed) is recorded in buffer storage during Zone I, "a" phase: source $W_1$, $P_b$, buffer; the MC register point (½ box delayed) is recorded in buffer storage during Zone III, "a" phase: source $W_1$, $P_b$, buffer; and the MC register point shifted right is recorded in buffer storage during Zone III, "b" phase: source W₁, buffer.

The flow of points from buffer storage to main storage during shift ("sh") cycles is different from not shift ("s̄h̄") cycles; this is indicated in the following:

|  | Zone II | Zone III | Zone I |
|---|---|---|---|
| Source | δ 4 | h₁ | h₁ |
| Enable | MP pts. enable (pt. is SL). | a & b pts | enabled (en). |

(A point gate is available regardless of phase).

The point inputs to the write-erase trigger during "s̄h̄" cycles may be disregarded as points are not enabled; however, during "sh" cycles action is as follows:

|  | Zone II | Zone III | Zone I |
|---|---|---|---|
| Phase "a" | MP pt. SL | none | MC pt. 15½ boxes delayed. |
| Phase "b" |  | none | MC pt. SR. |

The inputs to the "gk" trigger are: on=I-bl-b-p-W₁, and "k" on=I-bl-a-p-W₁.

During step b of controlled decimal OP, if the decimal point in MP was to the left of the point in DIV, the MP point was shifted right until the points "lined up"; if the reverse was true (the point in MP was to the right of the point in DIV), no action was taken. At the start of central OP, the MP and DIV points are either "lined up" or the MP point is to the right of the DIV point. The MP point is applied to the "k" side of the "gk" trigger, and the DIV point is applied to the "g" side. If the MP point lies to the right of the DIV point, the DIV point will be read last. This results in triggering the "gk" trigger to its "g" state, which in turn results in triggering the "en" trigger to its "en" state. The resultant high "en" enables the recording of MP shifted left. This action continues until the MP point lies one position to the left of the DIV point, at which time the MP point will be read last. When the MP point is read last, the "gk" trigger takes its "k" state, inhibiting any further shifting of points.

If the MP and DIV points line up, the "gk" trigger will be triggered to its "g" side, as the DIV point occurs last ("b" phase in time). The result of this action is to record the MP point shifted one position to the left; then on the next cycle the MP point will be read last, which will trigger the "gk" trigger to its "k" state.

At the start of central OP, the MP point is either to the right of the DIV point, or the MP and DIV points, are lined up. If at the end of Zone I (beginning of Zone II) the DIV point is last, "g" is up and "en" rises; if the MP point is last (DIV point first), "k" is up and "en" falls. When the MP point has reached this state, it is one position to the left of the DIV point, inhibiting any further recording or erasing of points.

With reference to Figs. 2, 10 and 42, it is to be noted that digit pulses to the adder are under control of junctions #53, #54 and #55 which comprise an "or" circuit thereto. The junction #53 is under control normally of junction #52, "β" and "γ" gate; however, when the OCT relay is picked up permitting "9" digit and "8" digit pulses to be automatically supplied to junction #53 in lieu of control via junction #52, with which the "9" and "8" relay contacts of OCT relay form an "or" circuit, the resultant action on the adder is to shorten the numbers gate ("n") so that, in effect, the computing circuits now function based on a radix of eight rather than of ten. This is an additional feature of the invention that may be applied to any of the other operations heretofore described.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a digital computer including a pair of registers coacting to perform a mathematical function, means for erasably recording digital representations in each said register, means for erasably recording in said register a radix point representation in a position corresponding to a selected order of each register, means for changing the order of recordation of the said point representation relative to the digital representations in one register, and means for erasing and re-recording in a different order the erasably recorded point indication in the other register to compensate for the change in the order of recordation of the said point indication in the said one register.

2. In a digital computer including a pair of registers coacting to perform a mathematical function, means for erasably recording digital representations in each said register, means for erasably recording a radix point representation in a selected order of each said register to establish a significance of the digital representations therein, means for shifting the place of recordation of said radix point representation from one selected order to another selected order in one register, and means for effecting a compensating shift of the place of recordation of the radix point representation in the other register under the control of the radix point shift in the one register.

3. In a digital computer including a pair of registers coacting to perform a mathematical function, means for erasably recording digital representations in each said register, means for erasably recording a radix point representation in a selected order of each said register to establish the significance of the digital representations therein, means for shifting the place of recordation of the radix point representation from one selected order to another selected order in either said register, and means for automatically effecting a compensating shift of the place of recordation of the radix point representation in one said register when a radix point shift occurs in the other said register.

4. In a digital computer having a plurality of registers coacting to perform a mathematical function, means for erasably recording digit manifestations representative of arithmetical quantities in said registers, means for erasably recording a radix point indication in a position in each of said registers for establishing the digital significance of each said register, means for shifting the place of recordation of said digit representations of a selected register relative to the place of recordation of the radix point representation therein for changing the digital significance of said register, and means under control of a manifestation of the radix point representation of another said register for effecting a shift by the shifting means.

5. In a digital computer having a plurality of registers coacting to perform a mathematical function, means for erasably recording digit representations representative of arithmetical quantities in each said register, means for erasably recording a radix point indication in a position including a recordation of one of said digit representations in each said register for establishing the digital significance of each said register, means for shifting the relative position of the locations of recordation of said digit representations and said radix point representation recordings of a selected register, and means under control of a manifestation of the said radix point representation of another said register for effecting predetermined repeated operations of the shifting means.

6. In a digital computer including a pair of registers coacting to perform a mathematical function, first means for erasably recording digital representations in each said register, second means for erasably recording a radix point representation in a position corresponding to a selected digital representation in each register, third means for changing the relative positioning of place of recordation of the point representation and the digital representations in one of said registers, and fourth means responsive to the change effected by a manifestation of the third means for changing the locations of the relative positioning of the point representation and the digital representations in the second of said registers to compensate mathematically for the change in location effected in the one register.

7. In a digital computer, a first register for erasably recording digit representations representative of numerical quantities, a second register for erasably recording digit representations indicative of numerical quantities, means for erasably recording radix point manifestations in positions separating selected ones of the digits in the registers, means for changing the location of the relative positioning of the radix point manifestation and the digital representations of one register, and means responsive to a manifestation of the change effected by the last mentioned means for effecting a mathematically compensating relative change of the locations of the radix point manifestation and the digital representations of the other register.

8. In combination, a rotating magnetic drum having a recording surface divided into a plurality of zone groups, each zone of a group consisting of a number of registers separated into a number of half-boxes, each half-box containing a group of magnetizable cells; a source of electrical pulses representative of a series of digits, including zero, and a radix point, forming a mathematical quantity; recording means for magnetically recording upon the drum the mathematical quantity, each digit representative pulse being respectively recorded in turn in one magnetized cell of the group of cells forming one half-box, the significance of the mathematical quantity being established by one radix point representative pulse recorded as one particular magnetized cell of a half-box, reading means for translating the mathematical quantity represented by magnetized cells into electrical pulses, a number of time delay means to provide paths for electrical pulses between the reading means and the recording means, switching means for selecting one of the number of delay means as a path for electrical pulses and means selectively reading, passing the information read through said delay means and re-recording either said digits of said mathematical quantity of said radix whereby the relative positioning of said digits and said radix is altered.

9. In combination, a rotating magnetic drum having a recording surface divided into a plurality of zone groups, each zone of a group consisting of a number of registers separated into a number of half-boxes, each half-box containing a group of magnetizable cells; a source of electrical pulses, representative of a series of digits, including zero and nine, and a radix point, forming a mathematical quantity; recording means for recording the mathematical quantity upon the drum within a register, each digit representative pulse being recorded as one magnetized cell of the group of cells forming one half-box, the significance of the mathematical quantity being established by one radix point representative pulse recorded in one particular magnetized cell of a half-box, reading means for translating a mathematical quantity recorded by the recording means, into electrical pulses; a number of time delay means to provide paths for electrical pulses between the reading means and the recording means; switching means for selecting one of the number of delay means as a path for electrical pulses, said switching means controlling transfer of electrical pulses, representative of a mathematical quantity stored as magnetized cells in a particular drum register, into equal valued cells of adjacent half-boxes, so as to shift said entire methematical quantity one digit place; and a detector connected between the recording and the reading means, and controllable by an electrical pulse resulting from a particular magnetized cell, for causing the recording means to be rendered operative or inoperative.

10. The invention defined in claim 9 wherein a selected delay means causes the entry of the pulse represented digits into equal valued cells of adjacent higher valued half-boxes, relative to the half-boxes from which the digits were read, so as to shift said entire mathematical quantity, one digit place toward the higher valued half-boxes, for each transfer; a bistable device included within the detector, said bistable device being conditioned when pulses representative of zero are read from one selected half-box; to maintain said recording means operative, said bistable circuit, however, being conditioned to render said recording means inoperative when pulses representative of a radix point or of digits, other than zero, are read from said selected half-box.

11. The invention defined in claim 10 wherein there is provided: reversal means, operated when the highest order digit is a nine, for interchanging the effect of the nine and the zero on the bistable means.

12. The invention defined in claim 9 wherein a selected delay means causes the pulse represented digits to be entered by the recording means into equal valued cells of adjacent lower valued half-boxes, relative to the half-boxes from which the digits were read, so as to shift said entire mathematical quantity, one digit place toward the lower valued half-boxes, for each transfer; a bistable device included within the detector; said bistable device being conditioned to render said recording means operative when pulses representative of a digit including zero are read from one selected half-box; said bistable device, however, rendering said recording means inoperative, when a pulse representative of a radix point is read from said selected half-box.

13. In combination, a rotating magnetic drum having a recording surface divided into a plurality of zone groups, each zone of a group consisting of a number of registers separated into a number of half-boxes, each half-box containing a group of magnetizable cells; a source of electrical pulses representative of a series of digits including zero and a radix point, forming a mathematical quantity; recording means for recording mathematical quantities upon said drum, each digit representative pulse being recorded in turn as one magnetized cell of the group of cells forming one half-box, the significance of the mathematical quantities being established by one radix point representative pulse recorded as one particular magnetized cell of a half-box; reading means for translating, mathematical quantities represented by magnetized cells, into electrical pulses; a number of time delay means to provide paths for electrical pulses between the reading means and the recording means; cyclically operative switching means for selecting one of the number of delay means as a path for electrical pulses; a one of the number of time delay means permitting recording of the radix on the drum, in a cell in a half-box adjacent to the one from which it was read; and a one of the number of time delay means permitting recording of digits on the drum in cells in half-boxes adjacent to the half-boxes from which they were read.

14. In combination, a rotating magnetic drum including a plurality of registers on said drum, timing means producing signals synchronized with the rotation of said drum, first means for recording digit representations on said drum in a selected register, said first means including means for recording a radix point representation on said drum among said digit representations, means for reading said digit representations and said radix point representations, shifting means connected to said reading means and to said recording means, means controlled by said timing means for identifying said digit representations or said radix representations, at a preselected position in said register, and means controlled by said identifying means upon identification of a radix manifestation or a digit manifestation at said preselected position to render said shifting means selectively operative or not operative in accordance with the identification of a chosen one of these last two mentioned manifestations, whereby said digit manifestations or said radix manifestations or both are shifted to a desired position relative to said preselected position.

15. The combination as set forth in claim 14 and including means controlling said shifting means to delimit the maximum degree of shift of said digit manifestations, said radix manifestations, or both.

16. The combination as set forth in claim 14 and further means including said identifying means scanning the manifestations of said digits and of said radix and means effective upon recognition of a non-significant digit manifestation for stopping the operation of said shifting means.

17. The combination as set forth in claim 16 and including means recording a chosen sign manifestation in said selected register and means controlled selectively by the kind of said sign manifestation to alter the operation of said identifying means, whereby a normally significant digit accompanied by a certain sign manifestation is operated upon as if it were a non-significant digit.

18. A device as in claim 14 and further means including said identifying means scanning the manifestations of said digits and of said radix and means effective upon the recognition of said radix manifestation for stopping the operation of said shifting means.

19. In combination a digital register for recording a mathematical quantity including means for erasably recording digit representations at predetermined order locations, means for erasably recording a radix point representation among said digit representations at a chosen order location for establishing the significance of said digit representations, means for shifting said radix point recordation and said digital recordations, means for selectively recognizing said radix point representation and said digit representations and means effective upon the recognition of said radix point representation at a preselected order position for halting said shifting.

20. The combination as set forth in claim 19, and including means controlling said shifting means to repeatedly shift said manifestation if required, and means controlled by said recognition means and effective upon ascertainment that a radix point manifestation is to be recorded at the highest order position of said register, to stop the operation of said shifting means upon recordation of said radix point in said highest order.

21. The combination as set forth in claim 19, and including means controlling said shifting means to repeatedly shift said manifestations if required, means controlled by said recognition means upon recognition of a non-significant digit to maintain said shifting means operative and means controlled by said recognition means upon recognition of a significant digit to render said shifting means inoperative.

22. The combination as set forth in claim 21 and including means recording a chosen sign manifestation in said selected register, and means controlled selectively by the kind of said sign manifestation to alter the control of said recognition means over said shifting means upon the presence of one kind of said sign manifestations and means controlled by the presence of the other kind of said sign manifestation to render said altering means ineffective.

References Cited in the file of this patent

UNITED STATES PATENTS

| | | |
|---|---|---|
| 2,502,360 | Williams | Mar. 28, 1950 |
| 2,514,036 | Dickinson | July 4, 1950 |
| 2,538,636 | Williams | Jan. 16, 1951 |
| 2,588,923 | Hatton | Mar. 11, 1952 |
| 2,614,169 | Cohen et al. | Oct. 14, 1952 |
| 2,701,095 | Stibitz | Feb. 1, 1955 |
| 2,739,299 | Burkhart | Mar. 20, 1956 |
| 2,769,592 | Burkhart et al. | Nov. 6, 1956 |
| 2,787,416 | Hansen | Apr. 2, 1957 |
| 2,790,599 | Gloess | Apr. 30, 1957 |

FOREIGN PATENTS

| | | |
|---|---|---|
| 1,033,166 | France | July 8, 1953 |

OTHER REFERENCES

"Description of a Magnetic Drum Calculator," Harvard Computation Lab., 1952, pp. 8, 22, 23, 29, 102 to 106 relied on.